US012694717B2

(12) United States Patent
Sonoda et al.

(10) Patent No.: US 12,694,717 B2
(45) Date of Patent: Jul. 28, 2026

(54) GESTURE RECOGNITION DEVICE, OPERATION METHOD FOR GESTURE RECOGNITION DEVICE, AND OPERATION PROGRAM FOR GESTURE RECOGNITION DEVICE

(71) Applicant: FUJIFILM Corporation, Tokyo (JP)

(72) Inventors: Shinichiro Sonoda, Kanagawa (JP);
Hirotoshi Yoshizawa, Kanagawa (JP);
Nobuya Tanaka, Kanagawa (JP);
Hajime Terayoko, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 365 days.

(21) Appl. No.: 17/878,041

(22) Filed: Jul. 31, 2022

(65) Prior Publication Data

US 2022/0375268 A1     Nov. 24, 2022

Related U.S. Application Data

(63) Continuation of application No. PCT/JP2020/038541, filed on Oct. 12, 2020.

(30) Foreign Application Priority Data

Feb. 28, 2020     (JP) ................................. 2020-034194

(51) Int. Cl.
*G06V 40/20*          (2022.01)
*G06V 40/10*          (2022.01)
(52) U.S. Cl.
CPC .............. *G06V 40/28* (2022.01); *G06V 40/11* (2022.01)
(58) Field of Classification Search
CPC .......... G06V 40/11; G06V 40/28; G06F 3/01; G06T 7/20
See application file for complete search history.

(56) References Cited

U.S. PATENT DOCUMENTS 10,057,483  B2     8/2018  Her et al.
10,073,534  B2     9/2018  Shigeta
          (Continued)

FOREIGN PATENT DOCUMENTS

CN          203933796          11/2014
CN          203933796  U  *  11/2014
          (Continued)

OTHER PUBLICATIONS

"International Search Report (Form PCT/ISA/210) of PCT/JP2020/ 038541," mailed on Nov. 10, 2020, with English translation thereof, pp. 1-5.

(Continued)

*Primary Examiner* — Vu Le
*Assistant Examiner* — Zaid Muhammad Saleh
(74) *Attorney, Agent, or Firm* — JCIPRNET

(57)          ABSTRACT

A gesture recognition device that recognizes, based on an image obtained by imaging a person to be imaged with a digital camera having an imaging range changing mechanism for changing an imaging range, a gesture represented by a hand of the person to be imaged includes at least one processor. The at least one processor controls, in a case where a position of a face of the person to be imaged in the image deviates from a predetermined set position, an operation of the imaging range changing mechanism to cause the digital camera to capture a proper face position image with the position of the face as the set position, and determines whether the hand detected from the proper face position image is a right hand or a left hand based on a positional relationship between a position of the detected hand and the set position.

12 Claims, 46 Drawing Sheets

(56) References Cited

U.S. PATENT DOCUMENTS

| | | | |
|---|---|---|---|
| 10,671,175 B2 | 6/2020 | Shigeta | |
| 11,169,614 B2 * | 11/2021 | Zhao | G06T 7/13 |
| 2010/0295782 A1 * | 11/2010 | Binder | H04M 3/02 |
| | | | 348/222.1 |
| 2015/0288883 A1 | 10/2015 | Shigeta | |
| 2017/0068849 A1 * | 3/2017 | Lim | G06F 18/23 |
| 2019/0213406 A1 * | 7/2019 | Porikli | G06V 20/597 |
| 2019/0246036 A1 * | 8/2019 | Wu | G06F 3/0484 |
| 2021/0165492 A1 | 6/2021 | Ohashi | |

FOREIGN PATENT DOCUMENTS

| | | | |
|---|---|---|---|
| CN | 204347424 | 5/2015 | |
| CN | 104836889 | 8/2015 | |
| CN | 105824406 | 8/2016 | |
| CN | 106454071 | 2/2017 | |
| CN | 109635630 | 4/2019 | |
| CN | 110569817 | 12/2019 | |
| EP | 2244224 A1 * | 10/2010 | G06V 40/63 |
| JP | 2013257762 | 12/2013 | |
| JP | 2016161835 | 9/2016 | |
| JP | 2017211960 | 11/2017 | |
| JP | 2017211960 A * | 11/2017 | |
| JP | 2019219904 | 12/2019 | |
| JP | 2019219904 A * | 12/2019 | G06F 3/042 |

OTHER PUBLICATIONS

"Written Opinion of the International Searching Authority (Form PCT/ISA/237)" of PCT/JP2020/038541, mailed on Nov. 10, 2020, with English translation thereof, pp. 1-8.

Office Action of Japan Counterpart Application, with English translation thereof, issued on Dec. 12, 2023, pp. 1-5.

Office Action of Japan Counterpart Application, with English translation thereof, issued on Aug. 1, 2023, pp. 1-6.

"Office Action of China Counterpart Application", issued on Nov. 15, 2024, with English translation thereof, p. 1-p. 21.

"Decision of Refusal of China Counterpart Application", issued on Apr. 8, 2025, with English translation thereof, p. 1-p. 17.

* cited by examiner

SQUARE-SHAPED CUTOUT FRAME THAT HAS SIDE HAVING LENGTH OF SPECIFIED NUMBER OF TIMES LONG SIDE OF HAND DETECTION REGION AND WHOSE SIZE MATCHES CENTER OF HAND DETECTION REGION

JOINT IMAGE GENERATION UNIT

MODEL FOR JOINT IMAGE GENERATION

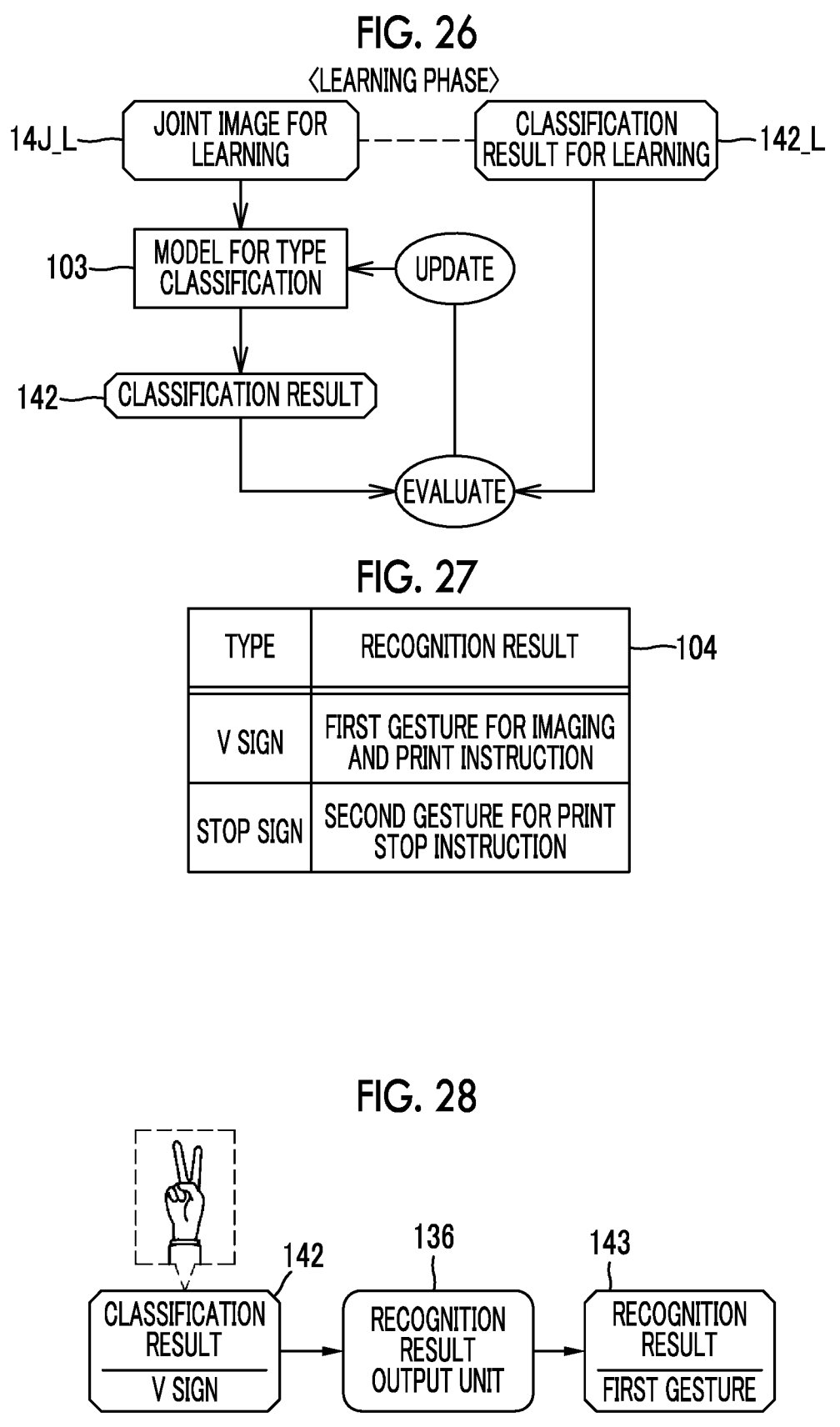

⟨LEARNING PHASE⟩

14J_L — JOINT IMAGE FOR LEARNING - - - CLASSIFICATION RESULT FOR LEARNING — 142_L

103 — MODEL FOR TYPE CLASSIFICATION ← UPDATE

142 — CLASSIFICATION RESULT

EVALUATE

FIG. 27

| TYPE | RECOGNITION RESULT | |
|------|-------------------|---|
| | | —104 |
| V SIGN | FIRST GESTURE FOR IMAGING AND PRINT INSTRUCTION | |
| STOP SIGN | SECOND GESTURE FOR PRINT STOP INSTRUCTION | |

| CLASSIFICATION RESULT | → | RECOGNITION RESULT OUTPUT UNIT | → | RECOGNITION RESULT |
|---|---|---|---|---|
| V SIGN | | | | FIRST GESTURE |

V SIGN IS RECOGNIZED. IMAGING IS STARTED.

FIG. 38

LIVE VIEW DISPLAY SCREEN 3 sec

REMAINING SHEETS 10

LIVE VIEW DISPLAY SCREEN

170L

115

170R

180

0 sec

13

REMAINING SHEETS 10

24

73

CLICK (PSEUDO-SHUTTER SOUND)

DISPLAYED IMAGE IS PRINTED. PLEASE MAKE STOP SIGN OF SHOWING PALM OPEN IN CASE WHERE PRINTING NEEDS TO BE STOPPED.

RECOGNIZE
SECOND GESTURE

PREVIEW DISPLAY SCREEN 4 sec

STOP SIGN IS RECOGNIZED AND PRINTING IS STOPPED.
PLEASE MAKE V SIGN AGAIN AND CAPTURE IMAGE
AGAIN.

FIG. 46

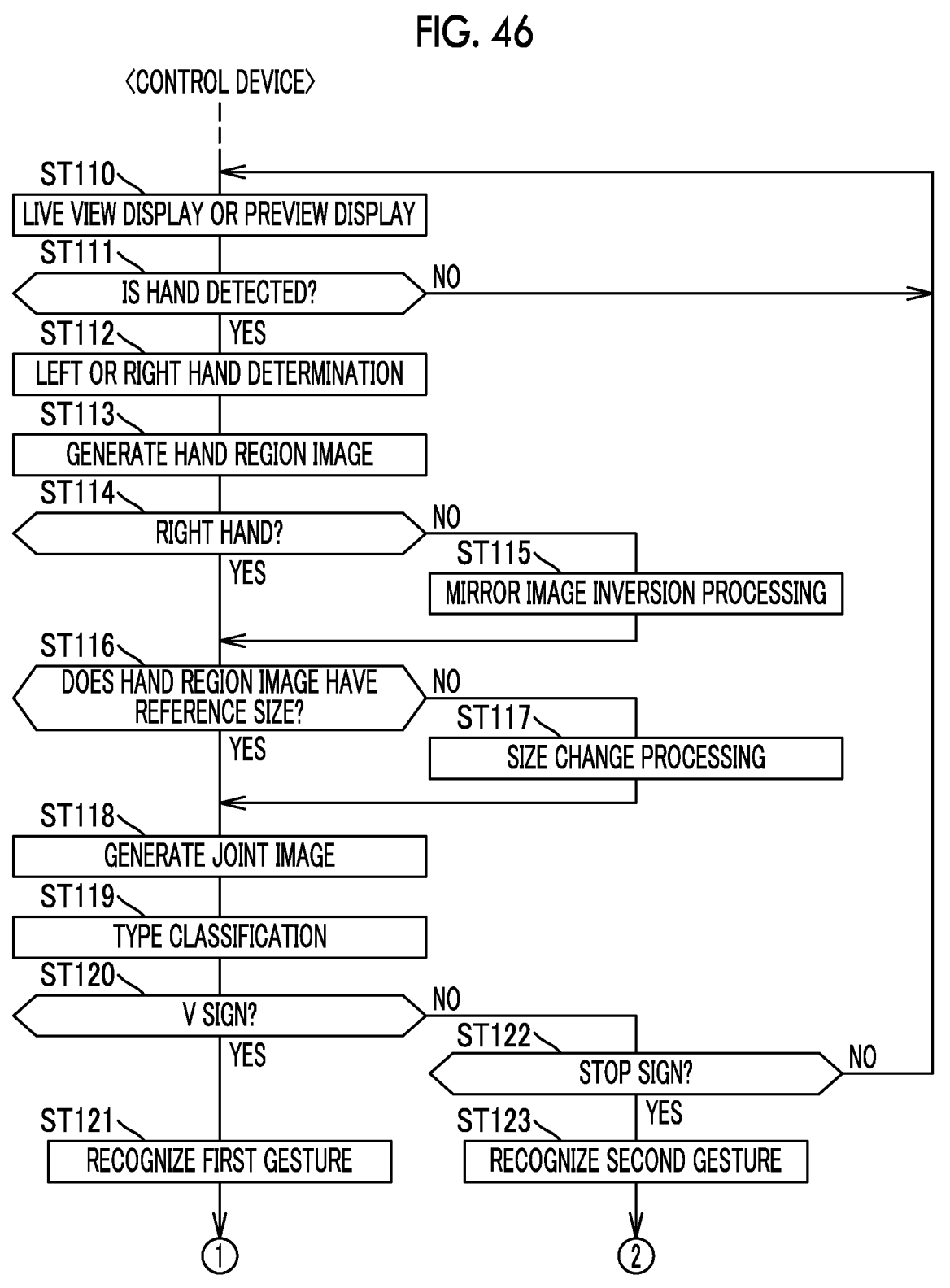

⟨CONTROL DEVICE⟩

ST110　LIVE VIEW DISPLAY OR PREVIEW DISPLAY

ST111　IS HAND DETECTED? — NO

ST112　LEFT OR RIGHT HAND DETERMINATION (YES)

ST113　GENERATE HAND REGION IMAGE

ST114　RIGHT HAND? — NO
　　　ST115　MIRROR IMAGE INVERSION PROCESSING

ST116　DOES HAND REGION IMAGE HAVE REFERENCE SIZE? — NO
　　　ST117　SIZE CHANGE PROCESSING

ST118　GENERATE JOINT IMAGE

ST119　TYPE CLASSIFICATION

ST120　V SIGN? — NO
　　　ST122　STOP SIGN? — NO

ST121　RECOGNIZE FIRST GESTURE

ST123　RECOGNIZE SECOND GESTURE

Figure 47:
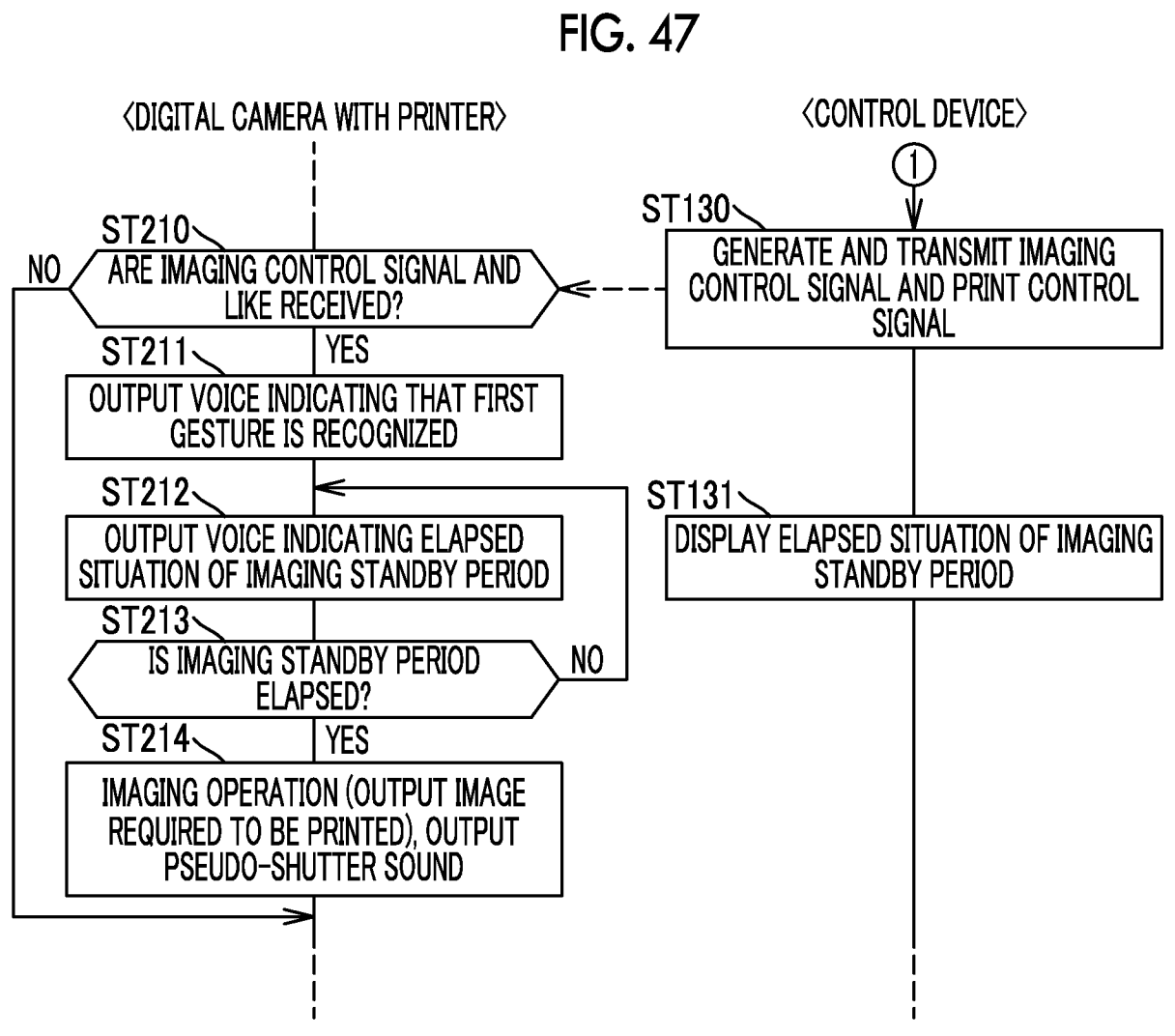

〈CONTROL DEVICE〉

ST130 GENERATE AND TRANSMIT IMAGING CONTROL SIGNAL AND PRINT CONTROL SIGNAL

ST131 DISPLAY ELAPSED SITUATION OF IMAGING STANDBY PERIOD

〈DIGITAL CAMERA WITH PRINTER〉

ST210 ARE IMAGING CONTROL SIGNAL AND LIKE RECEIVED?
NO
YES

ST211 OUTPUT VOICE INDICATING THAT FIRST GESTURE IS RECOGNIZED

ST212 OUTPUT VOICE INDICATING ELAPSED SITUATION OF IMAGING STANDBY PERIOD

ST213 IS IMAGING STANDBY PERIOD ELAPSED?
NO
YES

ST214 IMAGING OPERATION (OUTPUT IMAGE REQUIRED TO BE PRINTED), OUTPUT PSEUDO-SHUTTER SOUND

FIRST GESTURE FOR IMAGING
AND PRINT INSTRUCTION

SECOND GESTURE FOR PRINT
STOP INSTRUCTION

FIG. 51

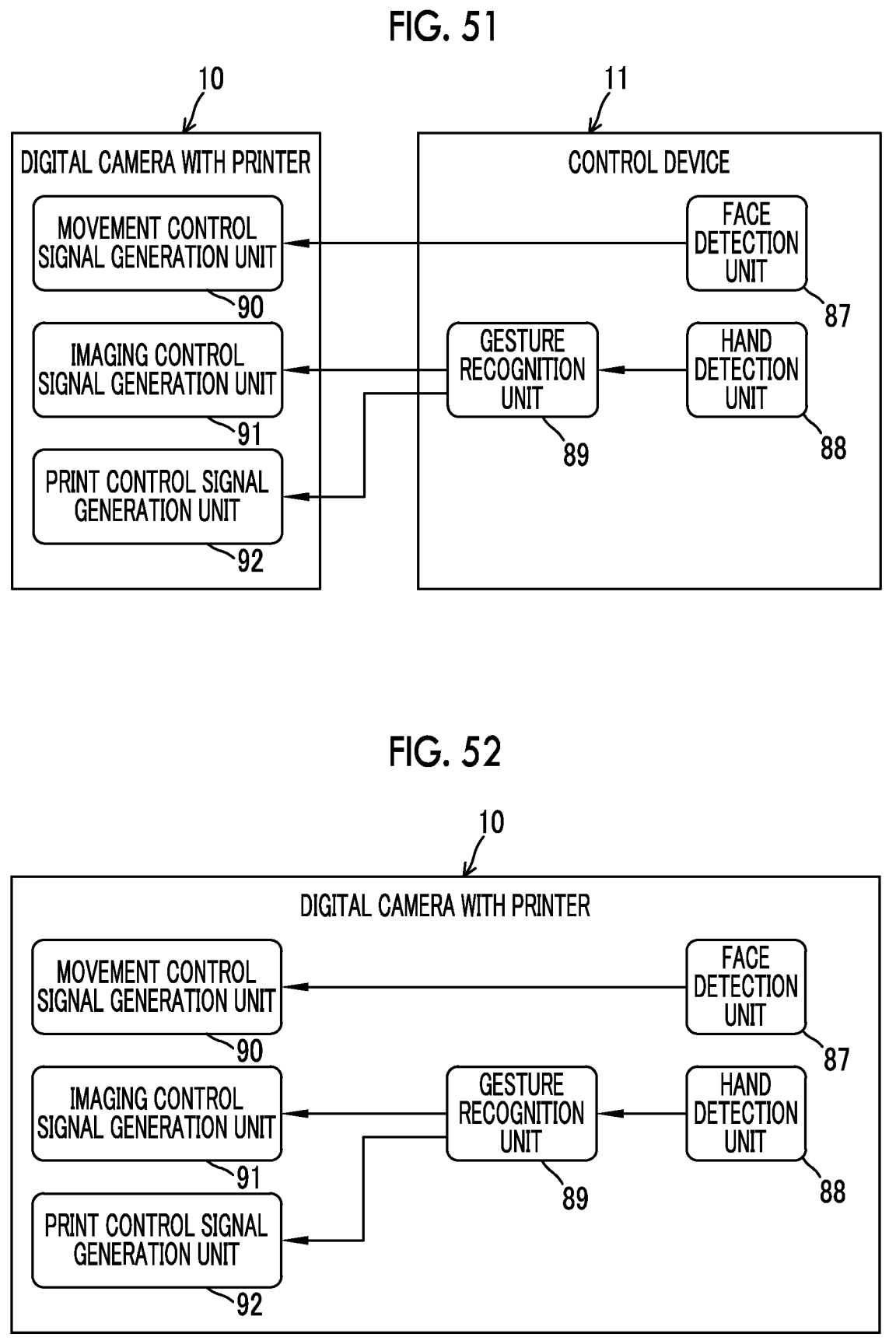

10 — DIGITAL CAMERA WITH PRINTER

- MOVEMENT CONTROL SIGNAL GENERATION UNIT — 90
- IMAGING CONTROL SIGNAL GENERATION UNIT — 91
- PRINT CONTROL SIGNAL GENERATION UNIT — 92

11 — CONTROL DEVICE

- FACE DETECTION UNIT — 87
- GESTURE RECOGNITION UNIT — 89
- HAND DETECTION UNIT — 88

FIG. 52

10 — DIGITAL CAMERA WITH PRINTER

- MOVEMENT CONTROL SIGNAL GENERATION UNIT — 90
- IMAGING CONTROL SIGNAL GENERATION UNIT — 91
- PRINT CONTROL SIGNAL GENERATION UNIT — 92
- FACE DETECTION UNIT — 87
- GESTURE RECOGNITION UNIT — 89
- HAND DETECTION UNIT — 88

GESTURE RECOGNITION DEVICE, OPERATION METHOD FOR GESTURE RECOGNITION DEVICE, AND OPERATION PROGRAM FOR GESTURE RECOGNITION DEVICE

CROSS-REFERENCE TO RELATED APPLICATIONS

This application is a continuation application of International Application No. PCT/JP2020/038541 filed on Oct. 12, 2020, the disclosure of which is incorporated herein by reference in its entirety. Further, this application claims priority from Japanese Patent Application No. 2020-034194 filed on Feb. 28, 2020, the disclosure of which is incorporated herein by reference in its entirety.

BACKGROUND

1. Technical Field

The technique of the present disclosure relates to a gesture recognition device, an operation method for the gesture recognition device, and an operation program for the gesture recognition device.

2. Description of the Related Art

JP2019-219904A describes a technique for recognizing a gesture represented by a user's hand shown in an image captured by a smartphone. In JP2019-219904A, prior to the gesture recognition, determination is made, from a posture of the smartphone, whether the user's hand shown in the image is the right hand or the left hand. For example, in a case where a right side surface of the smartphone is directed in a vertical direction, the user is estimated to hold the smartphone with his left hand and the user's hand shown in the image is determined to be the right hand. For example, only a gesture recognition dictionary for the right hand is prepared, and in a case where the user's hand shown in the image is the left hand, the image is mirror-inverted to replace the left hand with the right hand and then the gesture is recognized.

SUMMARY

In the technique described in JP2019-219904A, determination is made, based on the posture of the smartphone, whether the hand shown in the image is the right hand or the left hand, as described above. For this reason, the determination may be erroneous in a case where the user holds the smartphone in a way different from the assumption.

An object of a technique of the present disclosure is to provide a gesture recognition device, an operation method for the gesture recognition device, and an operation program for the gesture recognition device capable of reducing a risk of erroneous determination of a left or right hand of a person to be imaged, which is shown in an image.

A gesture recognition device of the present disclosure that recognizes, based on an image obtained by imaging a person to be imaged with a digital camera having an imaging range changing mechanism for changing an imaging range, a gesture represented by a hand of the person to be imaged, the gesture recognition device comprises at least one processor. The processor controls, in a case where a position of a face of the person to be imaged in the image deviates from a predetermined set position, an operation of the imaging range changing mechanism to cause the digital camera to capture a proper face position image with the position of the face as the set position and determines whether the hand detected from the proper face position image is a right hand or a left hand based on a positional relationship between a position of the detected hand and the set position.

It is preferable that the processor performs mirror-image inversion processing on the proper face position image in a case where the detected hand is not a predetermined one hand of the right hand or the left hand and recognizes the gesture based on the proper face position image or the proper face position image subjected to the mirror-image inversion processing.

It is preferable that the processor determines that the position of the detected hand is the right hand in a case where the position of the detected hand is on a left side of the set position and is the left hand in a case where the position of the detected hand is on a right side of the set position, as viewed from an imaging direction of the digital camera.

It is preferable that the processor cuts out a rectangular region surrounding the detected hand from the proper face position image to generate a hand region image and recognizes the gesture based on the hand region image.

It is preferable that the processor cuts out the hand region image from the proper face position image by matching a center of the hand and a center of the image and providing a margin around the hand.

It is preferable that the processor performs size change processing of changing a size of the hand region image to set a size of the hand shown in the hand region image to a predetermined set size.

It is preferable that the processor generates a joint image obtained by extracting a joint of the hand from the hand region image and recognizes the gesture based on the joint image.

It is preferable that the processor uses a first machine learning model that uses the hand region image subjected to the size change processing as input data and the joint image as output data.

It is preferable that the first machine learning model is a model in which the hand region image showing the predetermined one hand whose size is the set size is selectively provided for learning as input data for learning.

It is preferable that the first machine learning model is a model in which a plurality of the hand region images showing the predetermined one hand whose size is the set size in different postures are selectively provided for learning as input data for learning.

It is preferable that the processor uses a second machine learning model that uses the joint image as input data and a type of the gesture as output data.

It is preferable that the second machine learning model is a model in which the joint image generated from the hand region image showing the predetermined one hand whose size is the set size is selectively provided for learning as input data for learning.

It is preferable that the second machine learning model is a model in which a plurality of the joint images generated from a plurality of hand region images showing the predetermined one hand whose size is the set size in different postures are selectively provided for learning as input data for learning.

It is preferable that the set position is a center position of the image.

A operation method for the gesture recognition device of the present disclosure of recognizing, based on an image obtained by imaging a person to be imaged with a digital camera having an imaging range changing mechanism for changing an imaging range, a gesture represented by a hand of the person to be imaged comprises a control step of controlling, in a case where a position of a face of the person to be imaged in the image deviates from a predetermined set position, an operation of the imaging range changing mechanism to cause the digital camera to capture a proper face position image with the position of the face as the set position, and a determination step of determining whether the hand detected from the proper face position image is a right hand or a left hand based on a positional relationship between a position of the detected hand and the set position.

An operation program for the gesture recognition device of the present disclosure of recognizing, based on an image obtained by imaging a person to be imaged with a digital camera having an imaging range changing mechanism for changing an imaging range, a gesture represented by a hand of the person to be imaged causes a computer to function as a control unit that controls, in a case where a position of a face of the person to be imaged in the image deviates from a predetermined set position, an operation of the imaging range changing mechanism to cause the digital camera to capture a proper face position image with the position of the face as the set position, and a determination unit that determines whether the hand detected from the proper face position image is a right hand or a left hand based on a positional relationship between a position of the detected hand and the set position.

According to the technique of the present disclosure, there is provided the gesture recognition device, the operation method for the gesture recognition device, and the operation program for the gesture recognition device capable of reducing the risk of erroneous determination of the left or right hand of the person to be imaged, which is shown in the image.

BRIEF DESCRIPTION OF THE DRAWINGS

Exemplary embodiments according to the technique of the present disclosure will be described in detail based on the following figures, wherein:

FIG. 4 is a view of the digital camera with the printer as viewed from below;

FIG. 6 is a diagram showing processing of a print image generation unit;

FIG. 7 is a block diagram showing a computer constituting the control device;

FIG. 11 is a diagram showing a detailed configuration of a gesture recognition unit;

FIG. 19 is a diagram showing a state where a joint image is generated from a hand region image;

FIG. 20 is a diagram showing a state where a joint image is generated from a hand region image;

FIG. 23 is a diagram showing a state where a classification result of a gesture type is output from the joint image;

FIG. 26 is a diagram showing a learning phase of the model for type classification;

FIG. 27 is a diagram showing correspondence information;

FIG. 28 is a diagram showing processing of a recognition result output unit;

FIG. 38 is a diagram showing the live view display screen and the guide voice in a case where the remaining number of seconds in an imaging standby period is 3 seconds;

FIG. 41 is a diagram showing a live view display screen and a pseudo shutter sound in a case where an operation to capture the image is performed;

FIG. 42 is a diagram showing a preview display screen and a guide voice in a case where the number of seconds remaining in a print standby period is 10 seconds;

FIG. 46 is a flowchart showing the processing procedure of the control device;

FIG. 47 is a flowchart showing the processing procedure of the digital camera with the printer and the control device;

FIG. 51 is a diagram showing an aspect in which functions of a movement control signal generation unit, an imaging control signal generation unit, and a print control signal generation unit are assigned to the digital camera with the printer; and FIG. 52 is a diagram showing an aspect in which the functions of the face detection unit, the hand detection unit, the gesture recognition unit, the movement control signal generation unit, the imaging control signal generation unit, and the print control signal generation unit are assigned to the digital camera with the printer.

DETAILED DESCRIPTION

Figure 1:
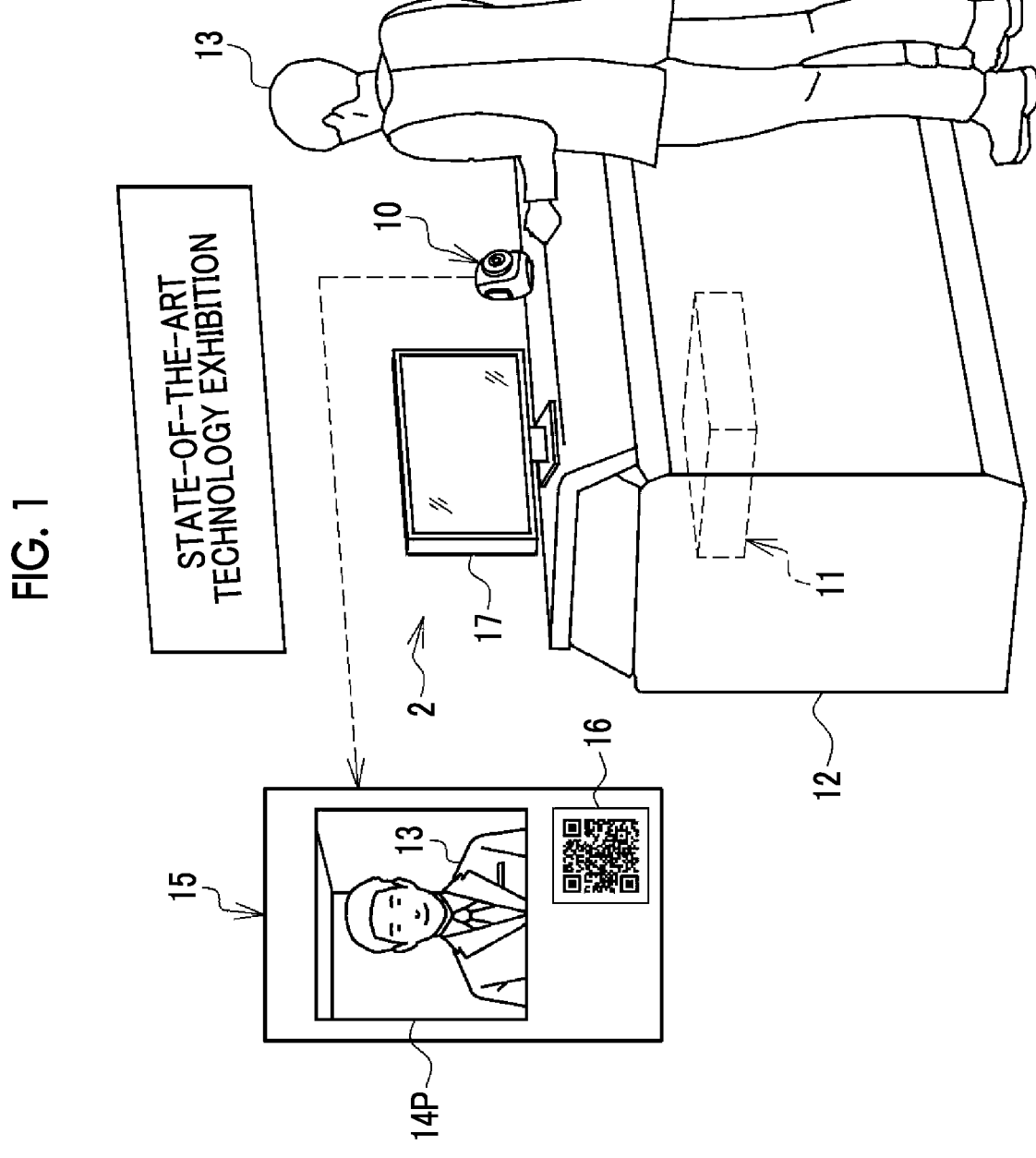
FIG. 1 is a diagram showing an imaging system.

In FIG. 1, an imaging system 2 comprises a digital camera with a printer 10 and a control device 11 and is installed, for example, at an exhibition reception counter 12. The digital camera with the printer 10 is disposed on the reception counter 12. The digital camera with the printer 10 images a face of a participant 13 of the exhibition who visits the reception counter 12 and prints an image 14P obtained by imaging the face on an instant film 15. The digital camera with the printer 10 is an example of "digital camera" according to the technique of the present disclosure. The participant 13 is an example of "person to be imaged" according to the technique of the present disclosure.

A two-dimensional code 16 is printed on the instant film 15 in addition to the image 14P. An entrance pass to the exhibition is registered in the two-dimensional code 16. The participant 13 receives the instant film 15 and holds the two-dimensional code 16 over a code reader of a reception gate (not shown) to enter the exhibition. That is, the instant film 15 serves as an admission ticket for the exhibition.

The control device 11 is connected to the digital camera with the printer 10. The control device 11 is, for example, a desktop personal computer, and a main body of the control device is disposed in the reception counter 12. The control device 11 has a display 17. The display 17 is disposed on the reception counter 12 and next to the digital camera with the printer 10. The display 17 is directed at the participant 13. The control device 11 displays an image (live view image) 14 (refer to FIG. 2), which is sequentially output from the digital camera with the printer 10, in a live view on the display 17 or displays the image 14P to be printed on the instant film 15 as a preview on the display 17 before printing.

Figure 2:
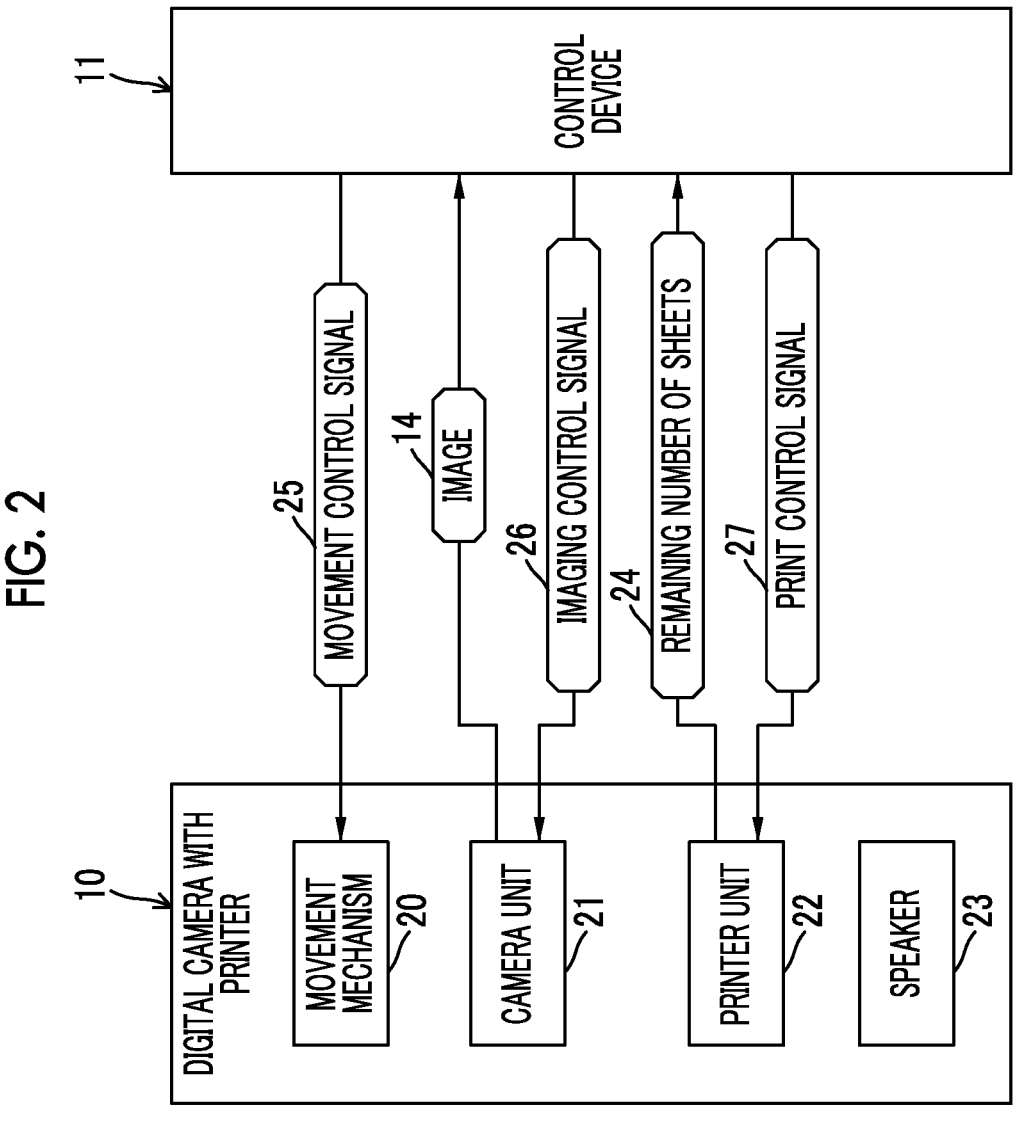
FIG. 2 is a diagram showing information transmitted and received between a digital camera with a printer and a control device.

In FIG. 2, the digital camera with the printer 10 has a movement mechanism 20, a camera unit 21, a printer unit 22, and a speaker 23. The movement mechanism 20 moves the digital camera with the printer 10. With this movement mechanism 20, the digital camera with the printer 10 can autonomously change an imaging range 120 (refer to FIG. 10) of the camera unit 21. That is, the movement mechanism 20 is an example of "imaging range changing mechanism" according to the technique of the present disclosure.

The camera unit 21 images a subject (including participant 13, background wall, and the like) shown in the imaging range 120 and sequentially outputs the image 14 representing the subject. The image 14 output from the camera unit 21 is transmitted to the control device 11. The printer unit 22 prints the image 14P on the instant film 15. The printer unit 22 decrements the number of sheets of the instant film 15 each time the printing ends to count a remaining number of sheets 24 of the instant film 15. The remaining number of sheets 24 counted by the printer unit 22 is transmitted to the control device 11. The speaker 23 outputs various guide voices that guide the participant 13 to a procedure of imaging and printing the image 14P.

The control device 11 transmits a movement control signal 25, an imaging control signal 26, and a print control signal 27 to the digital camera with the printer 10. The movement control signal 25 is a signal for controlling the operation of the movement mechanism 20. The imaging control signal 26 is a signal for controlling the operation of the camera unit 21. The print control signal 27 is a signal for controlling the operation of the printer unit 22.

Figure 3:
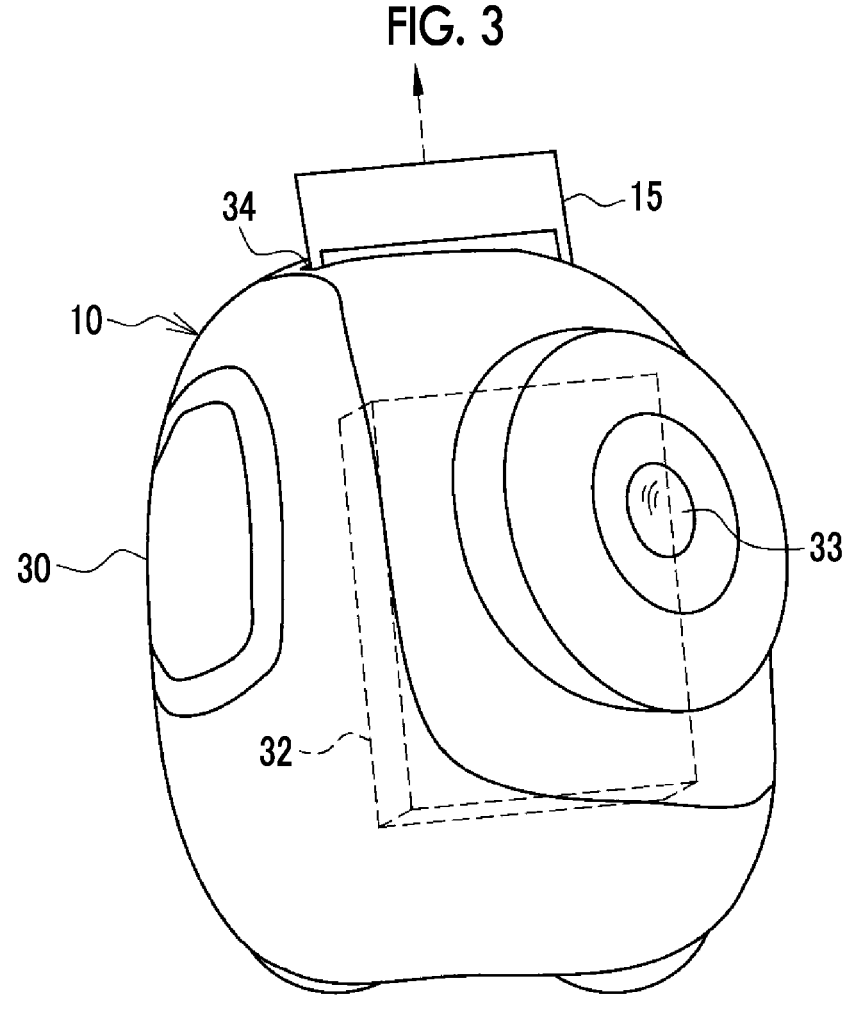
FIG. 3 is a front perspective view of the digital camera with the printer.
Figure 4:
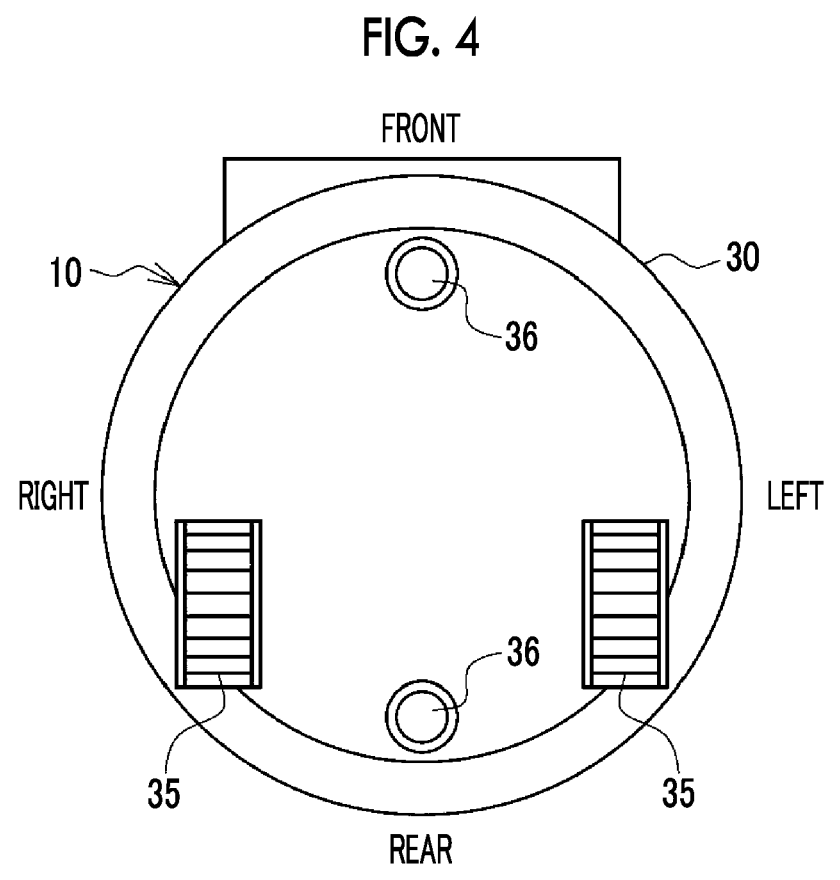

As shown in FIGS. 3 and 4, the digital camera with the printer 10 has a main body 30. The main body 30 has a rounded box shape as a whole, and a film pack 32 of the instant film 15 is interchangeably loaded inside of the main body. The film pack 32 contains a plurality of unused sheets of the instant film 15, for example, 10 sheets.

An imaging lens 33 that captures subject light is disposed in a front of the main body 30. The imaging lens 33 is a single focus lens. A discharge port 34 is formed on an upper part of the main body 30. The instant film 15 on which the image 14P is printed is discharged from the discharge port 34. In the following description, a side to which the imaging lens 33 is disposed is defined as the front of the main body 30.

A pair of wheels 35 and two support balls 36 are attached to a bottom surface of the main body 30. The wheels 35 are disposed at left and right symmetrical positions on a rear part side of the main body 30. The support balls 36 are disposed at front and rear symmetrical positions. The wheels 35 rotate front and rear, and the support balls 36 rotate in accordance with the rotation of the wheels 35. The wheels 35 are steering wheels. The rotation of the wheels 35 and the support balls 36 causes the main body 30 to move front and rear and left and right.

Figure 5:
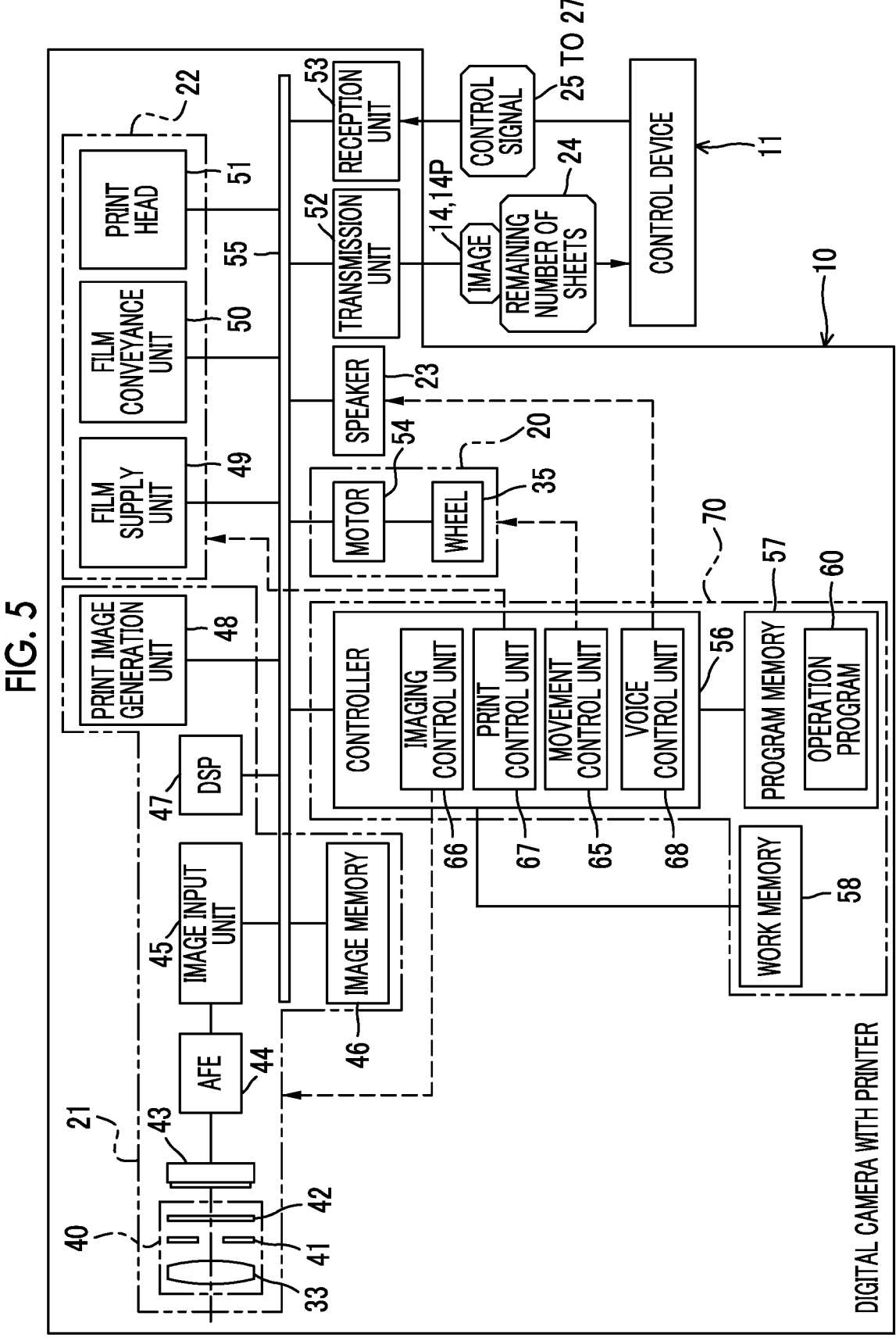
FIG. 5 is a block diagram of the digital camera with the printer.

As shown in FIG. 5, the digital camera with the printer 10 has an imaging optical system 40. The imaging optical system 40 is configured of the above-mentioned imaging lens 33, a stop 41, and a shutter 42. The stop 41 adjusts an amount of the subject light that has passed through the imaging lens 33. The shutter 42 blocks the subject light that has passed through the imaging lens 33.

An imaging element 43 is disposed at a post stage of the imaging optical system 40. As is well known, the imaging element 43 has a configuration in which a plurality of pixels that photoelectrically convert the subject light and convert the subject light into an analog electric signal are disposed on an imaging surface. The imaging element 43 is, for example, a charge-coupled device (CCD) image sensor or a complementary metal-oxide semiconductor (CMOS) image sensor.

An analog signal processing unit (hereinafter abbreviated as analog front end (AFE)) 44 is connected to the imaging element 43. The imaging element 43 outputs the analog electric signal obtained by photoelectrically converting the subject light to the AFE 44 according to a predetermined frame rate. The AFE 44 performs various kinds of analog signal processing such as sampling two correlation pile processing and amplification processing on the analog electric signal and then performs analog-to-digital (A/D) conversion processing that converts the analog electric signal into a digital electric signal. In a case where the imaging element 43 is the CMOS image sensor, the AFE 44 is built in the imaging element 43.

The digital camera with the printer 10 comprises an image input unit 45, an image memory 46, a digital signal processing unit (hereinafter abbreviated as digital signal processor (DSP)) 47, a print image generation unit 48, a film supply unit 49, a film conveyance unit 50, a print head 51, a transmission unit 52, a reception unit 53, a motor 54, and the like. The image input unit 45, the image memory 46, the DSP 47, the print image generation unit 48, the film supply unit 49, the film conveyance unit 50, the print head 51, the transmission unit 52, the reception unit 53, the motor 54, and the like are connected to a controller 56 via a bus line 55. The speaker 23 described above is also connected to the bus line 55.

The image input unit 45 captures the digital electric signal from the AFE 44 as the image 14. The image input unit 45 stores the captured image 14 in the image memory 46. The image memory 46 can store images 14 for a plurality of frames.

The DSP 47 reads out the image 14 from the image memory 46. The DSP 47 performs, on the readout image 14, various kinds of digital signal processing such as defect pixel correction processing, offset correction processing, gain correction processing, linear matrix processing, white balance correction processing, gamma correction processing, demosaic processing, and YC (Y is brightness and C is color difference) conversion processing. The DSP 47 stores the processed image 14 in the image memory 46 and outputs the processed image to the transmission unit 52. The transmission unit 52 transmits the image 14 to the control device 11.

The print image generation unit 48 generates the image 14P from the processed image 14 stored in the image memory 46. The print image generation unit 48 stores the generated image 14P in the image memory 46 and outputs the generated image to the transmission unit 52. The transmission unit 52 transmits the image 14P to the control device 11. The imaging optical system 40, the imaging element 43, the AFE 44, the image input unit 45, the image memory 46, the DSP 47, and the print image generation unit 48 constitute the camera unit 21.

The film supply unit 49 sends out one sheet of the instant film 15 from the film pack 32 and supplies the sent instant film 15 to the print head 51. The film conveyance unit 50 conveys one sheet of the instant film 15 sent from the film pack 32 by the film supply unit 49 toward the discharge port 34.

The print head 51 prints the image 14P on the instant film 15. The print head 51 is configured of, for example, a line-type exposure head. The print head 51 reads out the image 14P from the image memory 46. The print head 51 records the image 14P line by line on the instant film 15 conveyed by the film conveyance unit 50. The film supply unit 49, the film conveyance unit 50, and the print head 51 constitute the printer unit 22.

The printer unit 22 outputs the remaining number of sheets 24 to the transmission unit 52 each time the instant film 15 is consumed for the printing of the image 14P. The transmission unit 52 transmits the remaining number of sheets 24 to the control device 11.

The reception unit 53 receives the movement control signal 25, the imaging control signal 26, and the print control signal 27. The reception unit 53 outputs the received movement control signal 25, imaging control signal 26, and print control signal 27 to the controller 56.

The motor 54 rotates the wheels 35 front and rear and left and right. The motor 54 and the wheels 35 constitute the movement mechanism 20.

The controller 56 is, for example, a micro-processing unit (MPU) and controls the entire operation of the digital camera with the printer 10. A program memory 57 and a work memory 58 are connected to the controller 56. An operation program 60 is stored in the program memory 57. The operation program 60 is an example of "operation program for gesture recognition device" according to the technique of the present disclosure.

The work memory 58 is a memory for work for the controller 56 to execute processing. The controller 56 loads the operation program 60 stored in the program memory 57 into the work memory 58 and executes the processing according to the operation program 60. Accordingly, the controller 56 functions as a movement control unit 65, an imaging control unit 66, a print control unit 67, and a voice control unit 68. The controller 56 is an example of "processor" according to the technique of the present disclosure. Further, a computer 70 configured of the controller 56, the program memory 57, and the work memory 58 is an example of "gesture recognition device" according to the technique of the present disclosure.

The movement control unit 65 controls the operation of the movement mechanism 20, specifically, the motor 54, based on the movement control signal 25 from the control device 11. The imaging control unit 66 controls the operation of the camera unit 21 based on the imaging control signal 26 from the control device 11. Specifically, the imaging control signal 26 represents an instruction to image the image 14P, and the imaging control unit 66 causes, in a case where the imaging control signal 26 is received, the camera unit 21 to perform an imaging operation of outputting the image 14P. The movement control unit 65 and the imaging control unit 66 are examples of "control unit" according to the technique of the present disclosure.

The print control unit 67 controls the operation of the printer unit 22 based on the print control signal 27 from the control device 11. The print control signal 27 includes a signal representing an instruction to print the image 14P and a signal representing an instruction to stop printing the image 14P. The print control unit 67 causes, in a case where the print control signal 27 representing the instruction to print the image 14P is received, the printer unit 22 to print the image 14P. On the contrary, in a case where the print control signal 27 representing the instruction to stop printing the image 14P is received, the print control unit 67 instructs the printer unit 22 to stop printing the image 14P. The voice control unit 68 controls the operation of the speaker 23.

Figure 6:
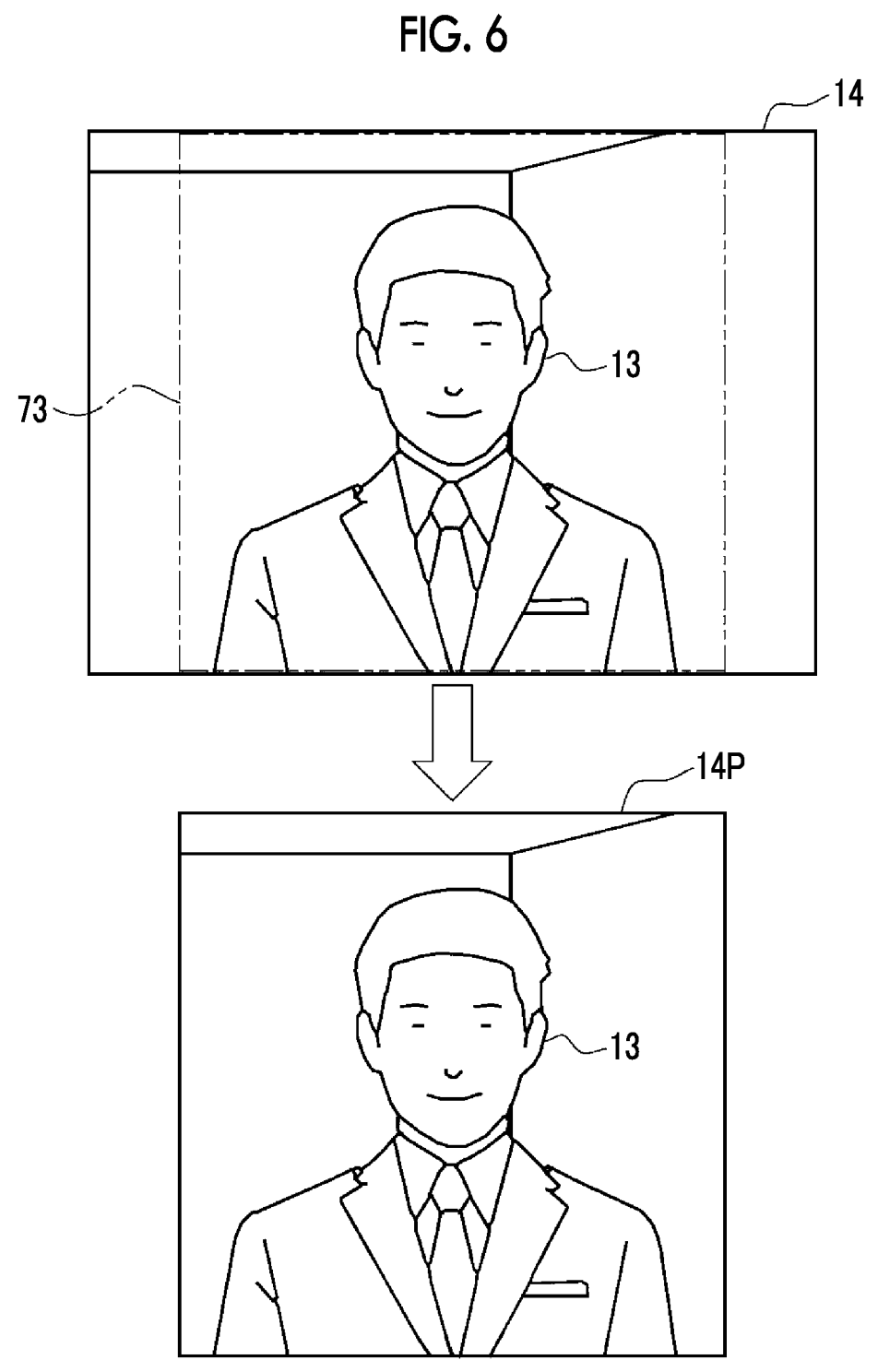

As shown in FIG. 6, the image 14 has a rectangular shape with an aspect ratio of, for example, 4:3. A partial region of the image 14 is a print region 73 of the printer unit 22. The print region 73 has a square shape with an aspect ratio of 1:1. A length of a side of the print region 73 matches a length of a short side of the image 14, and a center of the print region 73 matches a center of the image 14. The print image generation unit 48 cuts out the print region 73 from the processed image 14 stored in the image memory 46 to generate the image 14P. Therefore, the image 14P is an image excluding regions at both left and right ends of the image 14.

Figure 7:
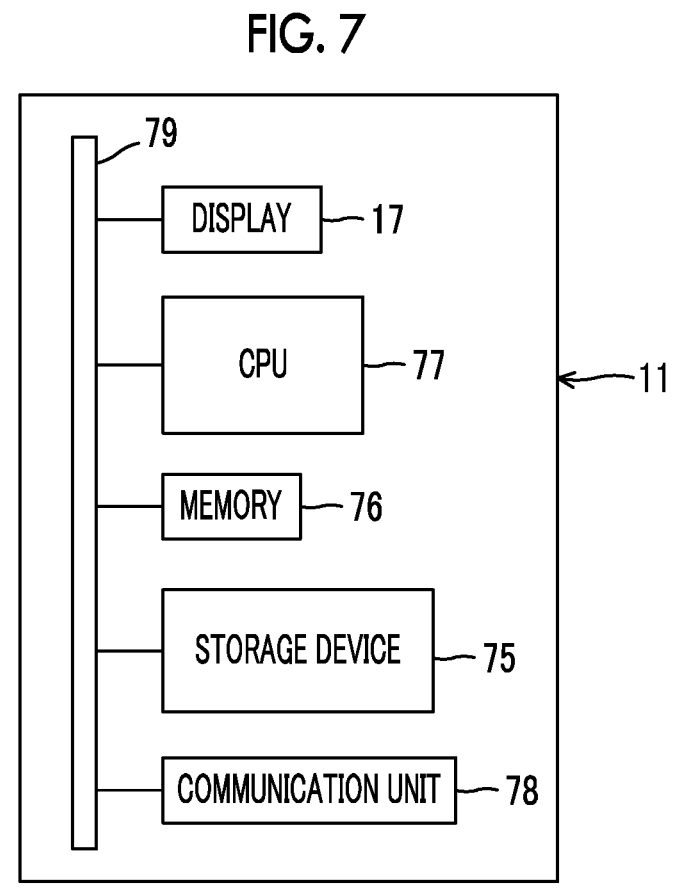

In FIG. 7, the computer constituting the control device 11 comprises a storage device 75, a memory 76, a central processing unit (CPU) 77, and a communication unit 78 in addition to the display 17 described above. The above parts are interconnected through a bus line 79.

The storage device 75 is, for example, a hard disk drive or a solid state drive built in the computer constituting the control device 11. The storage device 75 stores a control program such as an operating system, various application programs, and various kinds of data and the like accompanied by these programs.

The memory 76 is a memory for work for the CPU 77 to execute processing. The CPU 77 loads the program stored in the storage device 75 into the memory 76 and executes the processing according to the program to integrally control the respective components of the computer. The communication unit 78 is an interface that controls transmission of various kinds of information with the digital camera with the printer 10 and the like.

Figure 8:
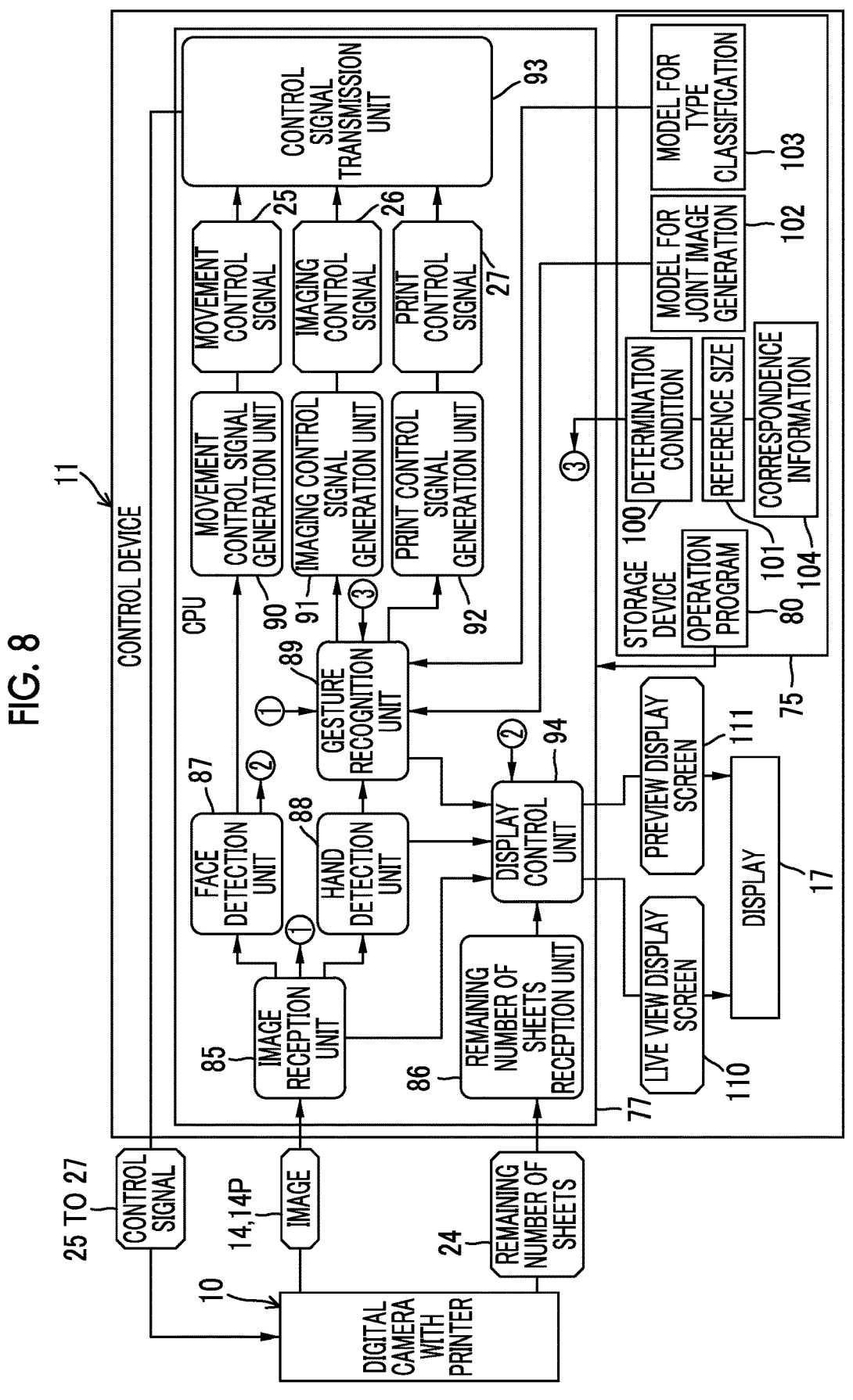
FIG. 8 is a block diagram of the control device.

In FIG. 8, the storage device 75 stores an operation program 80. The operation program 80 is a program causing the computer constituting the control device 11 to operate as "gesture recognition device" according to the technique of the present disclosure. That is, the operation program 80 is an example of "operation program for gesture recognition device" according to the technique of the present disclosure, like the operation program 60. Further, the control device 11 is an example of "gesture recognition device" according to the technique of the present disclosure.

In a case where the operation program 80 is activated, the CPU 77 of the control device 11 cooperates with the memory 76 and the like to function as an image reception unit 85, a remaining number of sheets reception unit 86, a face detection unit 87, a hand detection unit 88, a gesture recognition unit 89, a movement control signal generation unit 90, an imaging control signal generation unit 91, a print control signal generation unit 92, a control signal transmission unit 93, and a display control unit 94. The CPU 77 is an example of "processor" according to the technique of the present disclosure.

The image reception unit 85 receives the images 14 and 14P from the digital camera with the printer 10. The image reception unit 85 outputs the received image 14 to the face detection unit 87, the hand detection unit 88, the gesture recognition unit 89, and the display control unit 94. Further, the image reception unit 85 outputs the received image 14P to the display control unit 94.

The remaining number of sheets reception unit 86 receives the remaining number of sheets 24 from the digital camera with the printer 10. The remaining number of sheets reception unit 86 outputs the received remaining number of sheets 24 to the display control unit 94.

The face detection unit 87 detects the face of the participant 13 from the image 14 by using a well-known image recognition technique such as a machine learning model for object detection such as single shot multibox detector (SSD). The face detection unit 87 outputs a face detection result to the movement control signal generation unit 90 and the display control unit 94.

Similarly to the face detection unit 87, the hand detection unit 88 detects a hand of the participant 13 from the image 14 by using a well-known image recognition technique such as a machine learning model for object detection such as SSD. The hand detection unit 88 outputs a hand detection result 140 (refer to FIG. 11) to the gesture recognition unit 89 and the display control unit 94.

The gesture recognition unit 89 recognizes a gesture represented by the hand of the participant 13. The gesture recognition unit 89 uses, in a case of the gesture recognition, a determination condition 100, a reference size 101, a model for joint image generation 102, a model for type classification 103, and a correspondence information 104, which are stored in the storage device 75. The gesture recognition unit 89 outputs a gesture recognition result 143 (refer to FIG. 11) to the imaging control signal generation unit 91, the print control signal generation unit 92, and the display control unit 94.

The movement control signal generation unit 90 generates the movement control signal 25 based on the face detection result from the face detection unit 87. The movement control signal generation unit 90 outputs the movement control signal 25 to the control signal transmission unit 93.

The imaging control signal generation unit 91 generates the imaging control signal 26 based on the gesture recognition result 143 from the gesture recognition unit 89. The imaging control signal generation unit 91 outputs the imaging control signal 26 to the control signal transmission unit 93.

The print control signal generation unit 92 generates the print control signal 27 based on the gesture recognition result 143 from the gesture recognition unit 89. The print control signal generation unit 92 outputs the print control signal 27 to the control signal transmission unit 93.

The control signal transmission unit 93 transmits the movement control signal 25, the imaging control signal 26, and the print control signal 27 to the digital camera with the printer 10.

The display control unit 94 controls the display of various screens on the display 17. Various screens include a live view display screen 110 (refer to FIG. 33 and the like) for displaying the image 14 in a live view and a preview display screen 111 (refer to FIG. 42 and the like) for displaying the image 14P as a preview before the printing.

Figure 9:
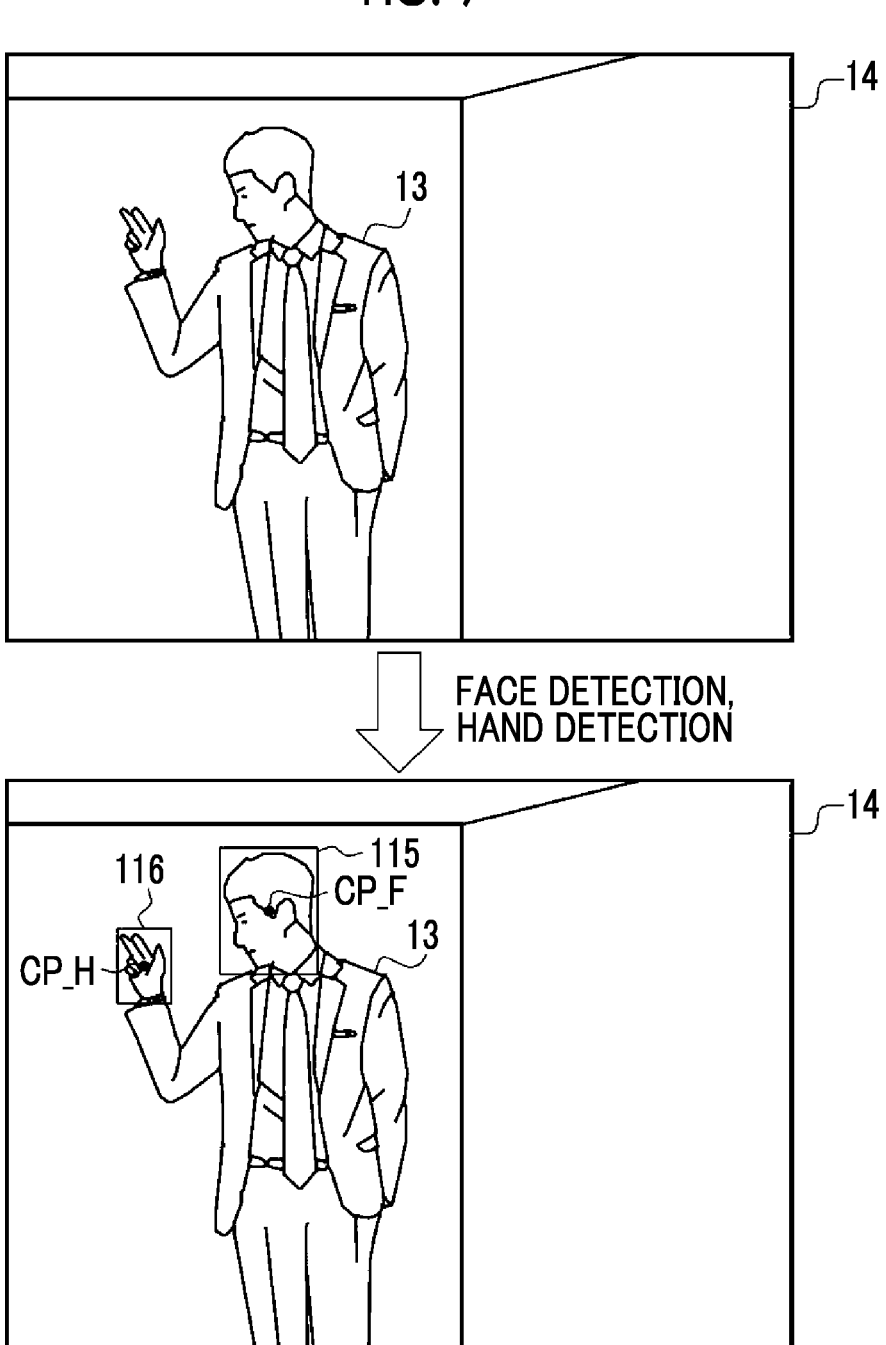
FIG. 9 is a diagram showing processing of a face detection unit and a hand detection unit.

As shown in FIG. 9, the face detection unit 87 outputs position information of a rectangular region (hereinafter referred to as face detection region) 115 that surrounds the face of the participant 13 with almost no margin as the face detection result. The position information of the face detection region 115 is, for example, position coordinates of a center CP_F of the face detection region 115. A size of the face detection region 115 changes according to a size of the face shown in the image 14.

The hand detection unit 88 outputs a rectangular region (hereinafter referred to as hand detection region) 116 that surrounds the hand of the participant 13 with almost no margin and position information of the hand detection region 116 as the hand detection result 140. The position information of the hand detection region 116 is, for example, position coordinates of a center CP_H of the hand detection region 116. Similarly to the face detection region 115, a size of the hand detection region 116 also changes according to a size of the hand shown in the image 14.

Figure 10:
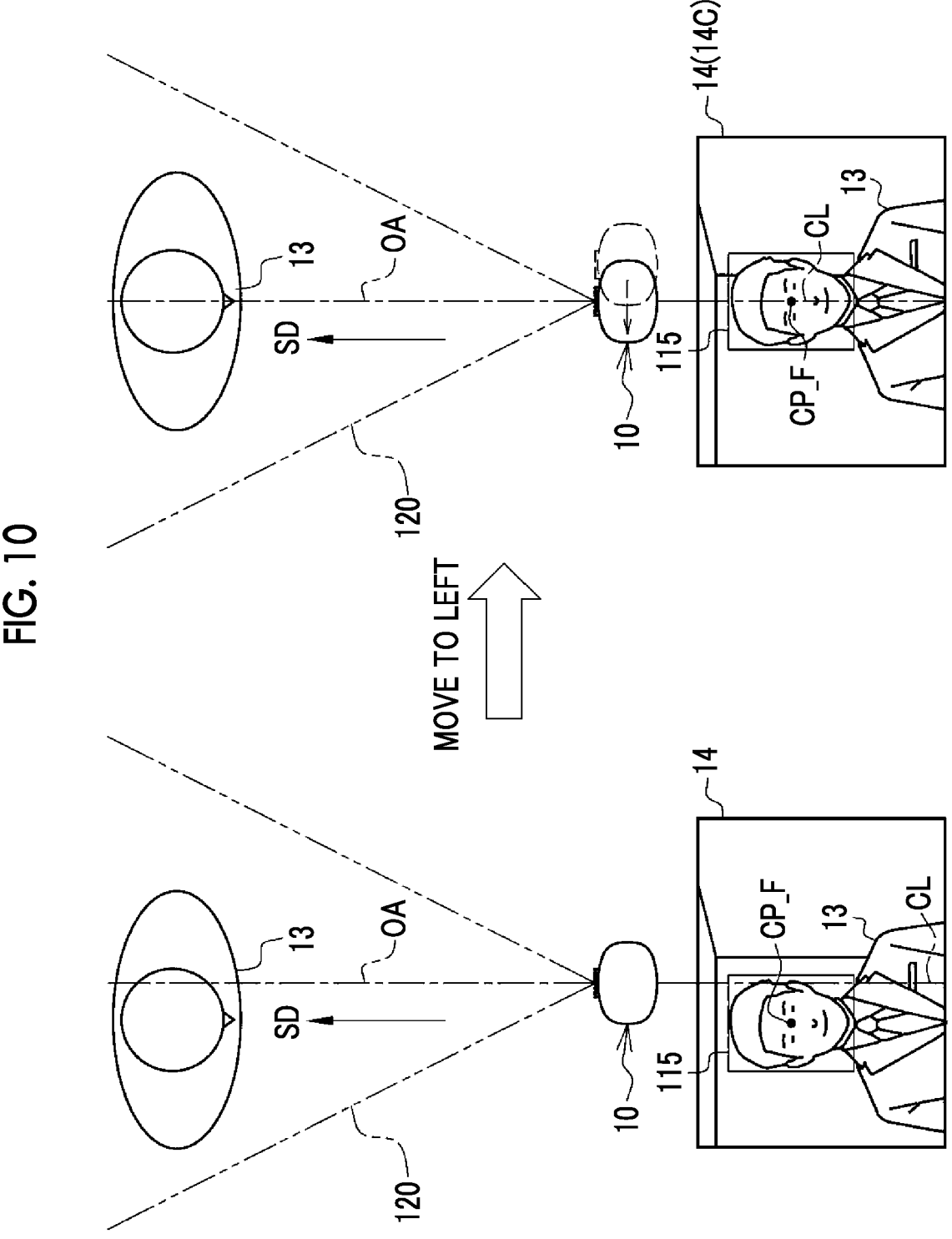
FIG. 10 is a diagram showing a state where an imaging range of a camera unit is changed to set a face position to a center position of an image.

As shown on a left side of an arrow in FIG. 10, in a case where the center CP_F of the face detection region 115 deviates from a center line CL of a long side of the image 14, the movement control signal generation unit 90 generates the movement control signal 25 for matching the center CP_F and the center line CL. In response to the movement control signal 25, the movement control unit 65 operates the movement mechanism 20 to move the digital camera with the printer 10 such that the center CP_F matches the center line CL as shown on a right side of the arrow. That is, with the control of the operation of the movement mechanism 20 to change the imaging range 120 of the camera unit 21, the movement control unit 65 sets the position of the face of the participant 13 to the center position of the image 14.

FIG. 10 shows an example in which the center CP_F of the face detection region 115 deviates to a left side with respect to the center line CL of the image 14 and the digital camera with the printer 10 is moved to the left in order to match the center and the center line. The center line CL is an example of "set position" and "center position of image" according to the technique of the present disclosure. Further, the image 14 captured in a state where the face position of the participant 13 is set to the set position is an example of "proper face position image" according to the technique of the present disclosure. Hereinafter, the image 14 captured in a state where the face position of the participant 13 is set to the set position is denoted as a proper face position image 14C. A reference numeral OA indicates an optical axis of the imaging optical system 40. A reference numeral SD and an arrow indicate an imaging direction of the digital camera with the printer 10. The imaging direction SD is a direction parallel to the optical axis OA and perpendicular to the imaging surface on which the pixels of the imaging element 43 are arranged.

The movement control signal generation unit 90 generates the movement control signal 25 in a case where the participant 13 stands at a predetermined imaging position and the face detection region 115 has a predetermined set size. The imaging position is indicated by, for example, a foot-shaped sheet laid in front of the reception counter 12.

Figure 11:
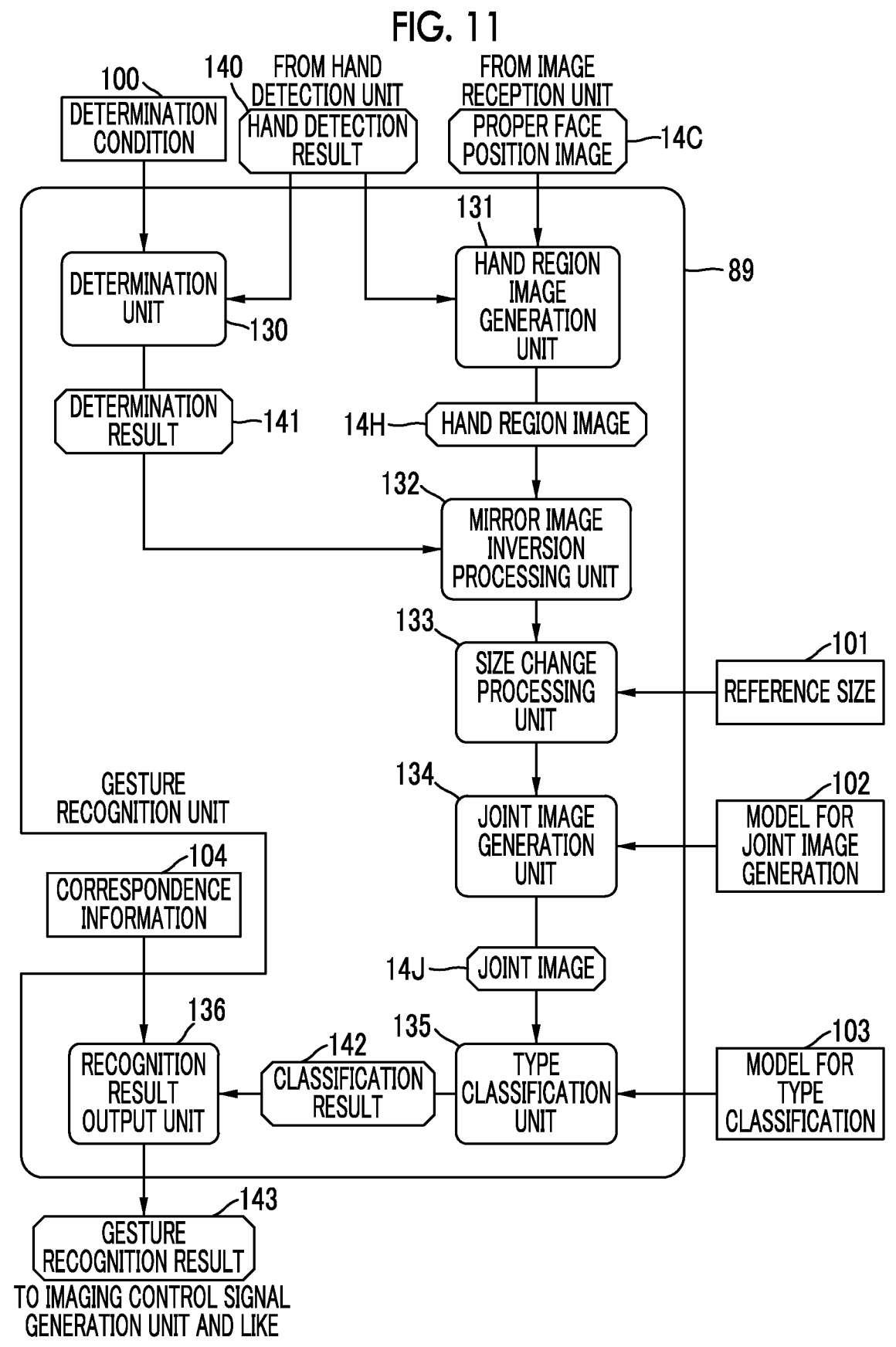

In FIG. 11, the gesture recognition unit 89 has a determination unit 130, a hand region image generation unit 131, a mirror-image inversion processing unit 132, a size change processing unit 133, a joint image generation unit 134, a type classification unit 135, and a recognition result output unit 136.

The hand detection result 140 from the hand detection unit 88 is input to the determination unit 130. Based on the determination condition 100, the determination unit 130 determines whether the hand of the participant 13 detected by the hand detection unit 88 is the right hand or the left hand. The determination unit 130 outputs the determination result 141 to the mirror-image inversion processing unit 132.

The proper face position image 14C from the image reception unit 85 and the hand detection result 140 from the hand detection unit 88 are input to the hand region image generation unit 131. The hand region image generation unit

Figure 14:
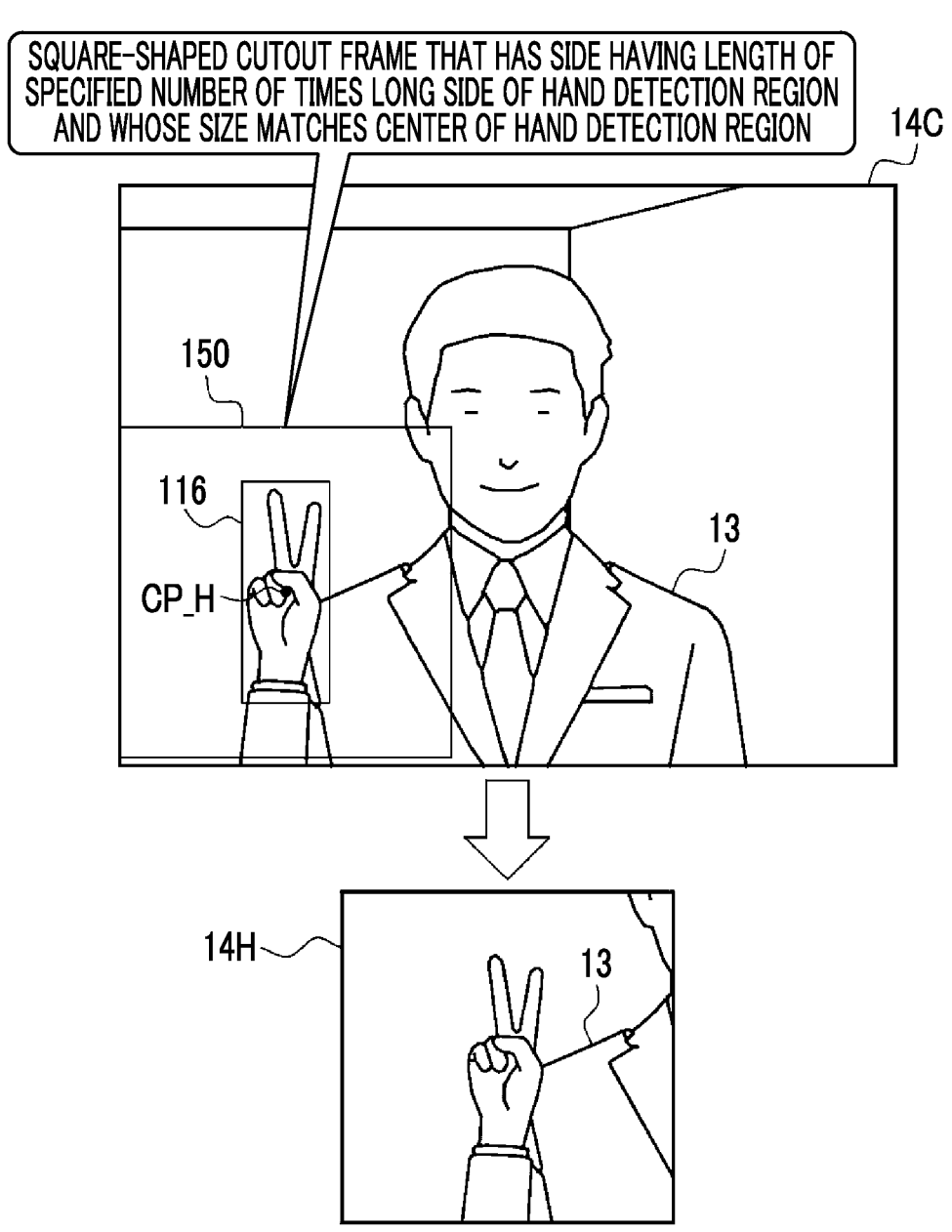
FIG. 14 is a diagram showing a state where a hand region image is generated.

131 cuts out the rectangular region surrounding the hand detection region 116 from the proper face position image 14C to generate a hand region image 14H (refer to also FIG. 14). The hand region image generation unit 131 outputs the hand region image 14H to the mirror-image inversion processing unit 132.

The mirror-image inversion processing unit 132 performs mirror-image inversion processing on the hand region image 14H. The mirror-image inversion processing unit 132 outputs the hand region image 14H subjected to the mirror-image inversion processing to the size change processing unit 133.

The size change processing unit 133 performs size change processing of changing the size of the hand region image 14H to set the hand shown in the hand region image 14H to the predetermined set size. The size change processing unit 133 outputs the hand region image 14H subjected to the size change processing to the joint image generation unit 134.

The joint image generation unit 134 generates a joint image 14J obtained by extracting a hand joint from the hand region image 14H subjected to the size change processing, using the model for joint image generation 102. The joint image generation unit 134 outputs the joint image 14J to the type classification unit 135. The model for joint image generation 102 is, for example, a model using convolutional pose machines. The model for joint image generation 102 is an example of "first machine learning model" according to the technique of the present disclosure.

The type classification unit 135 classifies gesture types based on the joint image 14J, using the model for type classification 103. The type classification unit 135 outputs a classification result 142 to the recognition result output unit 136. The model for type classification 103 is, for example, a model using a visual growth group (VGG) 16 learned by ImageNet. The model for type classification 103 is an example of "second machine learning model" according to the technique of the present disclosure.

The recognition result output unit 136 recognizes the gesture based on the correspondence information 104 and the classification result 142. The recognition result output unit 136 outputs the gesture recognition result 143 to the imaging control signal generation unit 91, the print control signal generation unit 92, and the display control unit 94.

Figures 12, 13:
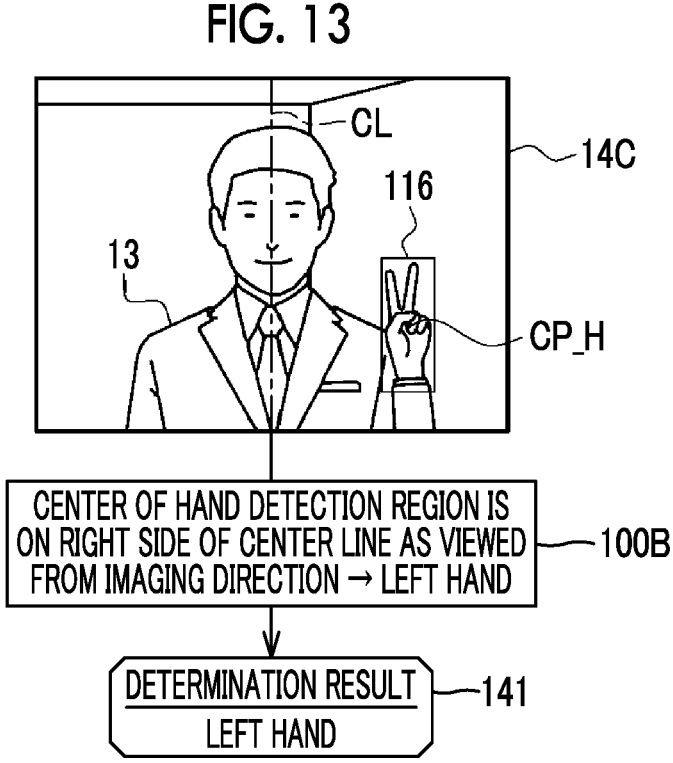
FIG. 12 is a diagram showing a state where a determination unit determines whether a detected hand is the right hand or the left hand.
FIG. 13 is a diagram showing a state where the determination unit determines whether a detected hand is the right hand or the left hand.

As shown in FIG. 12, in a case where the center CP_H of the hand detection region 116 is on a left side of the center line CL as viewed from the imaging direction SD, the determination unit 130 determines that the detected hand is the right hand according to a determination condition 100A. On the other hand, as shown in FIG. 13, in a case where the center CP_H of the hand detection region 116 is on a right side of the center line CL as viewed from the imaging direction SD, the determination unit 130 determines that the detected hand is the left hand according to a determination condition 100B.

As shown in FIG. 14, the hand region image generation unit 131 cuts out the proper face position image 14C according to a cutout frame 150 having a square shape to obtain the hand region image 14H. The cutout frame 150 has a side having a length of a specified number of times, for example, 1.5 times to 2 times a long side of the hand detection region 116. A center of the cutout frame 150 matches the center CP_H of the hand detection region 116. That is, the hand region image generation unit 131 cuts out the hand region image 14H from the proper face position image 14C by matching the center of the hand and the center of the image and providing a margin around the hand. In a case where the cutout frame 150 protrudes from the proper face position image 14C, a pixel value for the protruding portion is replaced with black.

Figure 15:
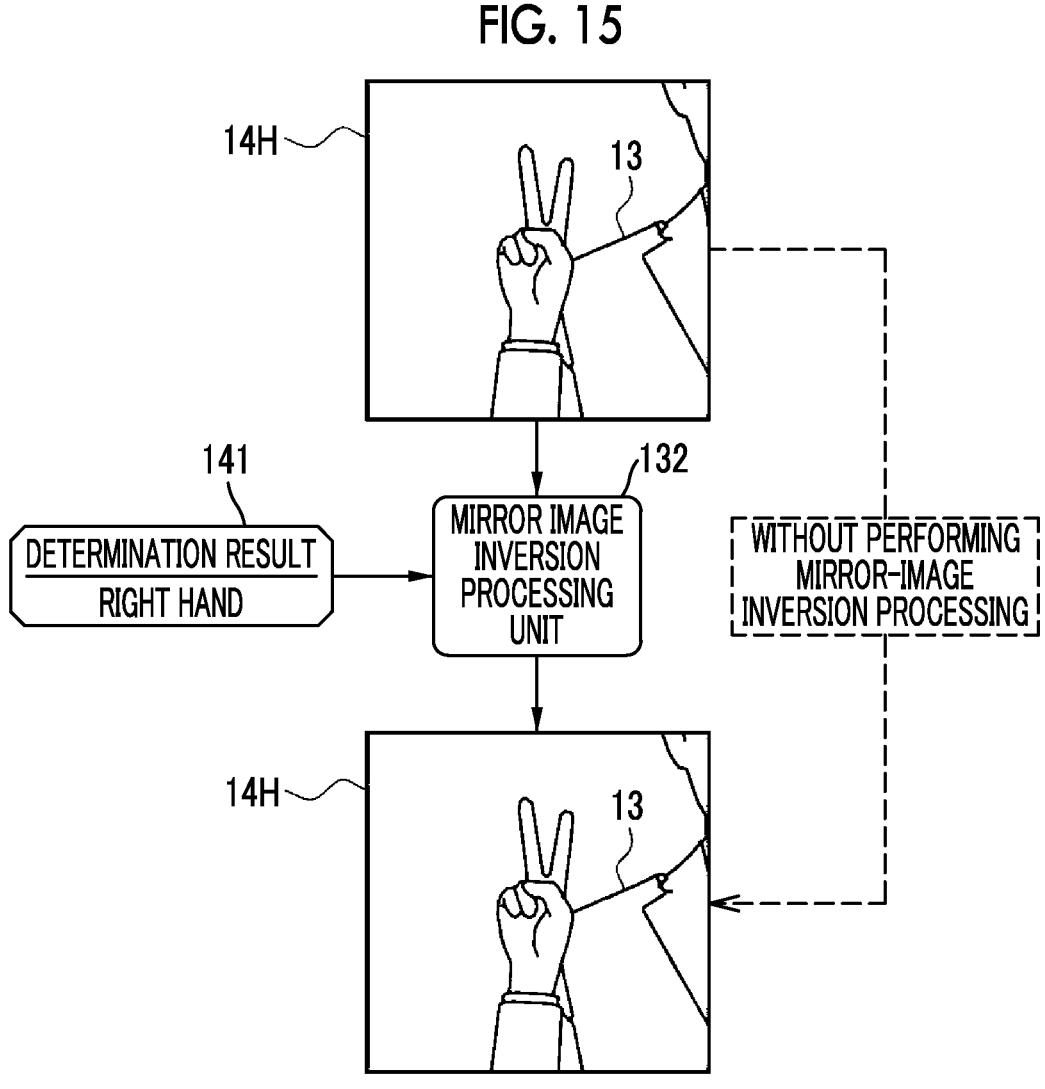
FIG. 15 is a diagram showing a state where mirror-image inversion processing is not performed by a mirror-image inversion processing unit in a case where the detected hand is the right hand.
Figure 16:
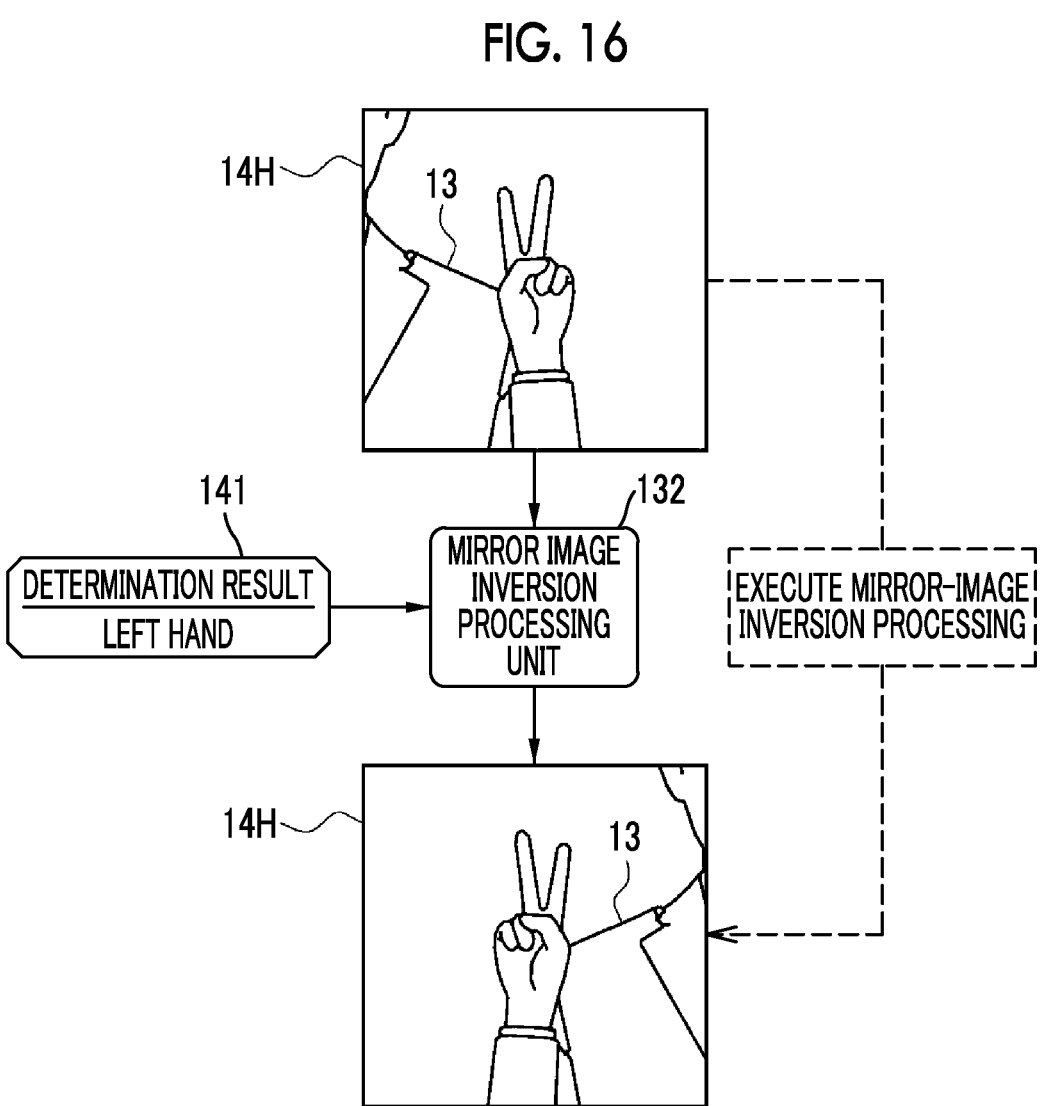
FIG. 16 is a diagram showing a state where the mirror-image inversion processing is performed by the mirror-image inversion processing unit in a case where the detected hand is the left hand.

As shown in FIG. 15, in a case where the determination result from the determination unit 130 is the right hand, the mirror-image inversion processing unit 132 does not perform the mirror-image inversion processing and outputs the hand region image 14H from the hand region image generation unit 131 to the size change processing unit 133 as it is. On the other hand, as shown in FIG. 16, in a case where the determination result from the determination unit 130 is the left hand, the mirror-image inversion processing unit 132 performs the mirror-image inversion processing on the hand region image 14H from the hand region image generation unit 131 and then outputs the processed hand region image to the size change processing unit 133. That is, in this case, the right hand is an example of "predetermined one hand" according to the technique of the present disclosure. On the contrary, the left hand may be the "predetermined one hand".

In a case where the size of the hand region image 14H from the mirror-image inversion processing unit 132 is the reference size 101, the size change processing unit 133 does not perform the size change processing and outputs the hand region image 14H from the mirror-image inversion processing unit 132 to the joint image generation unit 134 as it is. The reference size 101 is a size of the hand region image 14H for setting the hand shown in the hand region image 14H to the predetermined set size. The set size is a hand size suitable for generating the joint image 14J with high accuracy.

Figure 17:
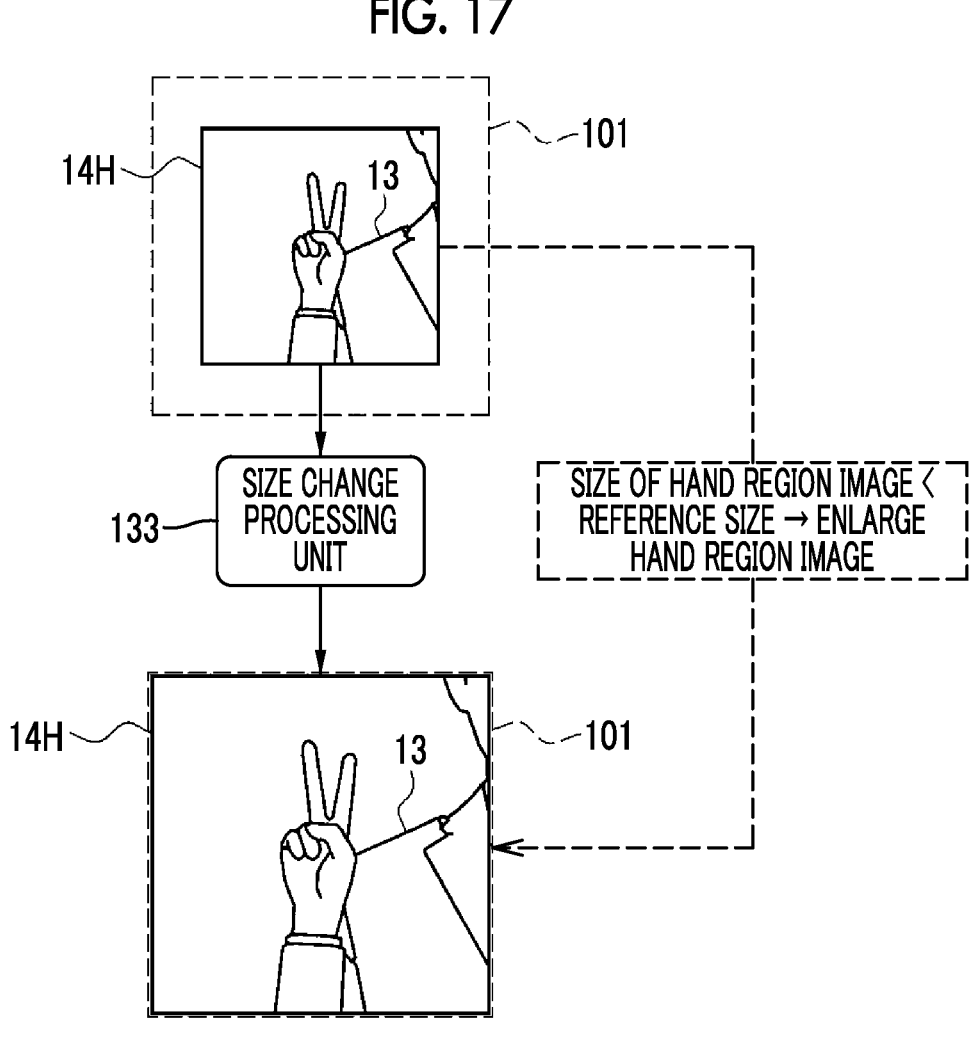
FIG. 17 is a diagram showing a state of size change processing by a size change processing unit.
Figure 18:
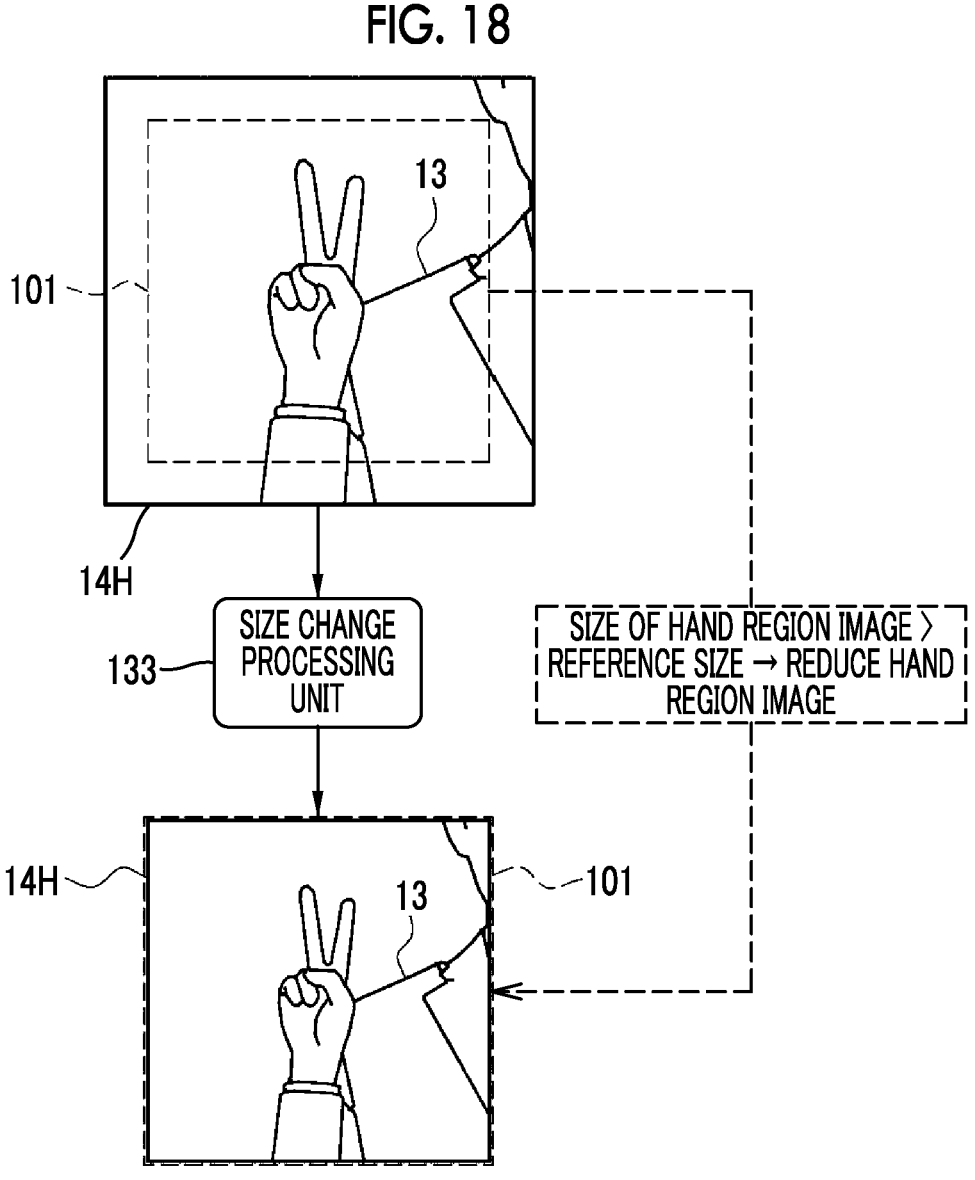
FIG. 18 is a diagram showing a state of the size change processing by the size change processing unit.

As shown in FIG. 17, in a case where the size of the hand region image 14H from the mirror-image inversion processing unit 132 is smaller than the reference size 101, the size change processing unit 133 enlarges the hand region image 14H from the mirror-image inversion processing unit 132 to the reference size 101. On the other hand, as shown in FIG. 18, in a case where the size of the hand region image 14H from the mirror-image inversion processing unit 132 is larger than the reference size 101, the size change processing unit 133 reduces the hand region image 14H from the mirror-image inversion processing unit 132 to the reference size 101.

Figure 19:
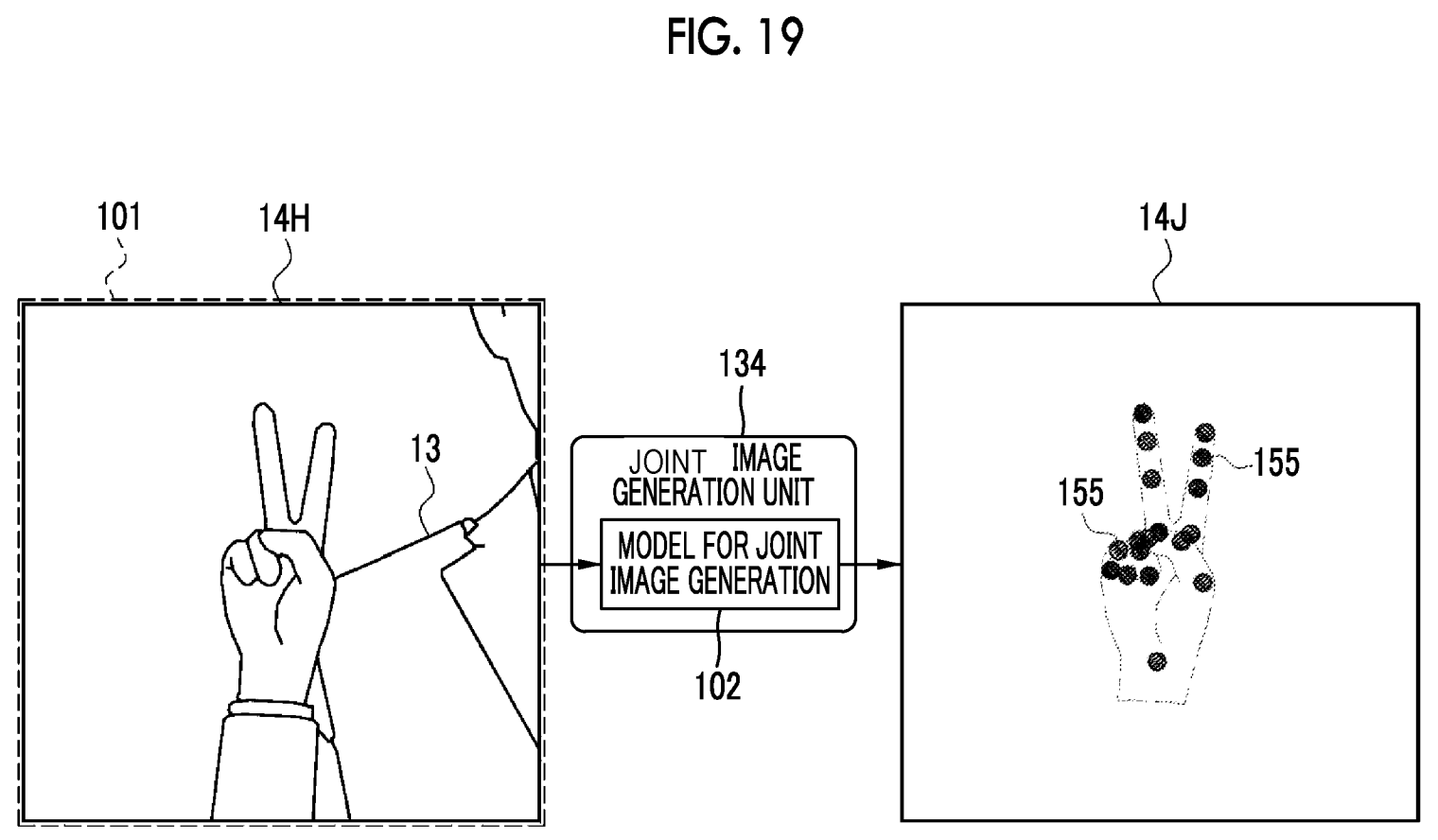
Figure 20:
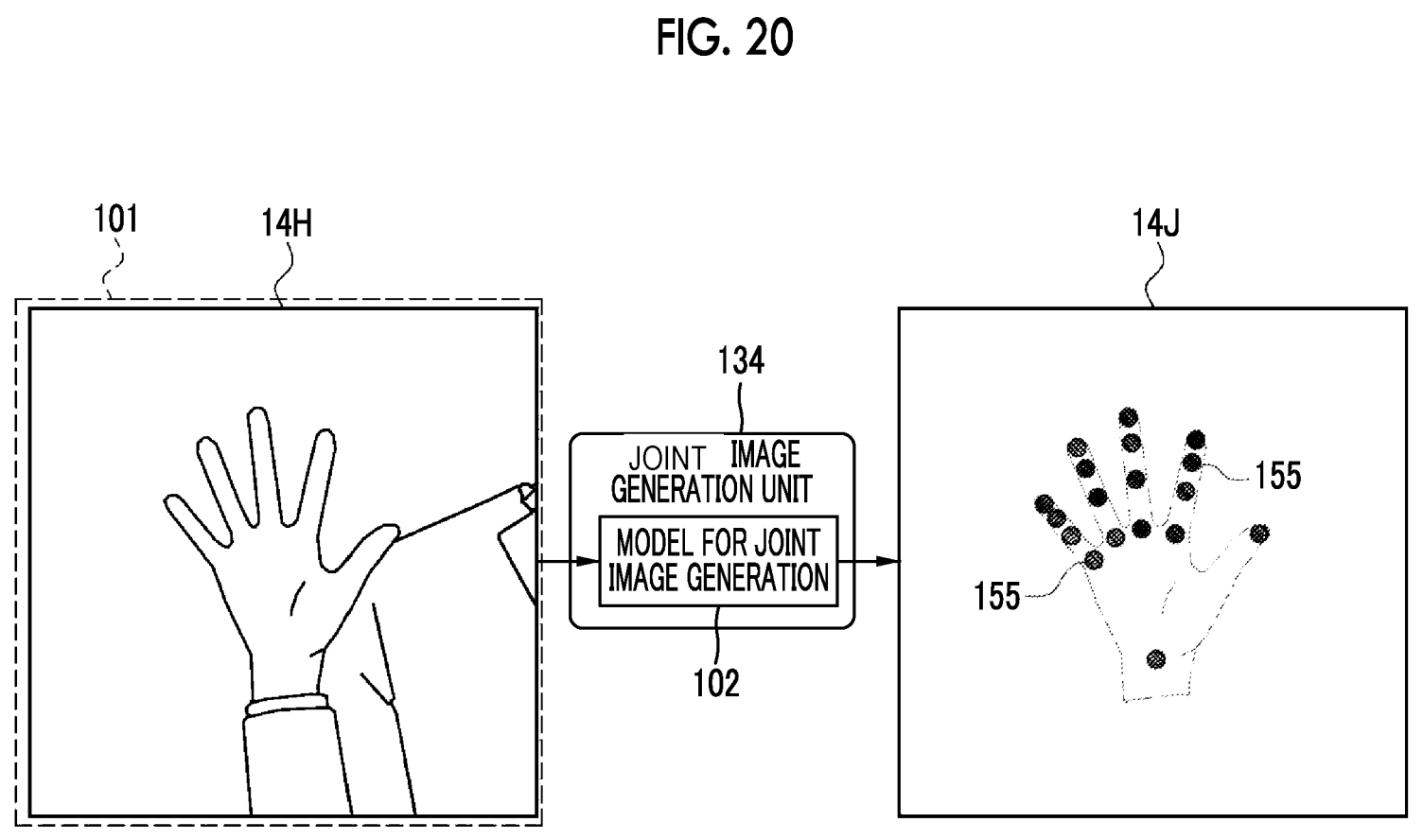

As shown in FIGS. 19 and 20, the joint image generation unit 134 inputs the hand region image 14H subjected to the size change processing to the model for joint image generation 102 as input data. Accordingly, the joint image 14J is output as output data from the model for joint image generation 102. The joint image 14J is an image in which markers 155 are assigned to fingertip positions and joint positions of the hand, which are extracted by the model for joint image generation 102. In FIGS. 19 and 20, the hand is shown by a broken line in the joint image 14J. However, in reality, the joint image 14J is an image in which only the markers 155 are displayed. The same applies to subsequent FIG. 21 and the like.

FIG. 19 shows a gesture of pointing a palm side toward the digital camera with the printer 10 in a state where the index finger and the middle finger are raised and the other fingers are bent. In the following, the gesture shown in FIG. 19 is referred to as a V sign.

FIG. 20 shows a gesture of pointing the palm side toward the digital camera with the printer 10 in a state where all fingers are spread out. In the following, the gesture shown in FIG. 20 is referred to as a stop sign.

Figure 21:
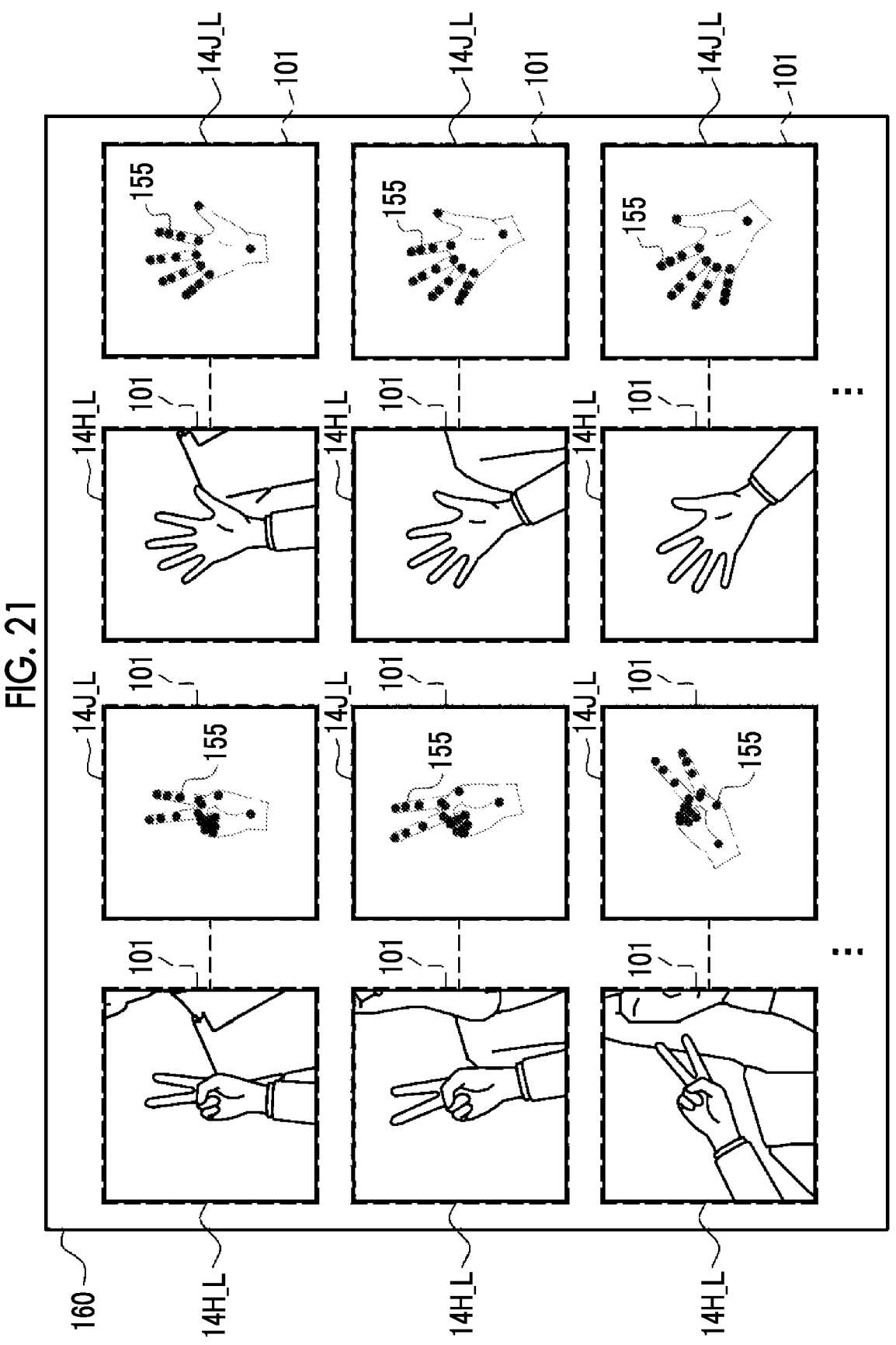
FIG. 21 is a diagram showing data for learning of a model for joint image generation.

FIG. 21 shows data for learning 160 of the model for joint image generation 102. The data for learning 160 is provided to the model for joint image generation 102 in a learning phase of the model for joint image generation 102 (refer to FIG. 22). The data for learning 160 has a plurality of sets of a hand region image for learning 14H_L and a joint image for learning 14J_L. All hand region images for learning 14H_L have the reference size 101. The right hand, which is the "predetermined one hand", is shown in all the hand region images for learning 14H_L. Further, the right hands shown in the hand region images for learning 14H_L are not in exactly the same posture, but have different postures due to fingertips pointing upward or diagonally. The hand region images for learning 14H_L include an image with the V sign on the right hand, an image with the stop sign on the right hand, and images with gestures other than the above signs on the right hand (not shown).

The joint image for learning 14J_L is an image in which a creator of the model for joint image generation 102 assigns markers 155 to the hand region image for learning 14H_L, which is paired with the joint image for learning 14J_L. The joint image for learning 14J_L is an image for so-called answer matching with the joint image 14J output from the model for joint image generation 102 according to the hand region image for learning 14H_L and is compared with the joint image 14J. A probability that the joint image for learning 14L_L matches the joint image 14J becomes higher as joint extraction accuracy of the model for joint image generation 102 is higher.

Figure 22:
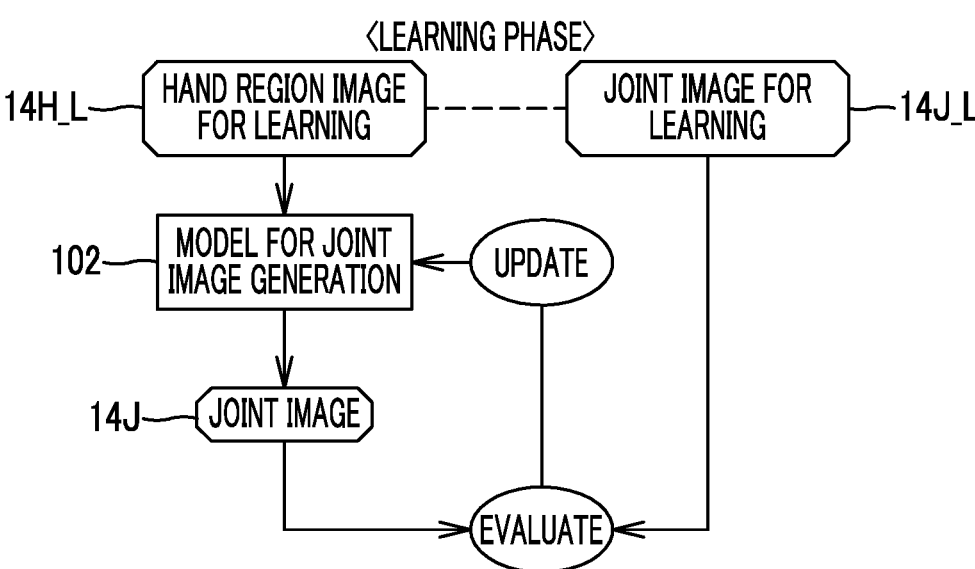
FIG. 22 is a diagram showing a learning phase of the model for joint image generation.

As shown in FIG. 22, the hand region image for learning 14H_L is provided to the model for joint image generation 102 in the learning phase of the model for joint image generation 102. Accordingly, the joint image 14J is output from the model for joint image generation 102. In this manner, the joint image 14J output from the model for joint image generation 102 is compared with the joint image for learning 14J_L, and the joint extraction accuracy of the model for joint image generation 102 is evaluated. Then, the model for joint image generation 102 is updated according to an evaluation result.

In the learning phase, the input of the hand region image for learning 14H_L to the model for joint image generation 102, the output of the joint image 14J from the model for joint image generation 102, the evaluation of the joint extraction accuracy of the model for joint image generation 102, and the update of the model for joint image generation 102 are performed while the set of the hand region image for learning 14H_L and the joint image for learning 14J_L is changed and are repeated until the joint extraction accuracy of the model for joint image generation 102 reaches a desired level. The model for joint image generation 102 whose joint extraction accuracy has been raised to the desired level is stored in the storage device 75 and provided to the joint image generation unit 134.

Figure 23:
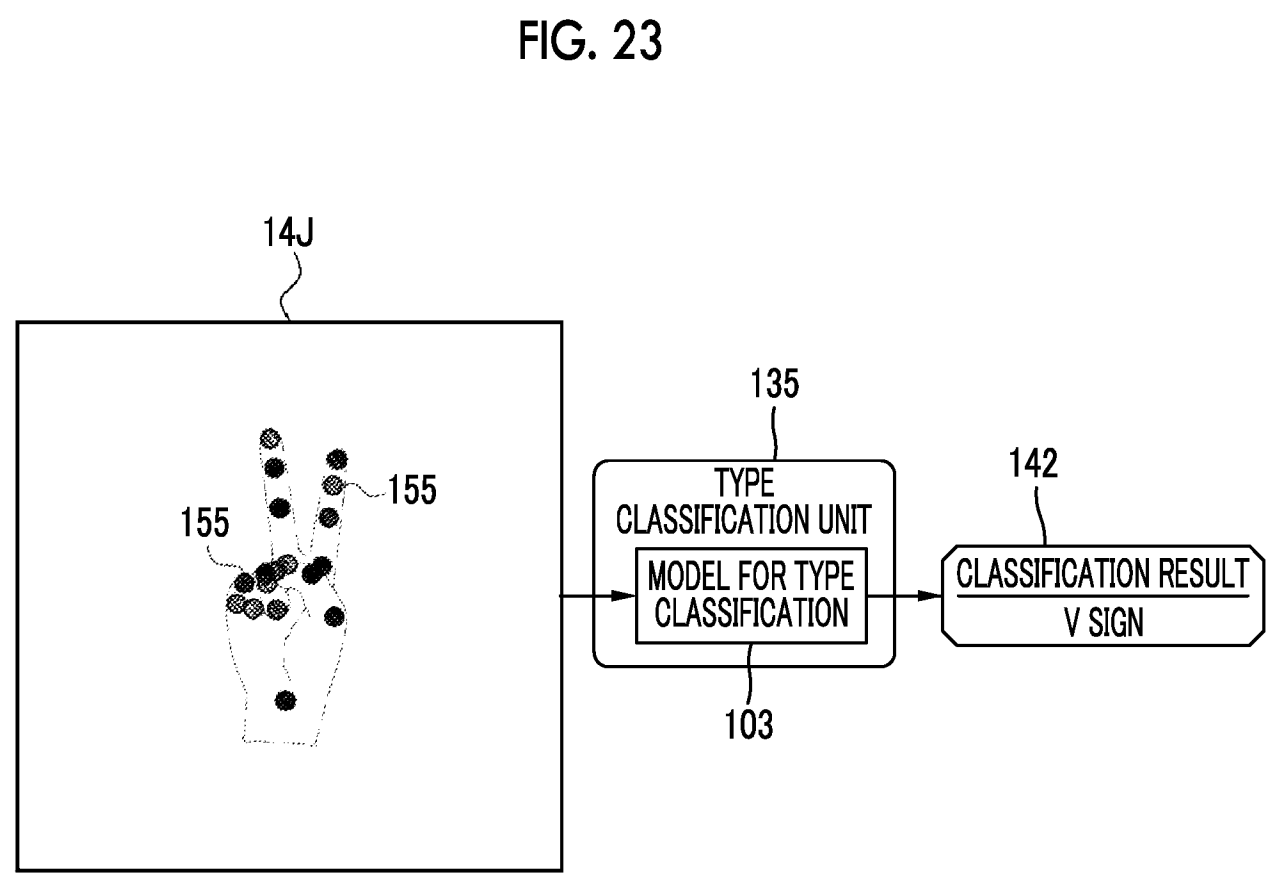
Figure 24:
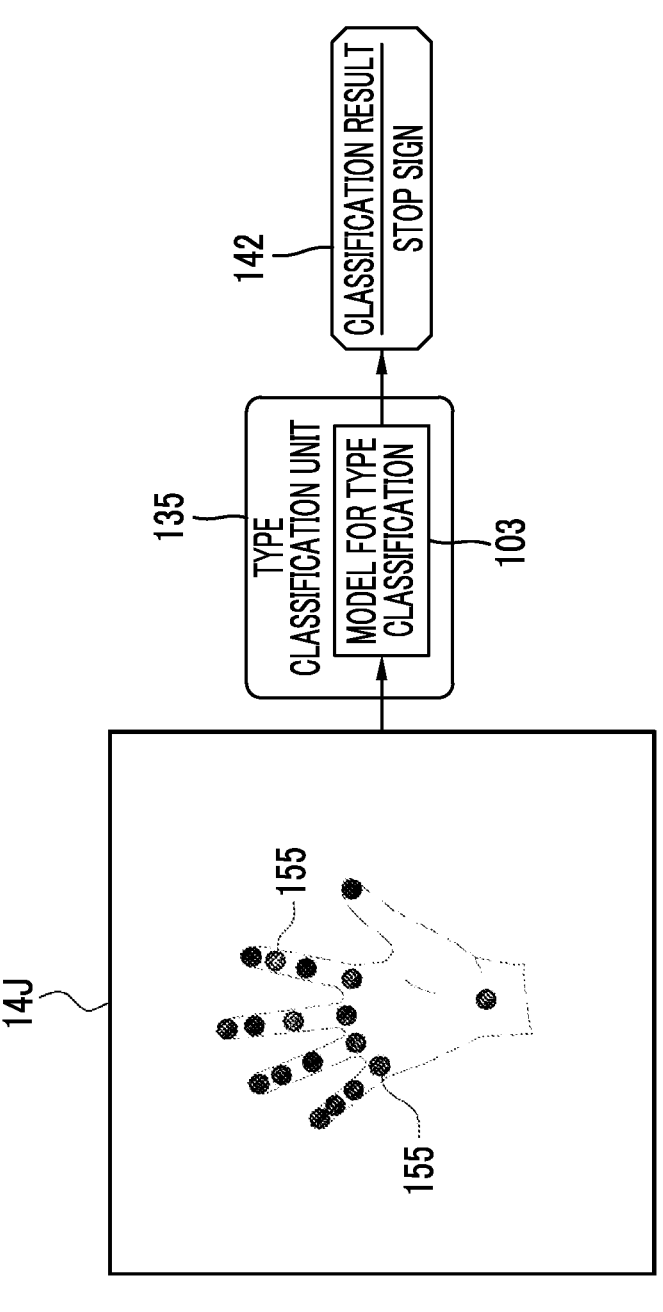
FIG. 24 is a diagram showing a state where a classification result of a gesture type is output from the joint image.

As shown in FIGS. 23 and 24, the type classification unit 135 inputs the joint image 14J into the model for type classification 103 as input data. Accordingly, the classification result 142 of the gesture type is output as output data from the model for type classification 103.

FIG. 23 shows a case where the gesture is the V sign and the V sign is output as the classification result 142. On the contrary, FIG. 24 shows a case where the gesture is the stop sign and the stop sign is output as the classification result 142.

Figure 25:
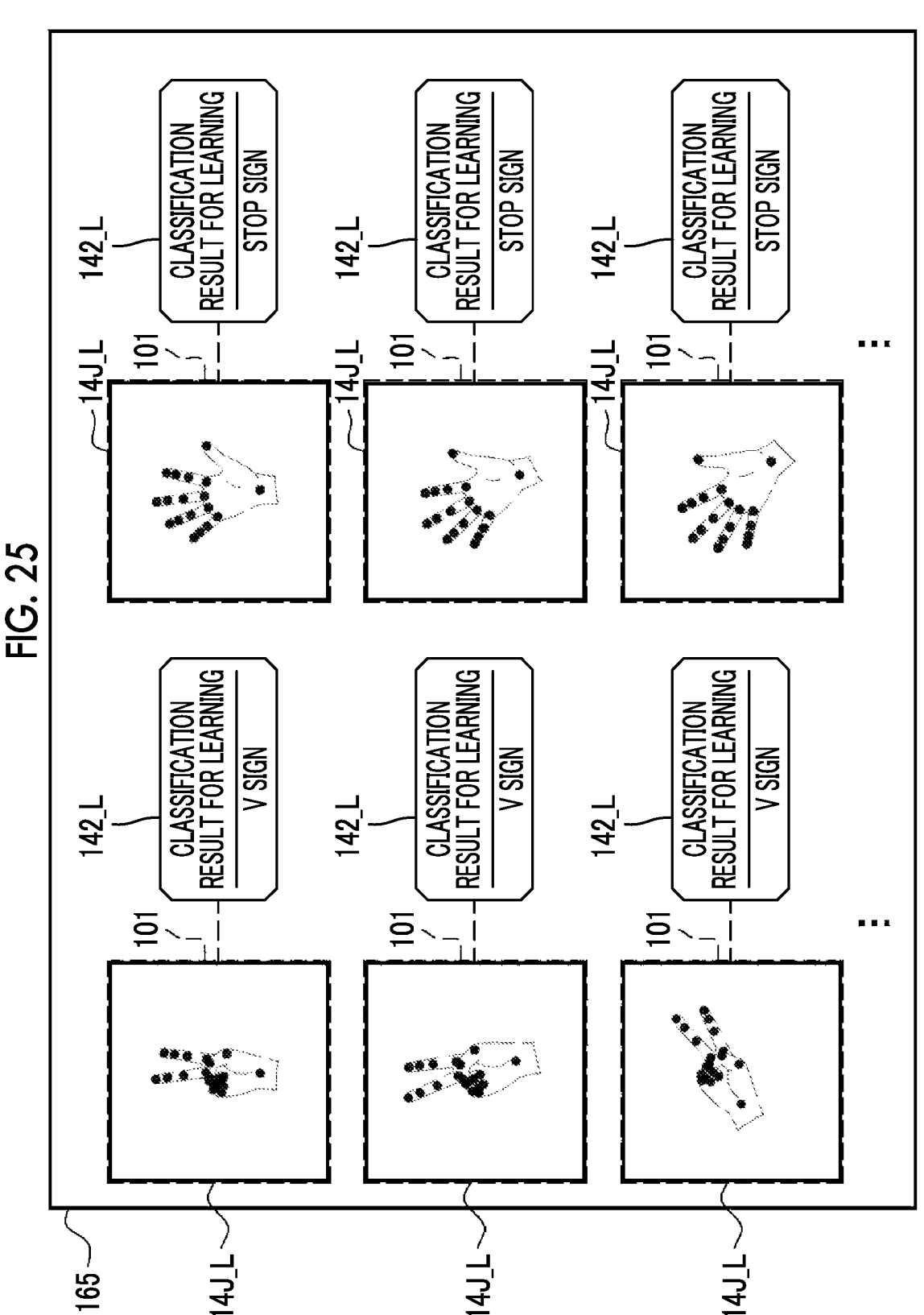
FIG. 25 is a diagram showing data for learning of a model for type classification.

FIG. 25 shows data for learning 165 of the model for type classification 103. The data for learning 165 is provided to the model for type classification 103 in a learning phase of the model for type classification 103 (refer to FIG. 26). The data for learning 165 has a plurality of sets of the joint image for learning 14J_L and a classification result for learning 142_L. All joint images for learning 14J_L are images generated from the hand region image 14H having a size of the reference size 101. Further, all the joint images for learning 14J_L are images generated from the hand region image 14H in which the right hand, which is the "predetermined one hand", is shown. Further, the joint images for learning 14J_L are not images generated from the hand region images 14H in which the right hands in exactly the same posture are shown, but are images generated from the hand region images 14H in which the right hands having different postures due to the fingertips pointing upward or diagonally are shown. The joint images for learning 14J_L include an image, which is generated from the hand region image 14H, with the V sign on the right hand, an image, which is generated from the hand region image 14H, with the stop sign on the right hand, and images, which are generated from the hand region image 14H, with gestures other than the above signs on the right hand (not shown).

The classification result for learning 142_L is data in which a creator of the model for type classification 103 registers the gesture type for the joint image for learning 14J_L, which is paired with the classification result for learning 142_L. The classification result for learning 142_L is data for so-called answer matching with the classification result 142 output from the model for type classification 103 according to the joint image for learning 14J_L and is compared with the classification result 142. A probability that the classification result for learning 142_L matches the classification result 142 becomes higher as classification accuracy of the gesture type of the model for type classification 103.

As shown in FIG. 26, the joint image for learning 14J_L is provided to the model for type classification 103 in the learning phase of the model for type classification 103. Accordingly, the classification result 142 is output from the model for type classification 103. In this manner, the classification result 142 output from the model for type classification 103 is compared with the classification result for learning 142_L, and the classification accuracy of the gesture type of the model for type classification 103 is evaluated. Then, the model for type classification 103 is updated according to the evaluation result.

In the learning phase, the input to the model for type classification 103 of the joint image for learning 14J_L, the output from the model for type classification 103 of the classification result 142, the evaluation of the classification accuracy of the gesture type of the model for type classification 103, and the update of the classification model 103 are performed while the set of the joint image for learning 14J_L and the classification result for learning 142_L is changed and are repeated until the classification accuracy of the gesture type of the model for type classification 103 reaches a desired level. The model for type classification 103 whose gesture type classification accuracy has been raised to the desired level is stored in the storage device 75 and provided to the type classification unit 135.

In FIG. 27, the recognition result 143 corresponding to gesture type is registered in the correspondence information 104. The recognition result 143 in a case where the gesture type is the V sign has contents that the V sign is recognized as a first gesture for an imaging and print instruction that combines the instruction to image the image 14P and the instruction to print the image 14P. On the other hand, the recognition result 143 in a case where the gesture type is the stop sign has contents that the stop sign is recognized as a second gesture for the instruction to stop printing the image 14P.

Figure 29:
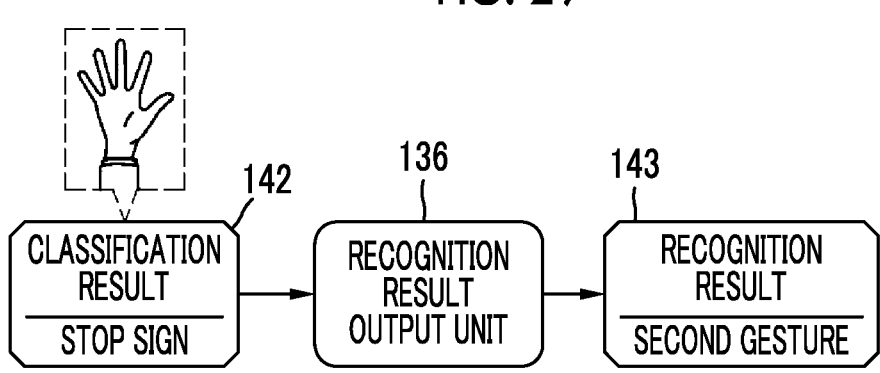
FIG. 29 is a diagram showing the processing of the recognition result output unit.

As shown in FIG. 28, in a case where the classification result 142 is the V sign, the recognition result output unit 136 outputs the recognition result 143 that the first gesture has been recognized, according to the correspondence information 104. On the contrary, as shown in FIG. 29, in a case where the classification result 142 is the stop sign, the recognition result output unit 136 outputs the recognition result 143 that the second gesture has been recognized, according to the correspondence information 104.

Figure 30:
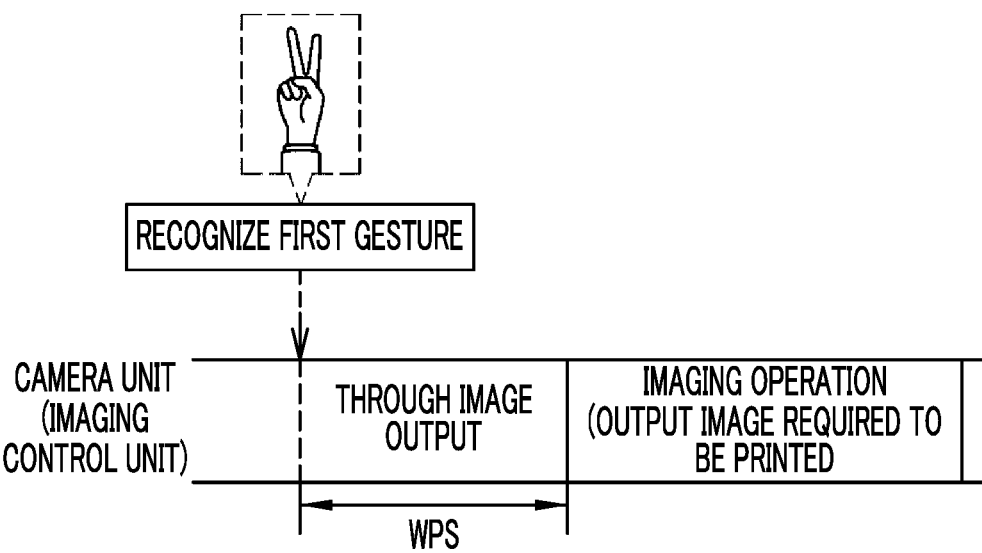
FIG. 30 is a diagram showing a transition of an operation of the camera unit after a first gesture is recognized.

As shown in FIG. 30, the imaging control unit 66 waits until a predetermined imaging standby period WPS elapses after recognizing the first gesture and then causes the camera unit 21 to perform an imaging operation of capturing the image 14, which is the source of the image 14P, as a still image. The imaging control unit 66 causes the camera unit 21 to output the image (live view image for live view display) 14 during the imaging standby period WPS. The imaging standby period WPS is, for example, 3 seconds.

Figure 31:
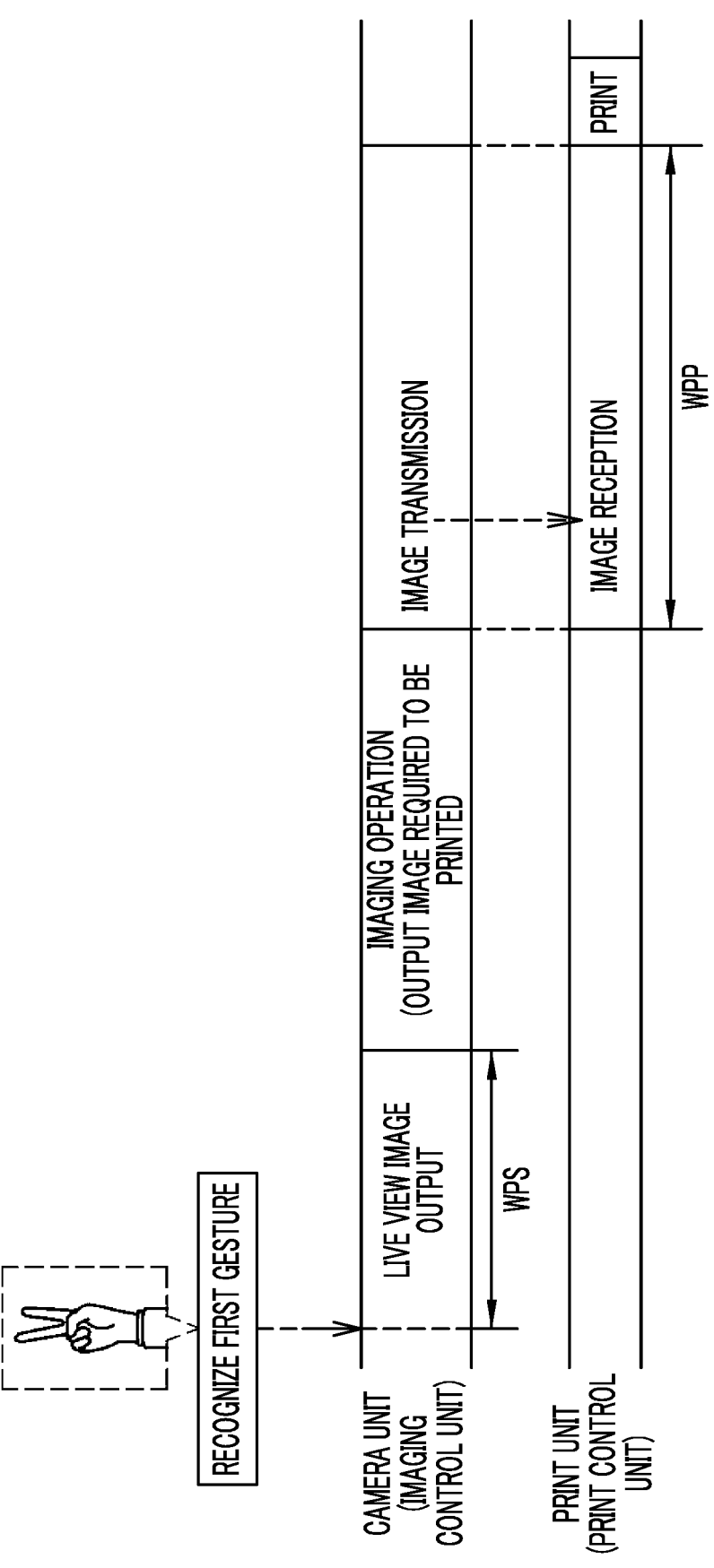
FIG. 31 is a diagram showing a transition of operations of the camera unit and a printer unit in a case where the first gesture is recognized and a second gesture is not recognized.

As shown in FIG. 31, the imaging control unit 66 performs processing of transferring the image 14P required to be printed from the image memory 46 of the camera unit 21 to the print head 51 of the printer unit 22 during a predetermined print standby period WPP. In a case where the second gesture is not recognized during the print standby period WPP, the print control unit 67 causes the printer unit 22 to print the image 14P. The print standby period WPP is a period that starts in a case where the camera unit 21 outputs the image 14P and is, for example, 10 seconds.

Figure 32:
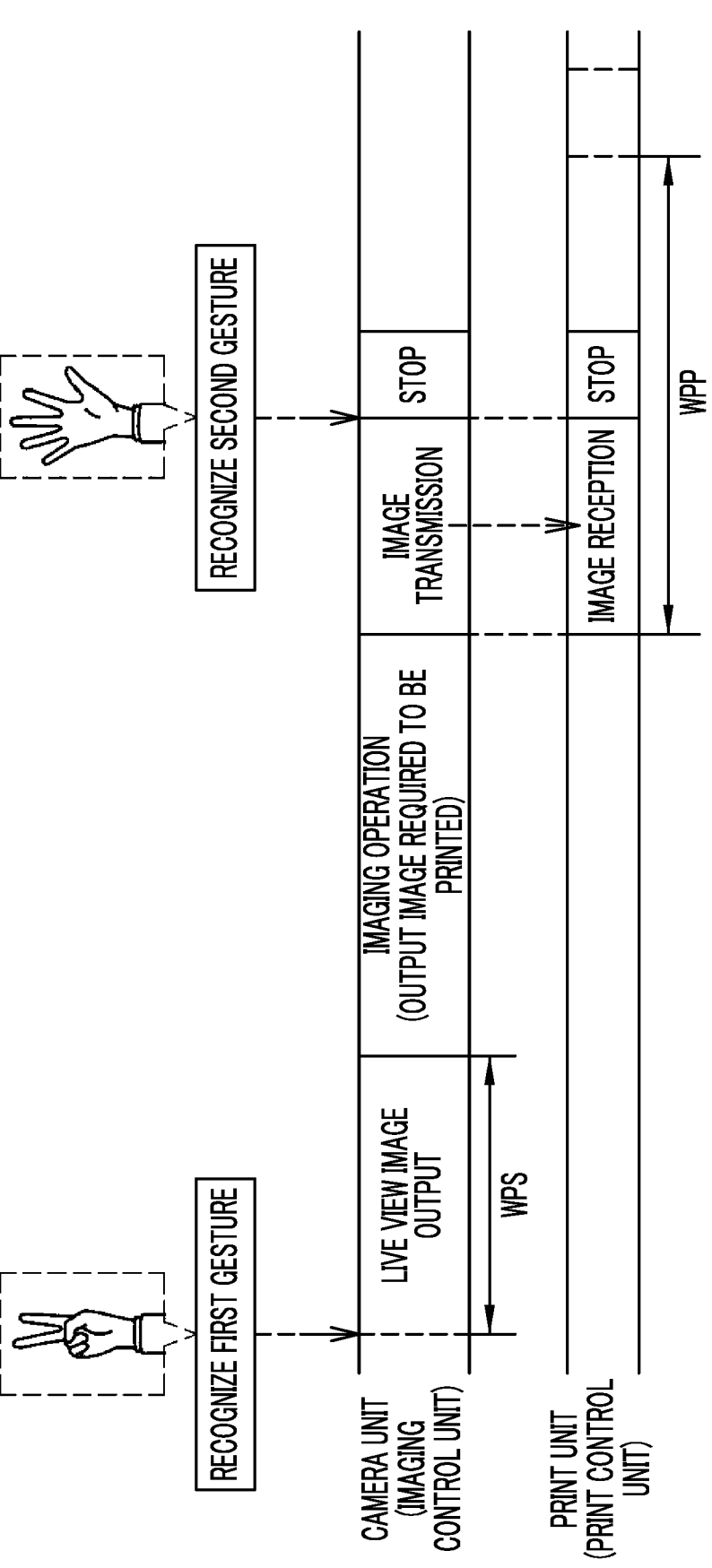
FIG. 32 is a diagram showing a transition of the operations of the camera unit and the printer unit in a case where the first gesture is recognized and the second gesture is recognized.

On the other hand, as shown in FIG. 32, in a case where the second gesture is recognized during the print standby period WPP, the imaging control unit 66 stops the transfer of the image 14P. Further, the print control unit 67 instructs the printer unit 22 to stop printing the image 14P.

Figure 33:
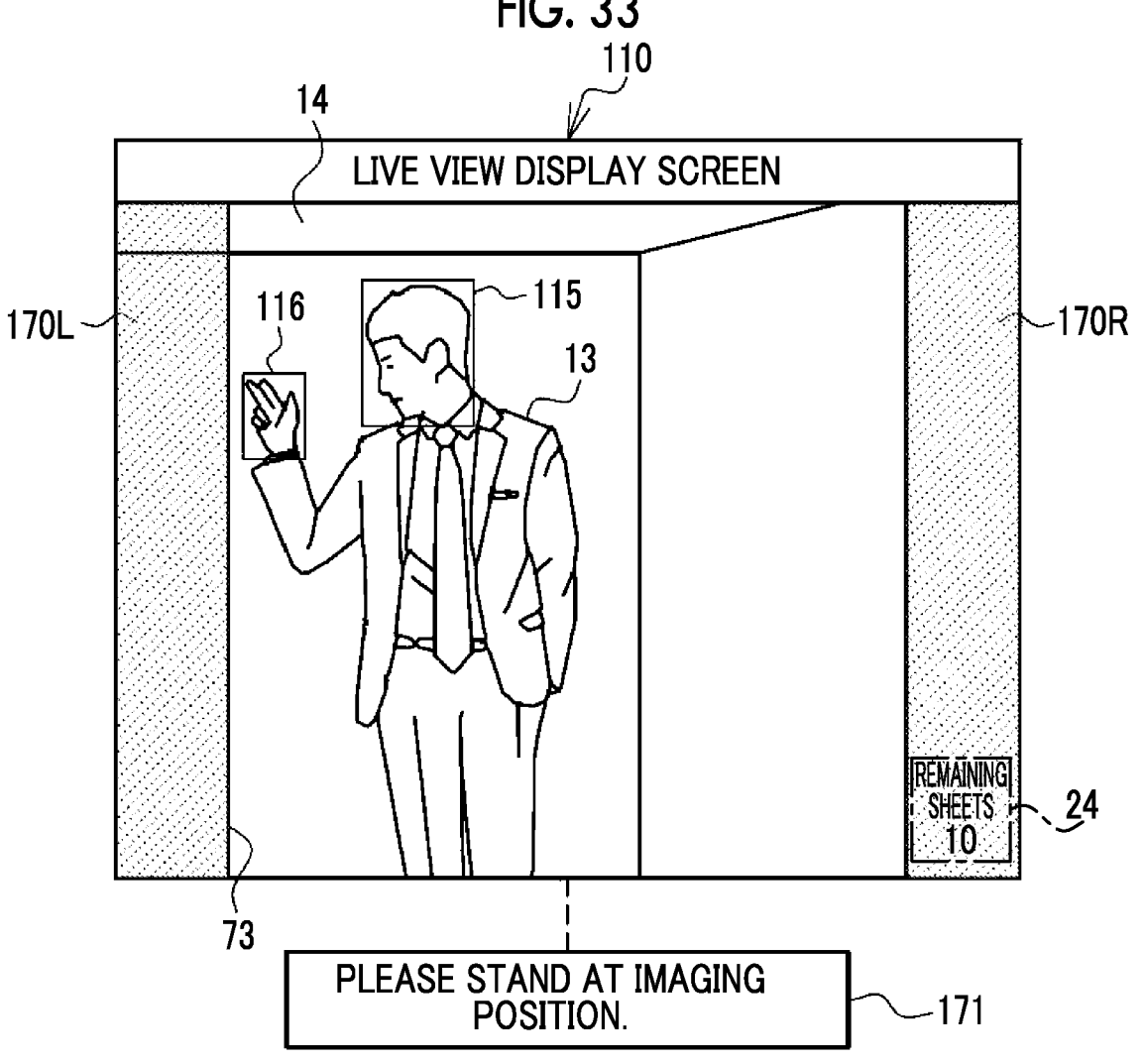
FIG. 33 is a diagram showing a live view display screen and a guide voice in a case where a participant is not standing at an imaging position and a face detection region does not have a predetermined set size.

As shown in FIG. 33, the image 14 is displayed in a live view on the live view display screen 110 output to the display 17 under control of the display control unit 94. Regions 170L and 170R at both left and right ends of the image 14 other than the print region 73 are grayed out as shown by hatching. That is, the display control unit 94 performs the control of displaying the print region 73 on the image 14.

The display control unit 94 performs the control of displaying the remaining number of sheets 24 of the instant film 15 at a lower part of the region 170R. Further, the display control unit 94 performs the control of displaying the face detection region 115 and the hand detection region 116 on the image 14.

FIG. 33 shows the live view display screen 110 in a case where the participant 13 is not standing at the imaging position and the face detection region 115 does not have the predetermined set size. In this case, as shown by a reference numeral 171, the voice control unit 68 outputs "Please stand at imaging position", which is a guide voice for guiding the participant 13 to the imaging position, from the speaker 23.

Figure 34:
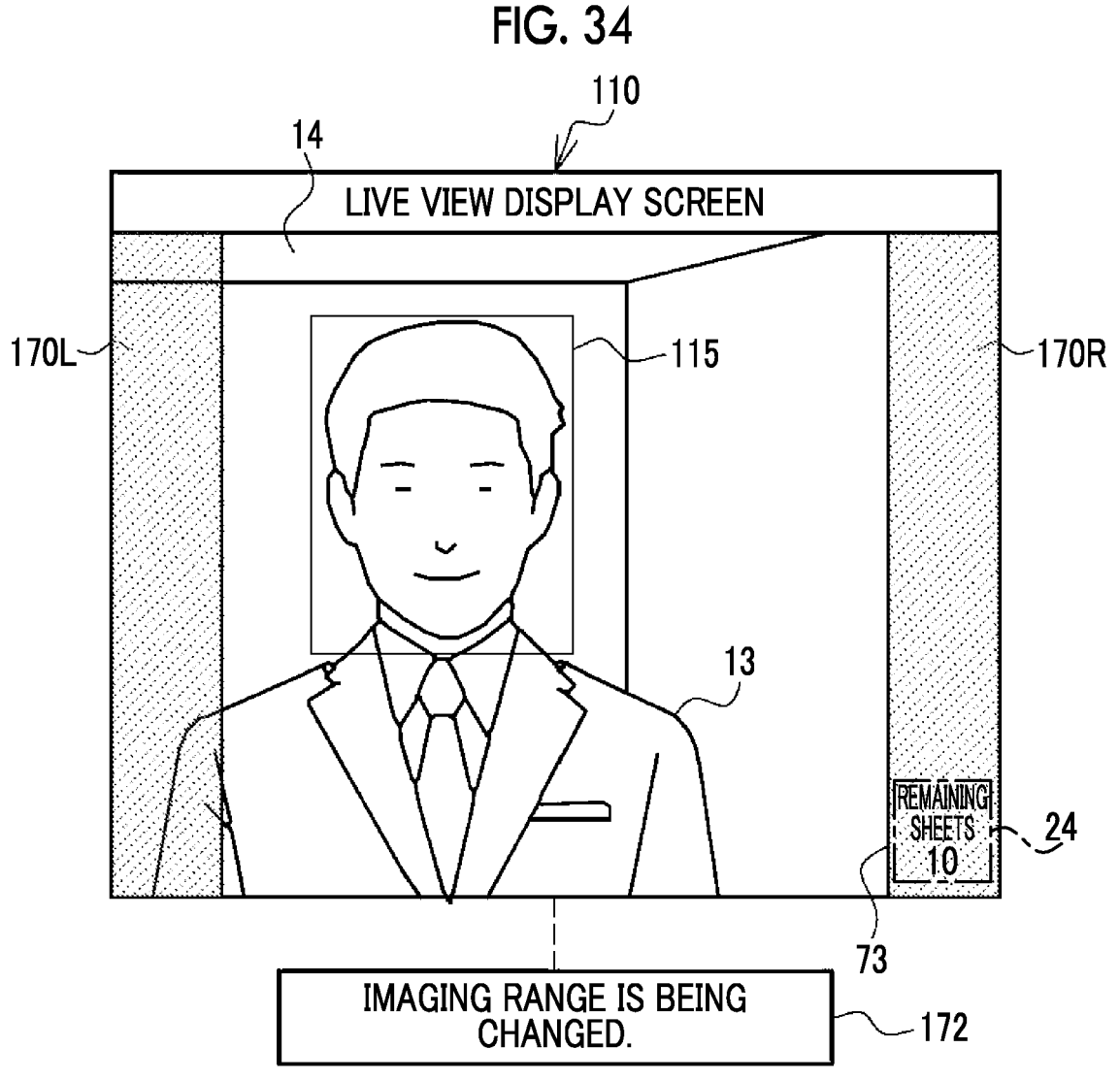
FIG. 34 is a diagram showing the live view display screen and the guide voice in a case where control of changing the imaging range of the camera unit is performed.

FIG. 34 shows the live view display screen 110 in a case where the participant 13 stands at the imaging position and the face detection region 115 has the predetermined set size. Further, FIG. 34 shows the live view display screen 110 in a case where the center CP_F of the face detection region 115 deviates from the center line CL of the long side of the image 14 and the movement control unit 65 performs control of changing the imaging range 120 of the camera unit 21 such that the face position of the participant 13 is set to the center position of the image 14. In this case, as shown by a reference numeral 172, the voice control unit 68 outputs "Imaging range is being changed", which is a guide voice indicating that the imaging range 120 of the camera unit 21 is changed, from the speaker 23.

Figure 35:
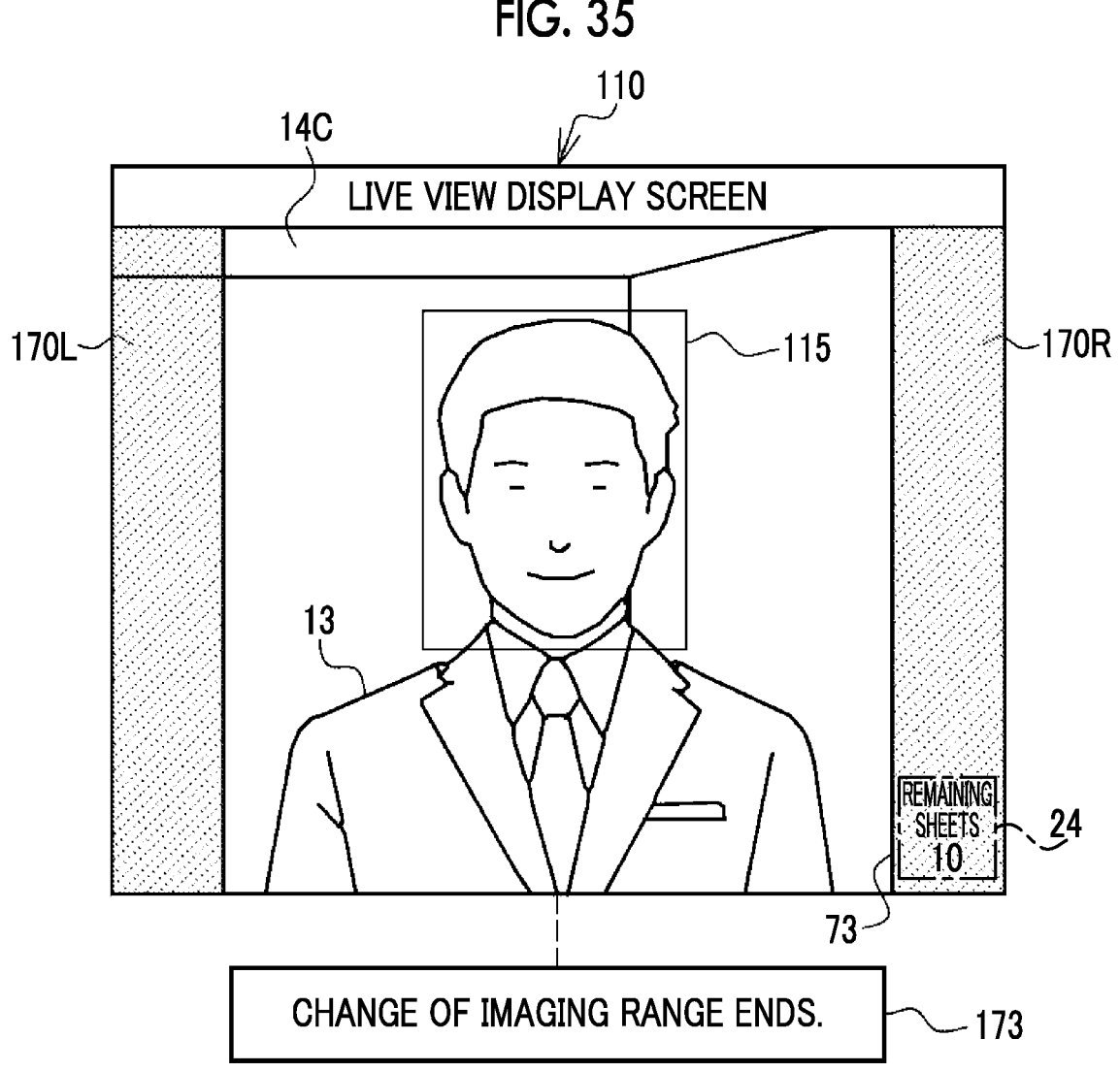
FIG. 35 is a diagram showing the live view display screen and the guide voice in a case where the change in the imaging range of the camera unit ends.

FIG. 35 shows the live view display screen 110 in a case where the movement control unit 65 ends the change of the imaging range 120 of the camera unit 21 and the face position of the participant 13 becomes the center position of the image 14. In this case, as shown by a reference numeral 173, the voice control unit 68 outputs "Change of imaging range ends", which is a guide voice indicating that the change of the imaging range 120 of the camera unit 21 ends, from the speaker 23.

Figure 36:
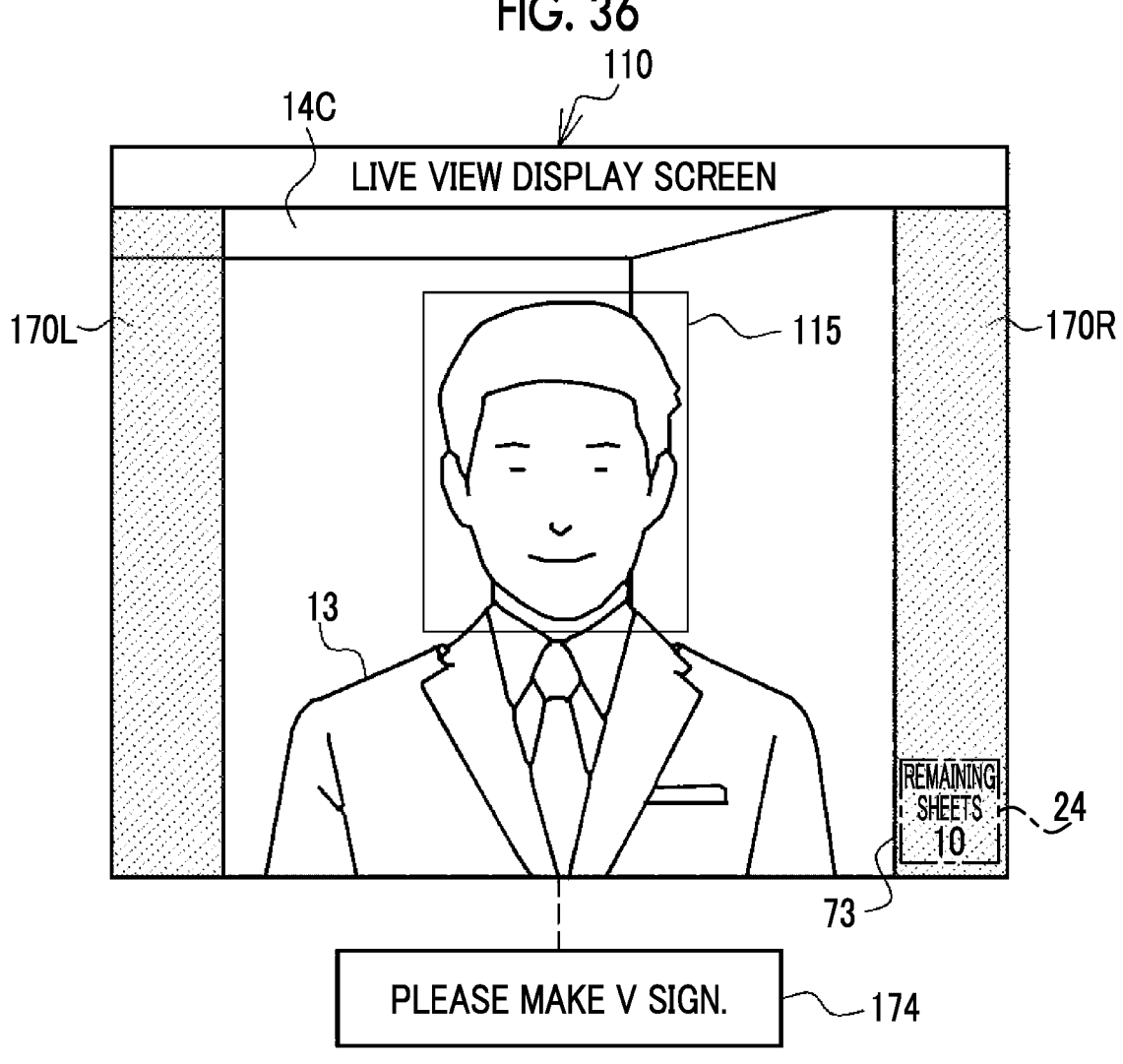
FIG. 36 is a diagram showing the live view display screen and the guide voice in a case where the position of the participant face is the center position of the image.

FIG. 36 shows the live view display screen 110 in a case where the face position of the participant 13 is the center position of the image 14. In this case, as shown by a reference numeral 174, the voice control unit 68 outputs "Please make V sign.", which is a guide voice for prompting the participant 13 to make the V sign which is the first gesture, from the speaker 23.

Figure 37:
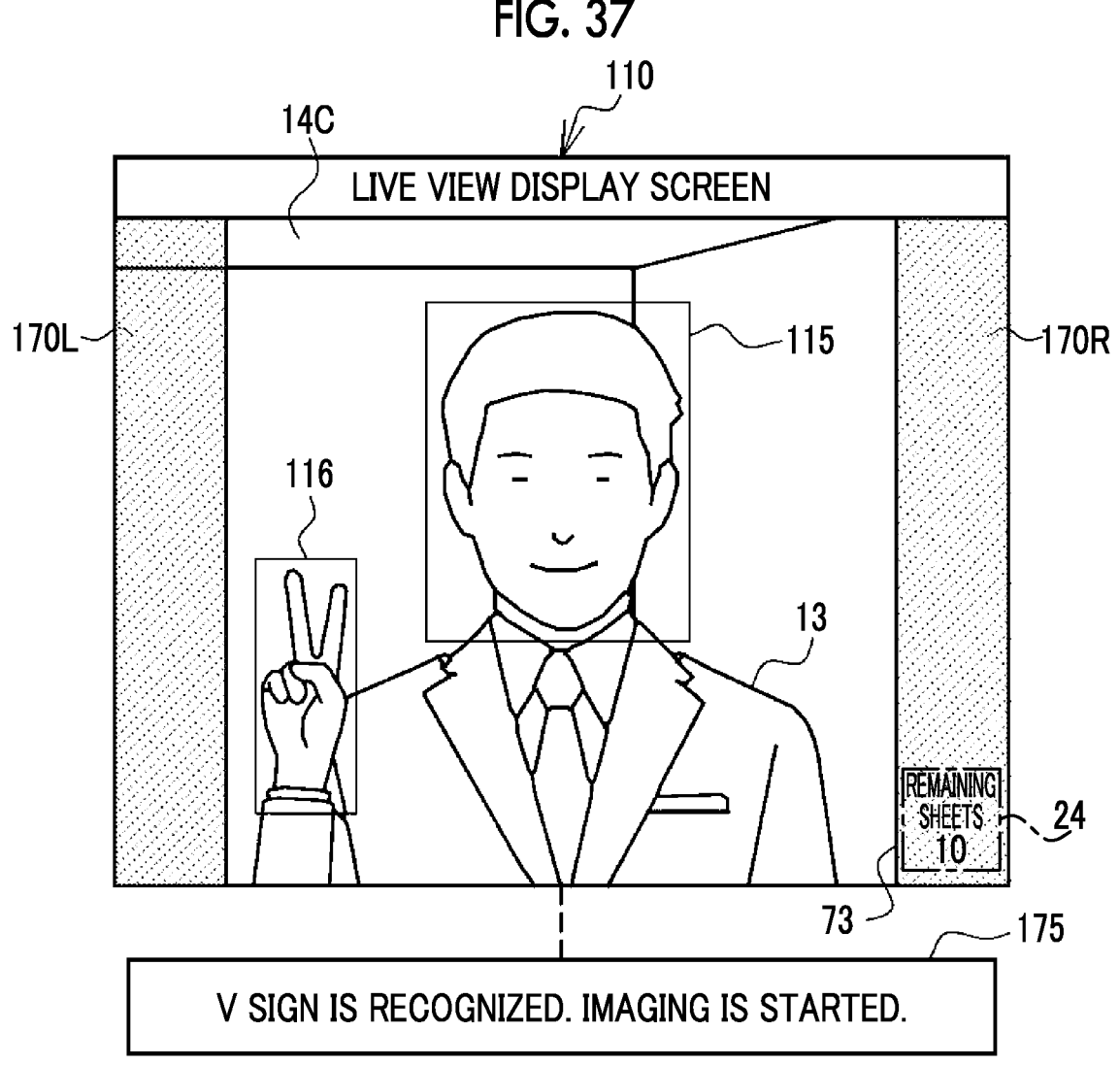
FIG. 37 is a diagram showing the live view display screen and the guide voice in a case where the participant performs a V sign and the gesture recognition unit recognizes the first gesture.

FIG. 37 shows the live view display screen 110 in a case where the participant 13 makes the V sign and the gesture recognition unit 89 recognizes the first gesture. In this case, as shown by a reference numeral 175, the voice control unit 68 outputs "V sign is recognized. Imaging is started.", which is a guide voice indicating that the V sign has been recognized and the operation to capture the image 14P is performed, from the speaker 23.

Figure 38:
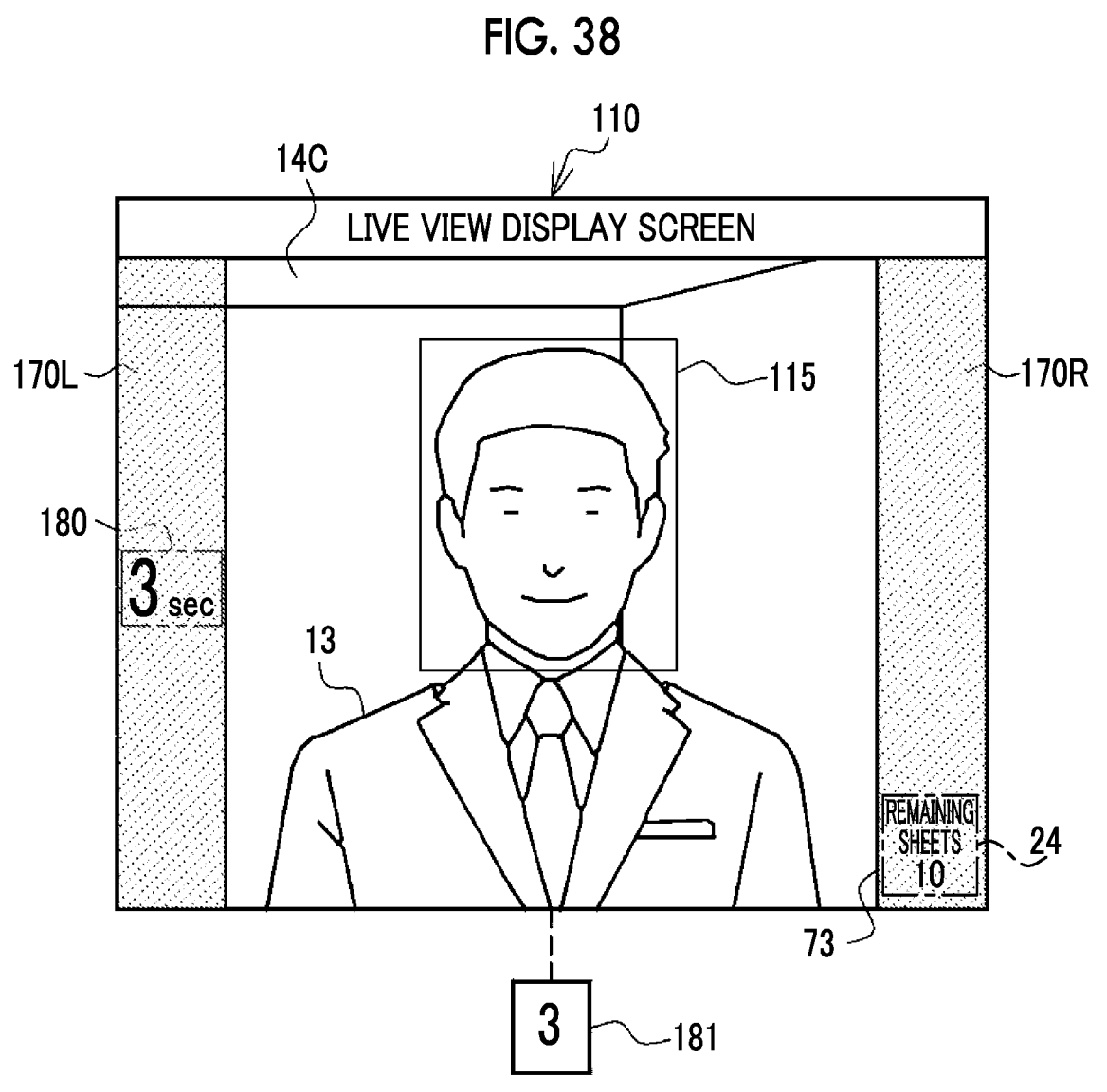
Figure 39:
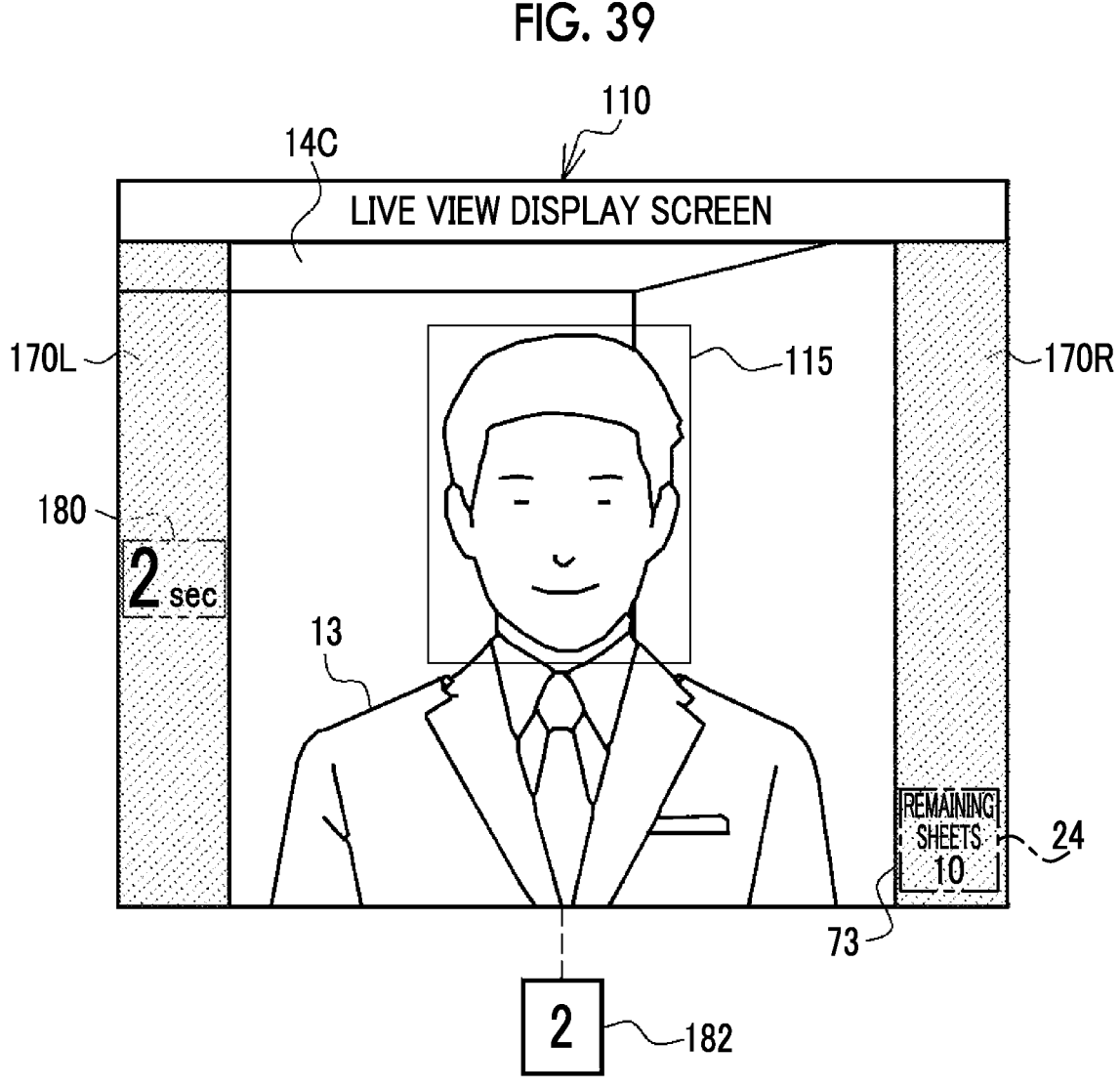
FIG. 39 is a diagram showing the live view display screen and the guide voice in a case where the number of seconds remaining in the imaging standby period is 2 seconds.
Figure 40:
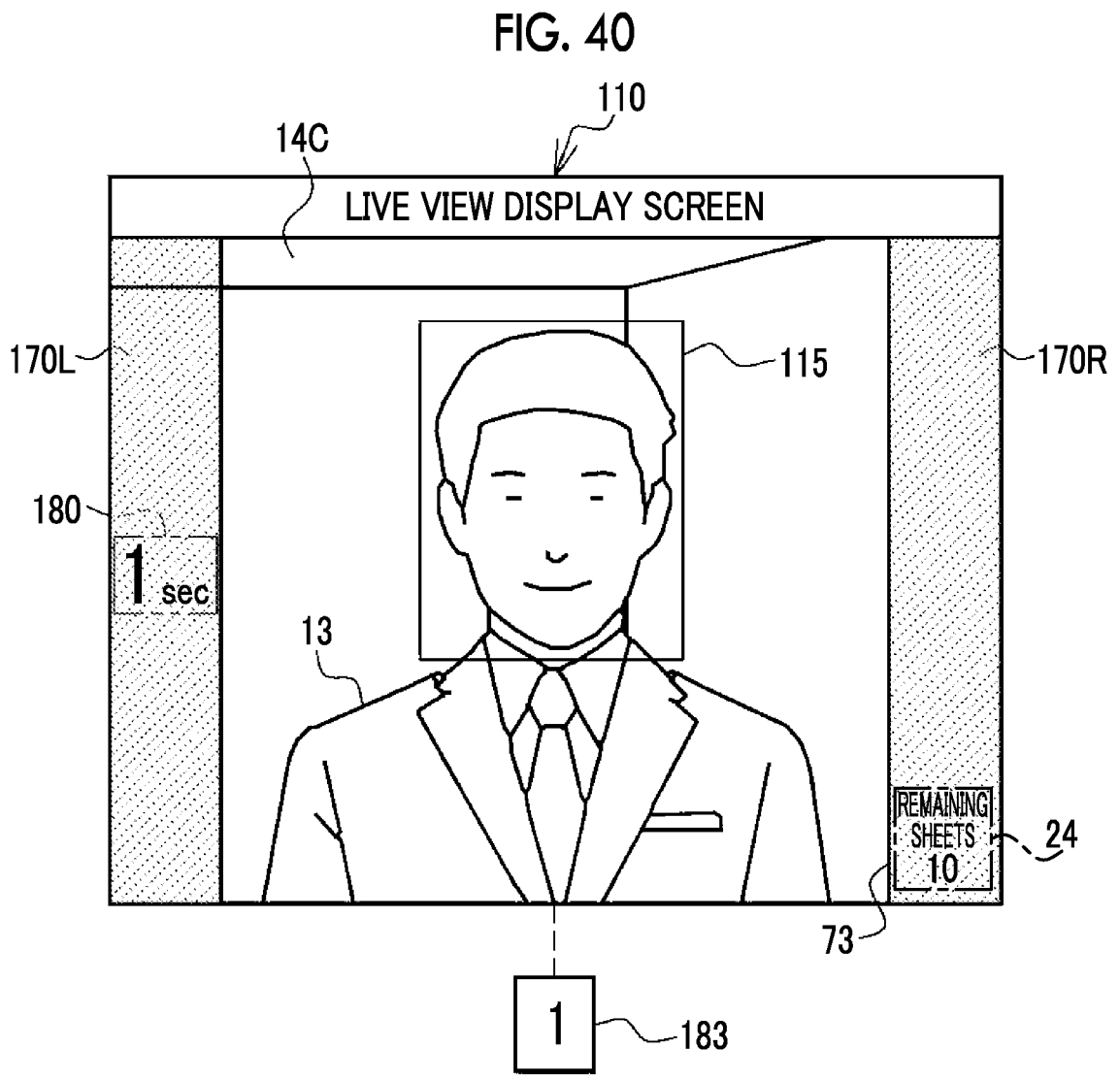
FIG. 40 is a diagram showing the live view display screen and the guide voice in a case where the number of seconds remaining in the imaging standby period is 1 second.

FIGS. 38 to 40 show the live view display screen 110 in the imaging standby period WPS. In this case, the display control unit 94 performs control of displaying a remaining number of seconds 180 in the imaging standby period WPS in a central part of the region 170L. That is, the voice control unit 68 notifies the participant 13 that the first gesture has been recognized.

FIG. 38 shows the live view display screen 110 in a case where the imaging standby period WPS has started and the remaining number of seconds 180 is 3 seconds. In this case, as shown by a reference numeral 181, the voice control unit 68 outputs "3", which is a guide voice indicating that the remaining number of seconds 180 is 3 seconds, from the speaker 23. That is, the display control unit 94 notifies the participant 13 of an elapsed situation of the imaging standby period WPS.

FIG. 39 shows the live view display screen 110 in a case where the remaining number of seconds 180 is 2 seconds. In this case, as shown by a reference numeral 182, the voice control unit 68 outputs "2", which is a guide voice indicating that the remaining number of seconds 180 is 2 seconds, from the speaker 23.

FIG. 40 shows the live view display screen 110 in a case where the remaining number of seconds 180 is 1 second. In this case, as shown by a reference numeral 183, the voice control unit 68 outputs "1", which is a guide voice indicating that the remaining number of seconds 180 is 1 second, from the speaker 23. That is, the voice control unit 68 also notifies the participant 13 of the elapsed situation of the imaging standby period WPS.

Figure 41:
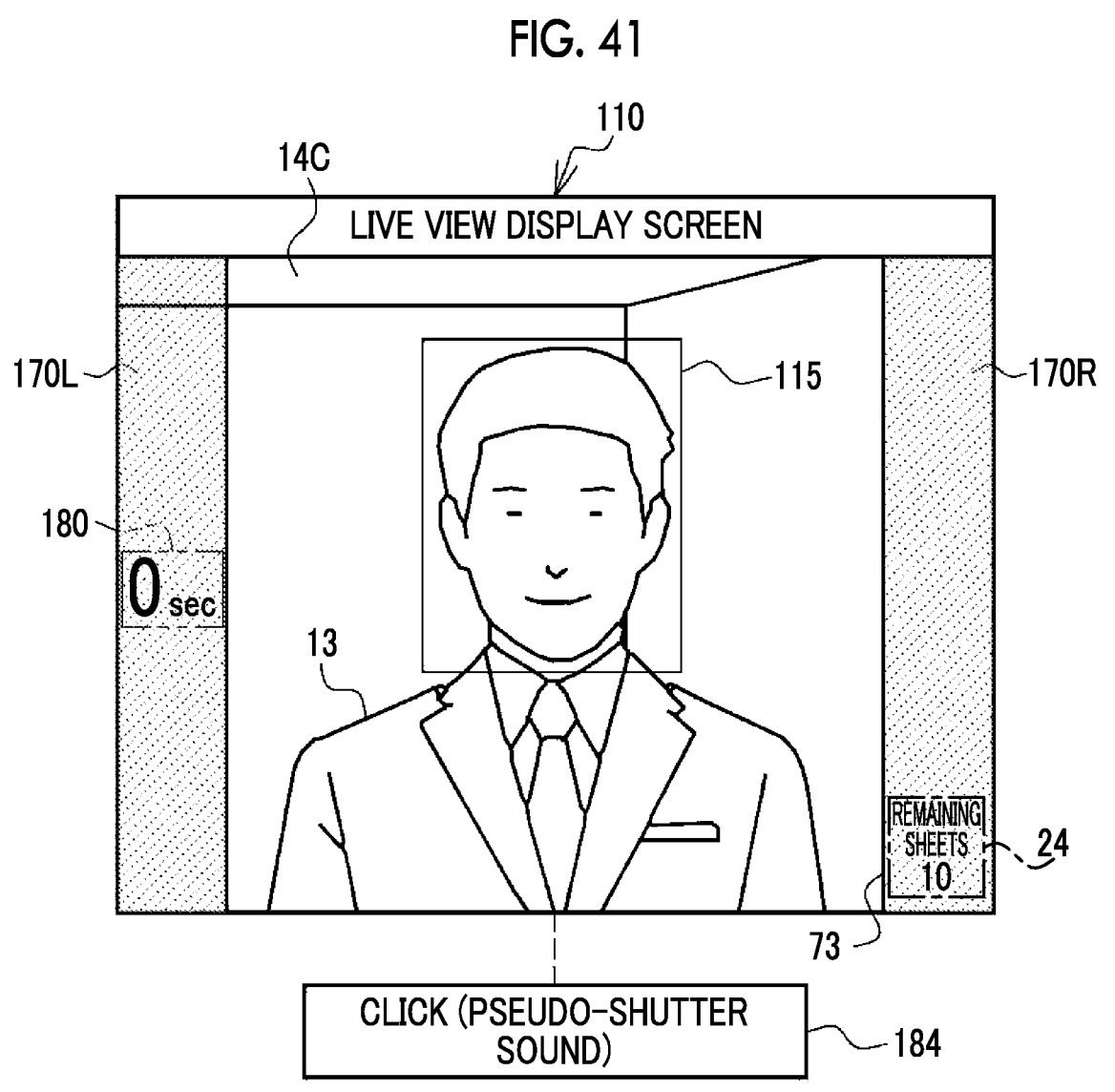

FIG. 41 shows the live view display screen 110 in a case where the imaging standby period WPS ends with the remaining number of seconds 180 of 0 seconds and the operation to capture the image 14P is performed. In this case, as shown by a reference numeral 184, the voice control unit 68 outputs "click", which is a pseudo-shutter sound indicating that the shutter 42 has been released, from the speaker 23. That is, the voice control unit 68 notifies the participant 13 of an execution timing of the operation to capture the image 14P. The execution timing of the operation to capture the image 14P may be paraphrased as an imaging timing of the image 14P. In this case, the live view display screen 110 momentarily displays a black image obtained in a case where the shutter 42 is released. The black image also allows the participant 13 to be notified of the execution timing of the operation to capture the image 14P.

Figure 42:
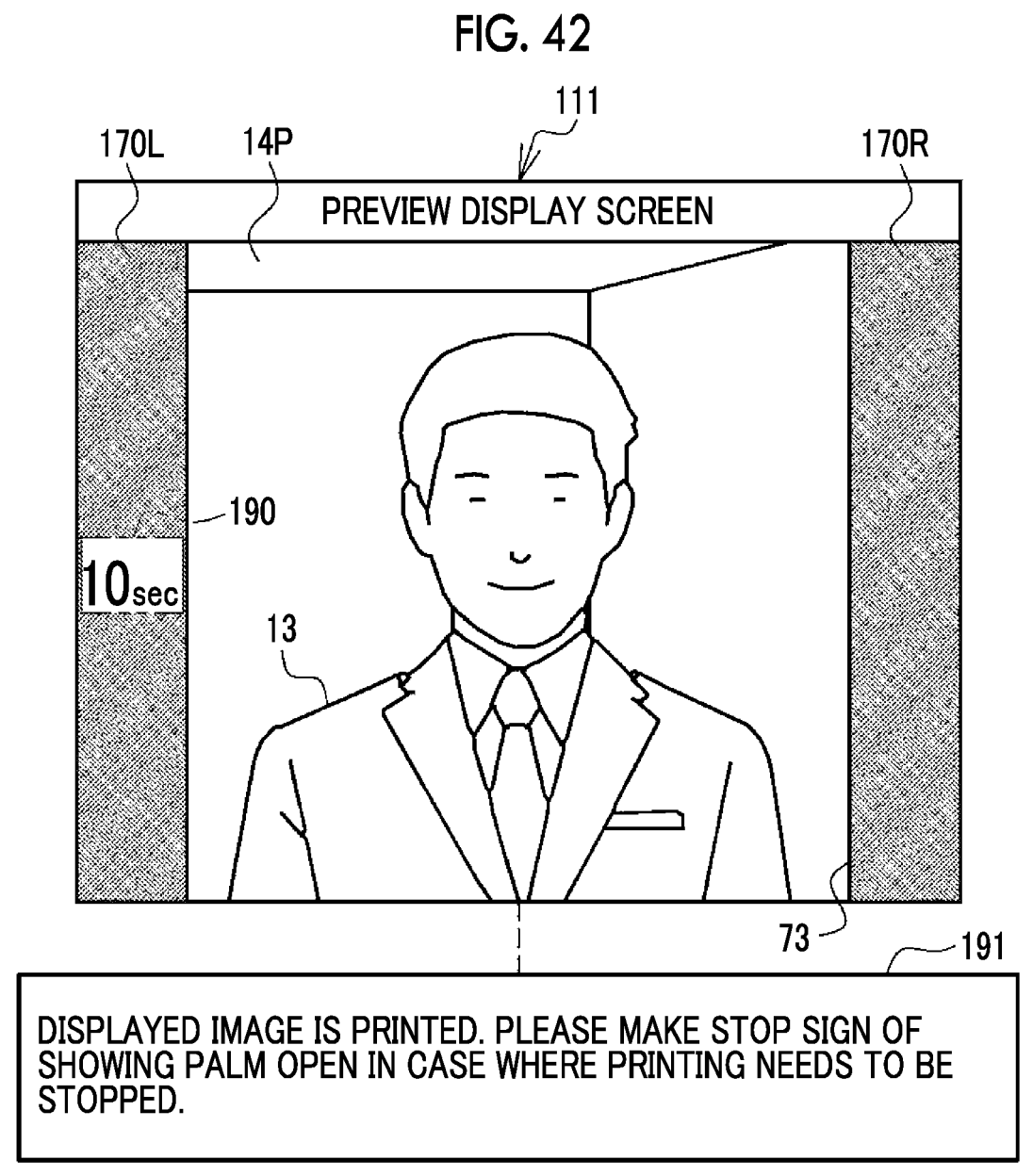

As shown in FIG. 42, the image 14P before the printing is displayed as a preview on the preview display screen 111 output to the display 17 during the print standby period WPP under the control of the display control unit 94. The regions 170L, 170R are blacked out as shown by hatching. That is, the display control unit 94 performs the control of displaying the print region 73 also on the preview display screen 111 as in the case of the live view display screen 110.

The display control unit 94 performs the control of displaying a remaining number of seconds 190 in the print standby period WPP in the central part of the region 170L. That is, the display control unit 94 notifies the participant 13 of the elapsed situation of the print standby period WPP.

FIG. 42 shows the preview display screen 111 in a case where the print standby period WPP has started and the remaining number of seconds 190 is 10 seconds. In this case, as shown by a reference numeral 191, the voice control unit 68 outputs "Displayed image is printed. Please make stop sign of showing palm open in case where printing needs to be stopped.", which is a guide voice indicating that the displayed image 14P is printed and the stop sign, which is the second gesture, is desired to be made in a case where the printing needs to be stopped, from the speaker 23.

Figure 43:
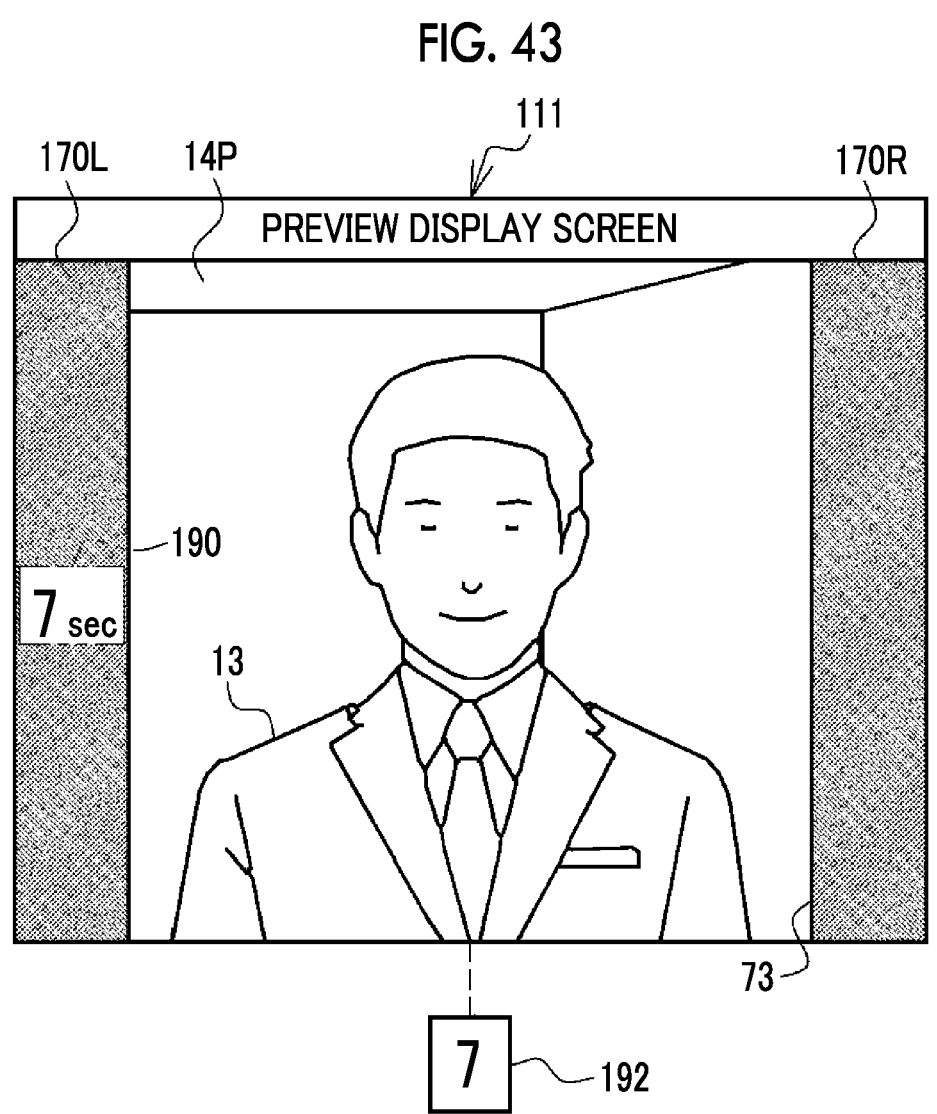
FIG. 43 is a diagram showing the preview display screen and the guide voice in a case where the number of seconds remaining in the print standby period is 7 seconds.

FIG. 43 shows the preview display screen 111 in a case where the remaining number of seconds 190 is 7 seconds. In this case, as shown by a reference numeral 192, the voice control unit 68 outputs "7", which is a guide voice indicating that the remaining number of seconds 190 is 7 seconds, from the speaker 23. Although not shown, even in a case where the remaining number of seconds 190 is 6 seconds or less, the guide voice indicating the remaining number of seconds 190 is output from the speaker 23 under the control of the voice control unit 68.

Figure 44:
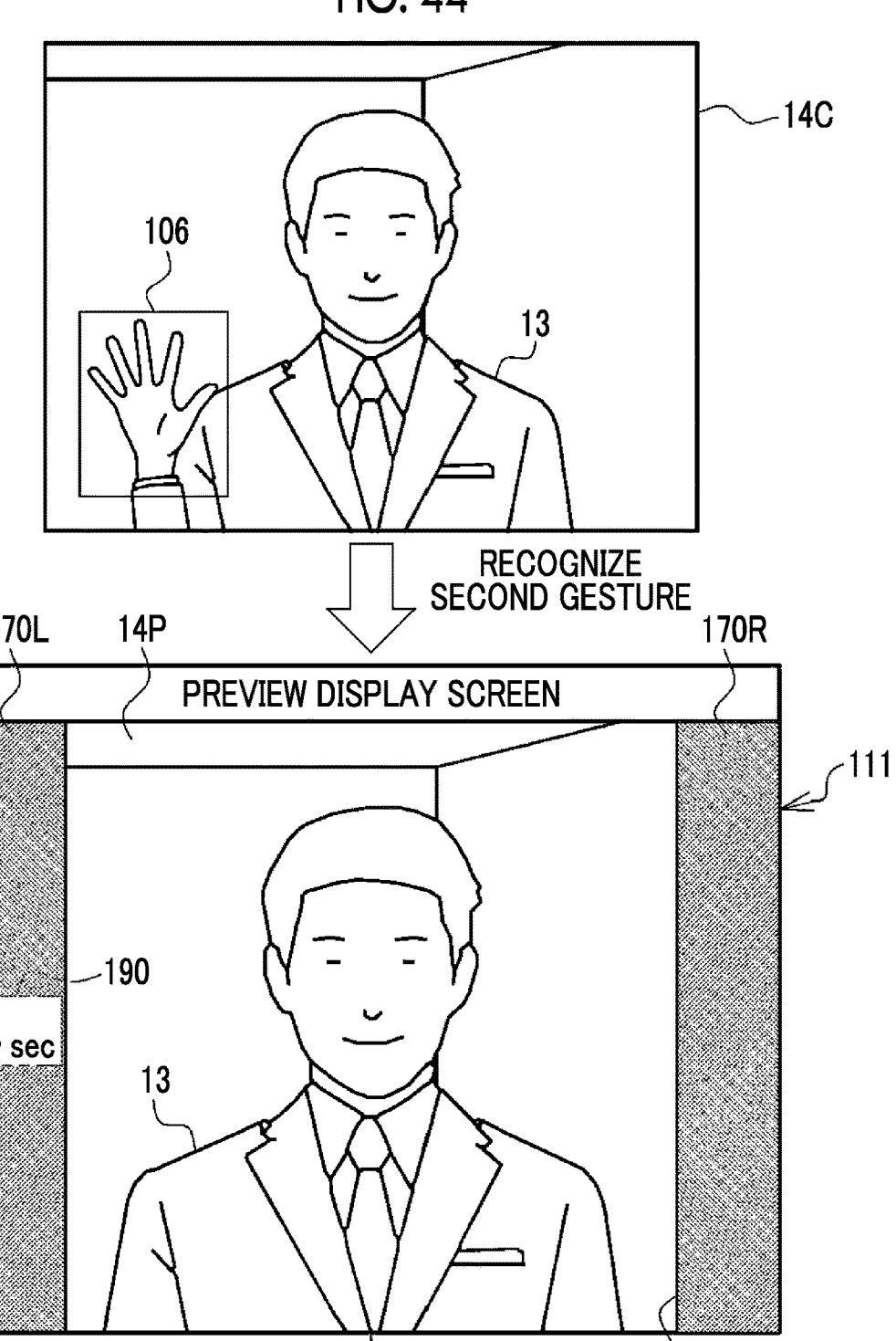
FIG. 44 is a diagram showing the preview display screen and the guide voice in a case where the participant performs a stop sign and the gesture recognition unit recognizes the second gesture.

FIG. 44 shows the preview display screen 111 in a case where the participant 13 makes the stop sign and the gesture recognition unit 89 recognizes the second gesture. In this case, as shown by a reference numeral 193, the voice control unit 68 outputs "Stop sign is recognized and printing needs to be stopped. Please make V sign again and capture image again.", which is a guide voice indicating that the printing of the image 14P is stopped due to the recognition of the stop sign and indicating that re-capturing of the image 14P is prompted, from the speaker 23. That is, the voice control unit 68 notifies the participant 13 that the second gesture has been recognized.

Next, an action by the above configuration will be described with reference to flowcharts of FIGS. 45 to 48. First, in a case where the operation program 60 is activated, the controller 56 of the digital camera with the printer 10 functions as the movement control unit 65, the imaging control unit 66, the print control unit 67, and the voice control unit 68, as shown in FIG. 5. Further, in a case where the operation program 80 is activated, the CPU 77 of the control device 11 functions as the image reception unit 85, the remaining number of sheets reception unit 86, the face detection unit 87, the hand detection unit 88, the gesture recognition unit 89, the movement control signal generation unit 90, the imaging control signal generation unit 91, the print control signal generation unit 92, the control signal transmission unit 93, and the display control unit 94, as shown in FIG. 8. As shown in FIG. 11, the determination unit 130, the hand region image generation unit 131, the mirror-image inversion processing unit 132, the size change processing unit 133, the joint image generation unit 134, the type classification unit 135, and the recognition result output unit 136 are constructed in the gesture recognition unit 89.

In the digital camera with the printer 10, the image 14 is output from the camera unit 21. The image 14 is transmitted to the control device 11 by the transmission unit 52.

In the control device 11, the image reception unit 85 receives the image 14 from the digital camera with the printer 10. The image 14 is output from the image reception unit 85 to the face detection unit 87, the hand detection unit 88, the gesture recognition unit 89, and the display control unit 94.

Figure 45:
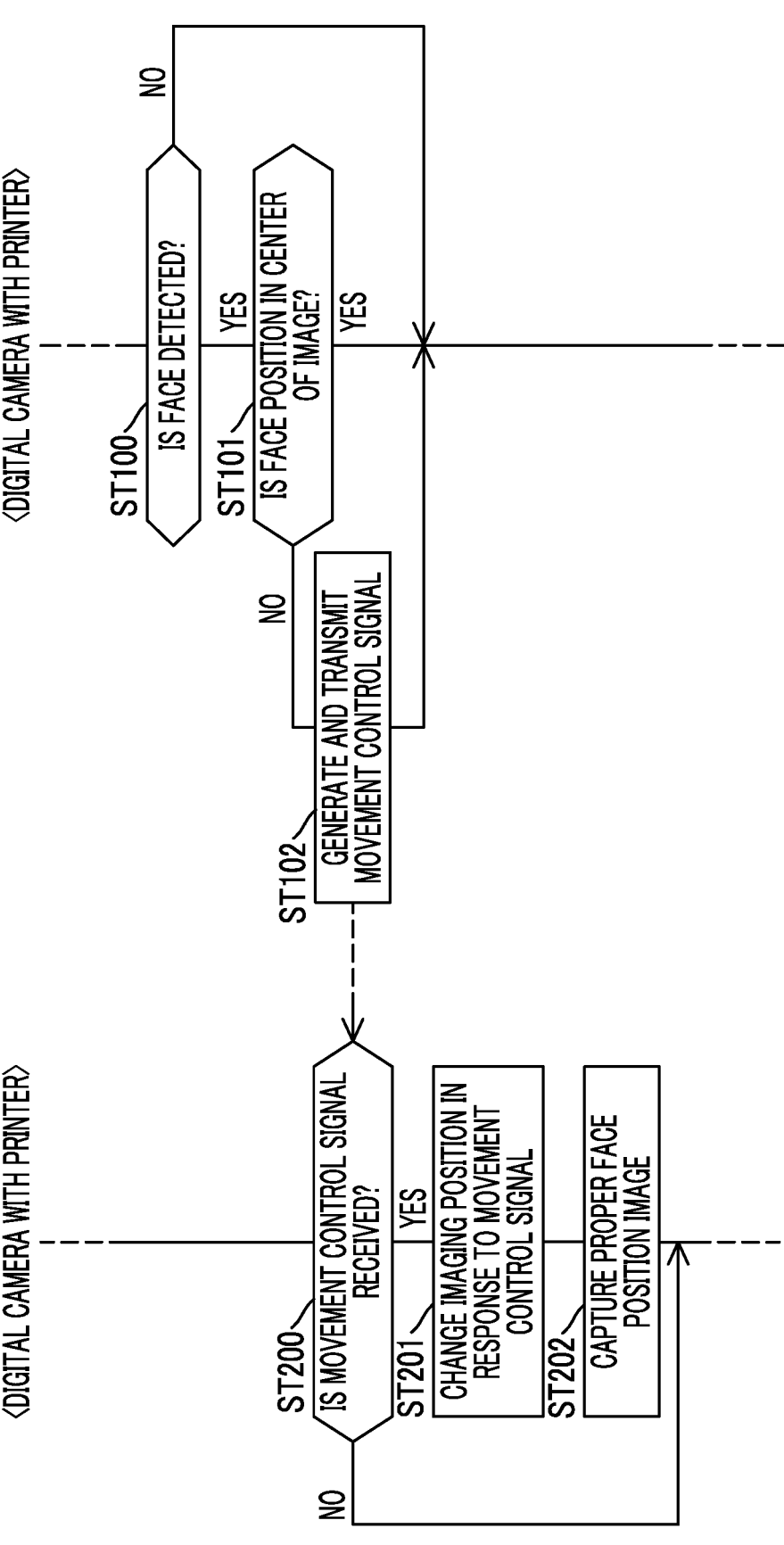
FIG. 45 is a flowchart showing a processing procedure of the digital camera with the printer and the control device.

In FIG. 45, in a case where the face detection unit 87 detects the face of the participant 13 from the image 14 (YES in step ST100) and the face position is not in the center position of the image 14 due to the deviation between the center CP_F of the face detection region 115 and the center line CL of the image 14 (NO in step ST101), the movement control signal generation unit 90 generates the movement control signal 25 for setting the face position to the center position of the image 14 by matching the center CP_F and the center line CL. The movement control signal 25 is output from the movement control signal generation unit 90 to the control signal transmission unit 93 and is transmitted to the digital camera with the printer 10 by the control signal transmission unit 93 (step ST102).

In the digital camera with the printer 10, the reception unit 53 receives the movement control signal 25 (YES in step ST200). The movement control signal 25 is output from the reception unit 53 to the movement control unit 65.

As shown in FIG. 10, the movement control unit 65 operates the movement mechanism 20 in response to the movement control signal 25 to change the imaging range 120 of the camera unit 21. With the change, the control of setting the face position of the participant 13 to the center position of the image 14 is performed (step ST201). Accordingly, the proper face position image 14C is captured under the control of the imaging control unit 66 (step ST202). Steps ST201 and ST202 are examples of "control step" according to the technique of the present disclosure.

In FIG. 46, in the control device 11, the live view display screen 110 of the proper face position image 14C or the preview display screen 111 of the image 14P is displayed on the display 17 under the control of the display control unit 94 (step ST110). In this state, in a case where the hand detection unit 88 detects the hand of the participant 13 from the image 14 (YES in step ST111), the hand detection result 140 is output from the hand detection unit 88 to the determination unit 130 and the hand region image generation unit 131. Further, the proper face position image 14C is output from the image reception unit 85 to the hand region image generation unit 131.

Based on the determination condition 100, the determination unit 130 determines whether the hand of the participant 13 detected by the hand detection unit 88 is the right hand or the left hand (step ST112). More specifically, as shown in FIG. 12, in a case where the center CP_H of the hand detection region 116 is on the left side of the center line CL as viewed from the imaging direction SD, the detected hand is determined to be the right hand. On the other hand, as shown in FIG. 13, in a case where the center CP_H of the hand detection region 116 is on the right side of the center line CL as viewed from the imaging direction SD, the detected hand is determined to be the left hand. The determination result 141 is output from the determination unit 130 to the mirror-image inversion processing unit 132. Step ST112 is an example of "determination step" according to the technique of the present disclosure.

As shown in FIG. 14, the hand region image generation unit 131 cuts out the rectangular cutout frame 150 surrounding the detected hand from the proper face position image 14C to generate the hand region image 14H (step ST113). The cutout frame 150 is a frame, provided with a margin around the detected hand, in which the center of the cutout frame matches the center CP_H of the hand detection region 116. The hand region image 14H is output from the hand region image generation unit 131 to the mirror-image inversion processing unit 132.

In a case where the determination result 141 is the right hand (YES in step ST114), the mirror-image inversion processing unit 132 does not perform the mirror-image inversion processing, and the hand region image 14H is output to the size change processing unit 133 as it is, as shown in FIG. 15. On the other hand, in a case where the determination result 141 is the left hand (NO in step ST114), the mirror-image inversion processing unit 132 performs the mirror-image inversion processing on the hand region image 14H, as shown in FIG. 16 (step ST115). The hand region image 14H subjected to the mirror-image inversion processing is output from the mirror-image inversion processing unit 132 to the size change processing unit 133.

In a case where the hand region image 14H from the mirror-image inversion processing unit 132 has the reference size 101 (YES in step ST116), the size change processing unit 133 does not perform the size change processing, and the hand region image 14H is output to the joint image generation unit 134 as it is. On the other hand, in a case where the hand region image 14H from the mirror-image inversion processing unit 132 does not have the reference size 101 (NO in step ST116), the size change processing unit 133 performs the size change processing, and the size of the hand region image 14H is set to the reference size 101, as shown in FIGS. 17 and 18 (step ST117). The hand region image 14H subjected to the size change processing is output from the size change processing unit 133 to the joint image generation unit 134.

As shown in FIGS. 19 and 20, the joint image generation unit 134 generates the joint image 14J from the hand region image 14H, using the model for joint image generation 102 (step ST118). The joint image 14J is output from the joint image generation unit 134 to the type classification unit 135.

As shown in FIGS. 23 and 24, the type classification unit 135 outputs the classification result 142 of the gesture type from the joint image 14J, using the model for type classification 103 (step ST119). The classification result 142 is output from the type classification unit 135 to the recognition result output unit 136.

As shown in FIG. 28, in a case where the gesture type is the V sign (YES in step ST120), the recognition result output unit 136 outputs the recognition result 143 that the first gesture has been recognized (step ST121). On the contrary, as shown in FIG. 29, in a case where the gesture type is the stop sign (NO in step ST120 and YES in step ST122), the recognition result output unit 136 outputs the recognition result 143 that the second gesture has been recognized (step ST123). The recognition result 143 is output to the imaging control signal generation unit 91, the print control signal generation unit 92, and the display control unit 94.

As shown in FIG. 47, in a case where the recognition result 143 that the first gesture has been recognized is output from the gesture recognition unit 89, the imaging control signal generation unit 91 generates the imaging control signal 26 representing the instruction to capture the image 14P. The imaging control signal 26 is output from the imaging control signal generation unit 91 to the control signal transmission unit 93. Further, the print control signal generation unit 92 generates the print control signal 27 representing the instruction to print the image 14P. The print control signal 27 is output from the print control signal generation unit 92 to the control signal transmission unit 93. The imaging control signal 26 and the print control signal 27 are transmitted to the digital camera with the printer 10 by the control signal transmission unit 93 (step ST130).

In the digital camera with the printer 10, the imaging control signal 26 and the print control signal 27 are received by the reception unit 53 (YES in step ST210). The imaging control signal 26 is output from the reception unit 53 to the imaging control unit 66. The print control signal 27 is output from the reception unit 53 to the print control unit 67.

As shown in FIG. 37, the guide voice 175 indicating that the first gesture has been recognized is output from the speaker 23 under the control of the voice control unit 68 (step ST211). As shown in FIGS. 38 to 40, the display control unit 94 displays the remaining number of seconds 180 in the imaging standby period WPS on the live view display screen 110 (step ST131). Further, the guide voices 181 to 183 indicating the remaining number of seconds 180 are output from the speaker 23 under the control of the voice control unit 68 (step ST212). Accordingly, the participant 13 is notified of the elapsed situation of the imaging standby period WPS.

After the imaging standby period WPS has elapsed (YES in step ST213), the camera unit 21 performs the operation to capture the image 14P under the control of the imaging control unit 66. In this case, as shown in FIG. 41, the pseudo shutter sound 184 is output from the speaker 23 under the control of the voice control unit 68 (step ST214).

Figure 48:
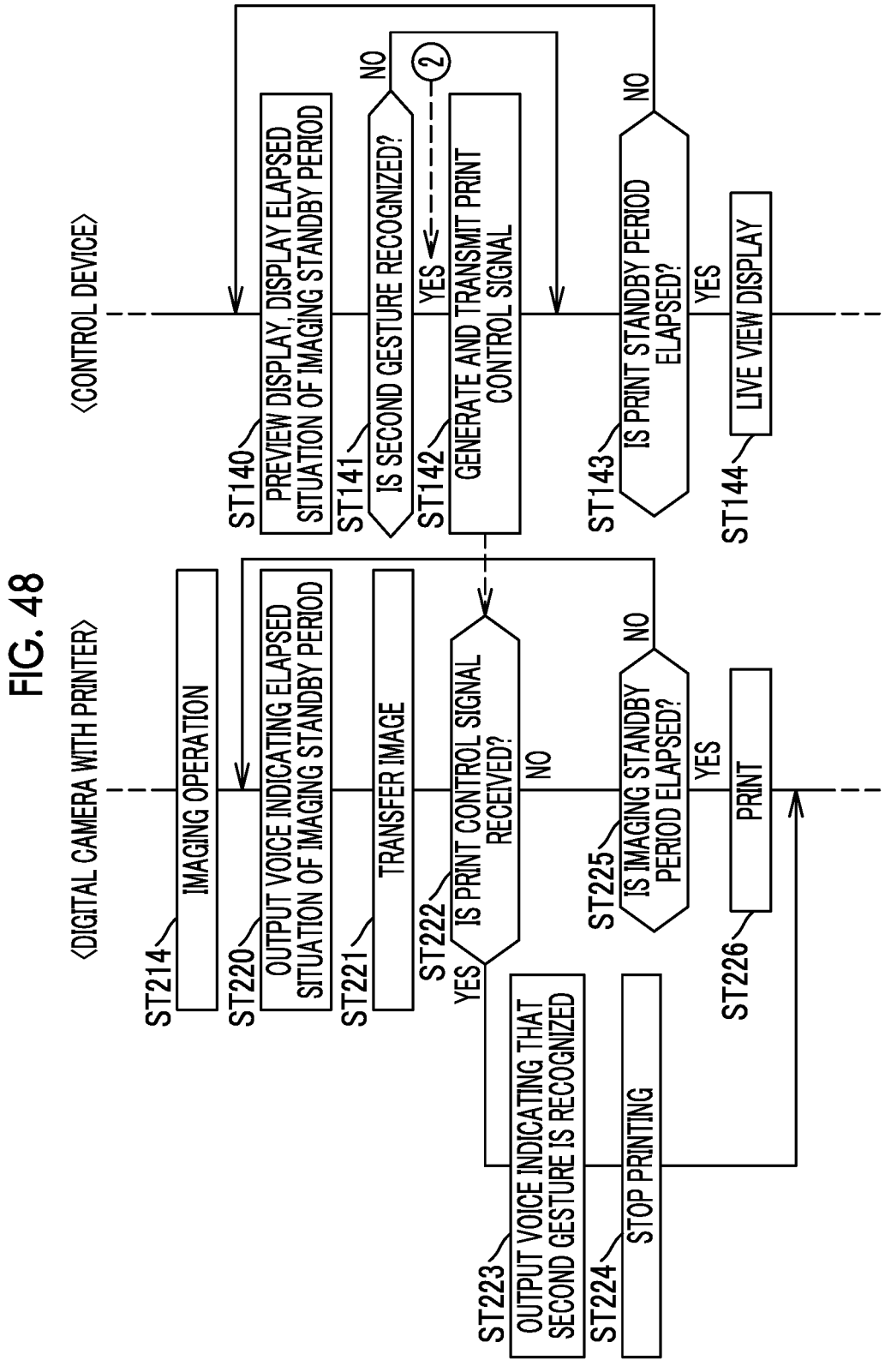
FIG. 48 is a flowchart showing the processing procedure of the digital camera with the printer and the control device.

In FIG. 48, after the imaging operation, the display control unit 94 displays the remaining number of seconds 190 in the print standby period WPP on the preview display screen 111, as shown in FIGS. 42 and 43 (step ST140). Further, under the control of the voice control unit 68, the guide voice 191 indicating that the displayed image 14P is printed and the stop sign is desired to be made in a case where the printing needs to be stopped is output from the speaker 23, and then the guide voice 192 indicating the remaining number of seconds 190 is output from the speaker 23 (step ST220). Accordingly, the participant 13 is notified of the elapsed situation of the print standby period WPP.

As shown in FIGS. 31 and 32, in the print standby period WPP, the processing of transferring the image 14P from the image memory 46 of the camera unit 21 to the print head 51 of the printer unit 22 is performed under the control of the imaging control unit 66 (step ST221).

In this state, in a case where the recognition result 143 that the second gesture has been recognized is output from the gesture recognition unit 89 (YES in step ST141), the print control signal generation unit 92 generates the print control signal 27 representing the instruction to stop printing the image 14P. The print control signal 27 is output from the print control signal generation unit 92 to the control signal transmission unit 93. The print control signal 27 is transmitted to the digital camera with the printer 10 by the control signal transmission unit 93 (step ST142).

In the digital camera with the printer 10, the print control signal 27 is received by the reception unit 53 (YES in step ST222). The print control signal 27 is output from the reception unit 53 to the print control unit 67. In this case, as shown in FIG. 44, the guide voice 193 indicating that the second gesture has been recognized is output from the speaker 23 under the control of the voice control unit 68 (step ST223). As shown in FIG. 32, the printer unit 22 is not operated by the print control unit 67, and the printing of the image 14P on the instant film 15 is stopped (step ST224).

In a case where the second gesture is not recognized during the print standby period WPP and the print control signal 27 representing the print stop instruction is not received by the reception unit 53 (NO in step ST222 and YES in step ST225), the print control unit 67 operates the printer unit 22 to print the image 14P on the instant film 15, as shown in FIG. 31 (step ST226). Accordingly, the instant film 15 on which the image 14P is printed is provided to the participant 13.

After the print standby period WPP has elapsed (YES in step ST143), the display control unit 94 switches the display from the preview display screen 111 to the live view display screen 110 (step ST144).

As described above, the controller 56 of the digital camera with the printer 10 functions as the movement control unit 65 and the imaging control unit 66. The CPU 77 of the control device 11 functions as the determination unit 130. In a case where the face position of the participant 13 in the image 14 deviates from a predetermined set position, the movement control unit 65 and the imaging control unit 66 control the operation of the movement mechanism 20 to capture the proper face position image 14C with the face position as the set position. The determination unit 130 determines whether the detected hand is the right hand or the left hand based on a positional relationship between the position of the hand of the participant 13 detected from the proper face position image 14C and the set position. Therefore, it is possible to reduce a risk of erroneous determination of the left or right hand of the participant 13 shown in the image 14, as compared with JP2019-219904A in which the left or right hand is determined based on an uncertain standard of a posture of the smartphone.

In a case where the detected hand is not a predetermined one hand of the right hand or the left hand, the gesture recognition unit 89 causes the mirror-image inversion processing unit 132 to perform the mirror-image inversion on the hand region image 14H. Then, the gesture is recognized based on the hand region image 14H or the hand region image 14H subjected to the mirror-image inversion processing. Therefore, it is not necessary to force the participant 13 to make a gesture made by either the left or right hand. Both right-handed and left-handed participants 13 can be accommodated. In addition, the gesture made by either the left or right hand can be recognized without distinction.

The determination unit 130 determines that the position of the detected hand is the right hand in a case where the position thereof is on the left side of the set position and that the position of the detected hand is the left hand in a case where the position thereof is on the right side of the set position, as viewed from the imaging direction SD of the digital camera with the printer 10. Since the left or right hand is determined by such a clear determination condition 100, the validity of the determination result 141 can be ensured.

The gesture recognition unit 89 causes the hand region image generation unit 131 to cut out the rectangular region surrounding the detected hand from the proper face position image 14C to generate the hand region image 14H and performs the gesture recognition based on the hand region image 14H. Therefore, a processing load can be reduced as compared with a case where the proper face position image 14C is targeted for subsequent processing. Further, since the processing target is narrowed down to the region necessary for recognizing the gesture, it is possible to improve the gesture recognition accuracy.

The hand region image generation unit 131 cuts out the hand region image 14H from the proper face position image 14C by matching the center of the hand and the center of the image and providing a margin around the hand. Therefore, it is possible to prevent a problem that the hand protrudes from the hand region image 14H and the gesture cannot be recognized.

The size change processing unit 133 performs the size change processing of changing the size of the hand region image 14H to set the hand shown in the hand region image 14H to the predetermined set size. Therefore, it is possible to avoid the trouble of adjusting the hand shown in the hand region image 14H to the set size by the participant 13 moving the hand front and rear or the participant 13 itself moving front and rear. The participant 13 can make the gesture without paying particular attention to the size of the hand. In a case where the hand size is smaller than the set size, the gesture recognition accuracy drops. However, since the hand size becomes the set size uniformly by the size change processing, it is possible to maintain the gesture recognition accuracy at a high level.

The gesture recognition unit 89 causes the joint image generation unit 134 to generate the joint image 14J obtained by extracting the hand joint from the hand region image 14H and performs the gesture recognition based on the joint image 14J. With the joint image 14J, a background other than the hand, which is not necessary for recognizing the gesture, is removed. Therefore, it is possible to further improve the gesture recognition accuracy.

The joint image generation unit 134 uses the model for joint image generation 102 that uses the hand region image 14H subjected to the size change processing as the input data and the joint image 14J as the output data. Therefore, it is possible to easily obtain the joint image 14J.

As shown in FIGS. 21 and 22, the model for joint image generation 102 is a model in which the hand region image for learning 14H_L showing the predetermined one hand whose size is the set size is selectively provided for learning as input data for learning. Therefore, it is not necessary to prepare the hand region image for learning 14H_L showing a hand whose size is different from the set size and the hand region image for learning 14H_L showing the other hand other than the predetermined one hand, and thus it is possible to efficiently end the learning in a short time.

Further, the model for joint image generation 102 is a model in which a plurality of hand region images for learning 14H_L showing the predetermined one hand whose size is the set size in different postures are selectively provided for learning as the input data for learning. Therefore, it is not necessary to force the participant 13 to have a specific hand posture. The participant 13 can make the gesture without paying particular attention to the posture of the hand.

The type classification unit 135 uses the model for type classification 103 that uses the joint image 14J as the input data and the classification result 142 of the gesture type as the output data. Therefore, it is possible to easily obtain the classification result 142.

As shown in FIGS. 25 and 26, the model for type classification 103 is a model in which the joint image for learning 14J_L, which is generated from the hand region image 14H showing the predetermined one hand whose size is the set size, is selectively provided for learning as the input data for learning. Therefore, it is not necessary to prepare the joint image for learning 14J_L, which is generated from the hand region image 14H showing a hand whose size is different from the set size, and the joint image for learning 14J_L, which is generated from the hand region image 14H showing the other hand other than the predetermined one hand, and thus it is possible to efficiently end the learning in a short time.

Further, the model for type classification 103 is a model in which a plurality of joint images for learning 14J_L, which are generated from the plurality of hand region images 14H showing the predetermined one hand whose size is the set size in different postures, are selectively provided for learning as the input data for learning. Therefore, it is not necessary to force the participant 13 to have a specific hand posture as in the case of the model for joint image generation 102. The participant 13 can make the gesture without paying particular attention to the posture of the hand.

The set position is the center position of the image 14. Therefore, regardless of the participant 13, it is possible to capture the image 14P in which the face is located in the center and the composition is substantially the same.

Figures 49, 50:
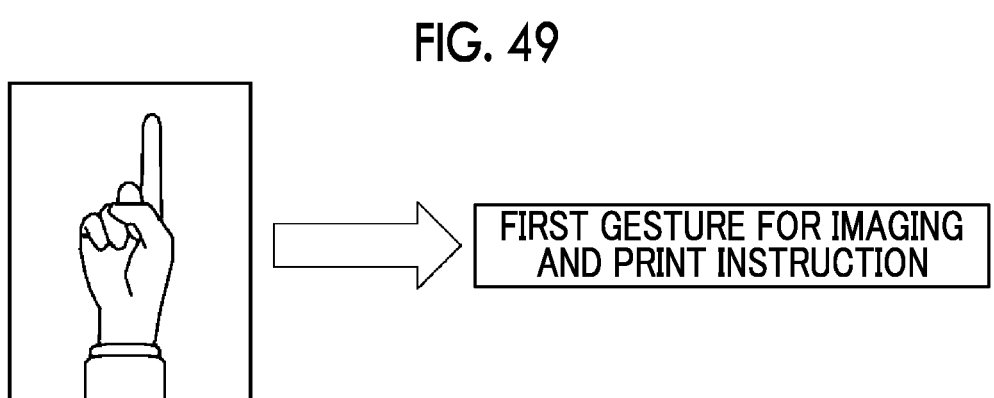
FIG. 49 is a diagram showing another example of a gesture recognized as the first gesture.
FIG. 50 is a diagram showing another example of a gesture recognized as the second gesture.

The first gesture is not limited to the exemplified V sign, and the second gesture is not limited to the exemplified stop sign. For example, as shown in FIG. 49, the gesture of pointing the palm side toward the digital camera with the printer 10 in a state where the index finger and the middle finger are raised and the other fingers are bent may be recognized as the first gesture for the imaging and print instruction. As shown in FIG. 50, a gesture of pointing the palm side toward the digital camera with the printer 10 in a state where all fingers are bent may be recognized as the second gesture for the print stop instruction.

The models for joint image generation 102 for the right and left hands and the models for type classification 103 for the right and left hands are prepared, and the model for joint image generation 102 to be used may be switched according to the determination result 141 of the left hand or the right hand.

The model for joint image generation 102 and the model for type classification 103 may be trained only with the image showing the hand in a specific posture. In this case, the posture of the hand shown in the hand region image 14H is recognized, and in a case where the recognized posture is different from the specific posture, the hand region image 14H is rotated to correct the recognized posture to the specific posture.

The live view display screen 110 and the preview display screen 111 may be displayed in parallel. Further, the live view display screen 110 may be displayed as a nested screen in the preview display screen 111.

The participant 13 himself knows that the participant closes eyes or misses a pose at the execution timing of the imaging operation. Therefore, in some cases, the participant 13 can determine the success or failure of the imaging without checking the image 14P on the preview display screen 111. Thus, the participant 13 may be notified only of the remaining number of seconds 190 in the print standby period WPP without displaying the image 14P as a preview on the display 17.

In the above embodiment, the imaging range of the camera unit 21 is changed to match the center CP_F of the face detection region 115 and the center line CL of the long side of the image 14, but the present disclosure is not limited thereto. The imaging range of the camera unit 21 may be changed such that the center CP_F of the face detection region 115 matches the center of the image 14. In this case, the center of the image 14 is an example of "set position" and the "center position of image" according to the technique of the present disclosure.

The set position that matches the face position is not limited to the center position of the image. The set position may be biased to either the top, bottom, left, or right of the image 14. In this case, textual information such as an exhibition name may be printed in a biased margin region.

The imaging range changing mechanism is not limited to the exemplified movement mechanism 20 that moves the main body 30 front and rear and left and right. A mechanism for swinging the main body 30 top, bottom, left, and right may be used. Further, a mechanism for moving a unit of the imaging optical system 40 and the imaging element 43 may be used.

The image 14 itself output from the imaging element 43 may be printed without setting the print region 73.

The guide voices 171, 172, 173, 174, 175, 181, 182, 183, 191, 192, 193, and the pseudo shutter sound 184 may be output from a speaker of the control device 11, for example, a speaker built in the display 17, instead of the speaker 23 of the digital camera with the printer 10.

The guide voices such as "Please stand at imaging position.", "Please make V sign.", and "Please make stop sign of showing palm open in case where printing needs to be stopped." may be spoken by an administrator of the imaging system 2 at the site.

The pseudo shutter sound 184 is not limited to the exemplified "click". Any sound indicating that the shutter 42 has been released may be used, and a chime sound or the like may be used.

The person to be imaged is not limited to the participant 13 of the exemplified exhibition. The person to be imaged may be a participant in other events such as a wedding party and outdoor recreation. Further, The person to be imaged is not limited to the participant of the event, but may be a general user who performs self-imaging using the digital camera with the printer 10.

A print medium for printing the image 14P is not limited to the instant film 15. Plain paper may be used.

In the above embodiment, an example is shown in which the computer 70 of the digital camera with the printer 10 and the control device 11 perform the function of the "gesture recognition device" of the present disclosure, but the present disclosure is not limited thereto. All the functions of the "gesture recognition device" of the present disclosure may be performed by the computer 70 of the digital camera with the printer 10. On the contrary, all the functions of the "gesture recognition device" of the present disclosure may be performed by the control device 11.

FIG. 51 shows an aspect in which the functions of the movement control signal generation unit 90, the imaging control signal generation unit 91, and the print control signal generation unit 92 are performed by the digital camera with the printer 10. In this case, the face detection result by the face detection unit 87 of the control device 11 is transmitted to the movement control signal generation unit 90 of the digital camera with the printer 10. Further, the gesture recognition result 143 by the gesture recognition unit 89 of the control device 11 is transmitted to the imaging control signal generation unit 91 and the print control signal generation unit 92 of the digital camera with the printer 10.

FIG. 52 shows an aspect in which the functions of the face detection unit 87, the hand detection unit 88, the gesture recognition unit 89, the movement control signal generation unit 90, the imaging control signal generation unit 91, and the print control signal generation unit 92 are performed by the digital camera with the printer 10. In this case, all of the face detection, the hand detection, the gesture recognition, and the generation of respective control signals 25 to 27 are performed by the digital camera with the printer 10. The control device 11 in this case has only the function of the display control unit 94.

The image reception unit 85 and the remaining number of sheets reception unit 86 may be integrated into one reception unit. As described above, a hardware configuration of the computer constituting the control device 11 may be changed as appropriate according to required performance such as processing capacity, safety, and reliability. The same applies to the hardware configuration of the computer 70 (controller 56). Not only the hardware but also the programs such as the operation programs 60 and 80 may be duplicated or stored in a plurality of storage devices in a distributed manner for the purpose of ensuring safety and reliability.

In the above embodiment, the digital camera with the printer 10 is exemplified, but a digital camera without the printer unit 22 may be used. Any digital camera capable of imaging the person to be imaged may be used, and a smartphone, a tablet terminal, a notebook-type personal computer, or the like may be used.

In the above embodiment, for example, as the hardware structure of the processing units that execute various pieces of processing such as the movement control unit 65, the imaging control unit 66, the print control unit 67, the voice control unit 68, the image reception unit 85, the remaining number of sheets reception unit 86, the face detection unit 87, the hand detection unit 88, the gesture recognition unit 89, the movement control signal generation unit 90, the imaging control signal generation unit 91, the print control signal generation unit 92, the control signal transmission unit 93, the display control unit 94, the determination unit 130, the hand region image generation unit 131, the mirror-image inversion processing unit 132, the size change processing unit 133, the joint image generation unit 134, the type classification unit 135, and the recognition result output unit 136, the following various processors can be used. The various processors include a programmable logic device (PLD) which is a processor whose circuit configuration is changeable after manufacturing such as a field programmable gate array (FPGA) and/or a dedicated electric circuit which is a processor having a circuit configuration exclusively designed to execute specific processing such as an application specific integrated circuit (ASIC), and the like, in addition to the controller 56 and the CPU 77 which are general-purpose processors that execute software (operation programs 60 and 80) to function as the various processing units. A graphics processing unit (GPU) may be used instead of the controller 56 and the CPU 77.

One processing unit may be configured by one of the various processors or may be configured by a combination of two or more processors of the same type or different types (for example, combination of a plurality of FPGAs and/or combination of a CPU and an FPGA or combination of a CPU and a GPU). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a systemon-chip (SoC) or the like. As described above, the various processing units are configured using one or more of the various processors as the hardware structure.

More specifically, a circuitry combining circuit elements such as semiconductor elements may be used as the hardware structure of the various processors.

The above various embodiments and/or various modification examples can be combined as appropriate in the technique of the present disclosure. It is needless to say that the technique of the present disclosure is not limited to each of the above embodiments and various configurations can be employed without departing from the gist. Further, the technique of the present disclosure extends to a storage medium that stores the program non-transitorily, in addition to the program.

The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. In order to avoid complication and facilitate understanding of the portion according to the technique of the present disclosure, the description related to common general knowledge not requiring special description in order to implement the technique of the present disclosure is omitted in the above description content and illustrated content.

In the present specification, "A and/or B" is synonymous with "at least one of A or B". That is, "A and/or B" means that only A may be used, only B may be used, or a combination of A and B may be used. In the present specification, the same concept as "A and/or B" is also applied to a case where three or more matters are linked and expressed by "and/or".

All documents, patent applications, and technical standards described in the present specification are incorporated by reference in the present specification to the same extent as in a case where the incorporation of each individual document, patent application, and technical standard by reference is specifically and individually described.

What is claimed is:

1. A gesture recognition device that recognizes, based on an image obtained by imaging a person to be imaged with a digital camera having an imaging range changing mechanism for changing an imaging range, a gesture represented by a hand of the person to be imaged, the gesture recognition device comprising:

at least one processor, wherein the at least one processor is configured to:

set an area of the image which includes a face of the person to be imaged and determine a center position of the area of the image, generate, in a case where the center position deviates from a center line of a long side of the image, a movement control signal to move the digital camera to align the center line of the image with the center position to capture a proper face position image with the position of the face as the set position, determine whether the hand detected from the proper face position image is a right hand or a left hand based on a positional relationship between a position of the detected hand and the set position, determine a hand detection region having a center of the hand from the proper face position image, cut out a rectangular region surrounding the detected hand from the proper face position image to generate a hand region image by matching the center of the hand with a center of the rectangular region, wherein the hand region image includes the rectangular region which has more margin for the detected hand than the hand detection region, recognize the gesture based on the hand region image, determine whether a size of the hand region image is larger and whether the size of the hand region is smaller than a predetermined set size, perform size change processing of enlarging the size of the hand region image to the predetermined set size in response to the size of the hand region image being smaller than the predetermined size, and perform size change processing of reducing the size of the hand region image to the predetermined size in response to the size of the hand region image being larger than the predetermined size.

2. The gesture recognition device according to claim 1, wherein the at least one processor is configured to:

perform mirror-image inversion processing on the proper face position image in a case where the detected hand is not a predetermined one hand of the right hand or the left hand, and recognize the gesture based on the proper face position image or the proper face position image subjected to the mirror-image inversion processing.

3. The gesture recognition device according to claim 1, wherein the at least one processor is configured to:

determine that the position of the detected hand is the right hand in a case where the position of the detected hand is on a left side of the set position and is the left hand in a case where the position of the detected hand is on a right side of the set position, as viewed from an imaging direction of the digital camera.

4. The gesture recognition device according to claim 1, wherein the at least one processor is configured to:

generate a joint image obtained by extracting a joint of the hand from the hand region image, and recognize the gesture based on the joint image.

5. The gesture recognition device according to claim 4, wherein the at least one processor is configured to:

use a first machine learning model that uses the hand region image subjected to the size change processing as input data and the joint image as output data.

6. The gesture recognition device according to claim 5, wherein the at least one processor is configured to:

perform mirror-image inversion processing on the proper face position image in a case where the detected hand is not a predetermined one hand of the right hand or the left hand, and recognize the gesture based on the proper face position image or the proper face position image subjected to the mirror-image inversion processing, wherein the first machine learning model is a model in which the hand region image showing the predetermined one hand whose size is the set size is selectively provided for learning as input data for learning.

7. The gesture recognition device according to claim 5, wherein the at least one processor is configured to:

perform mirror-image inversion processing on the proper face position image in a case where the detected hand is not a predetermined one hand of the right hand or the left hand, and recognize the gesture based on the proper face position image or the proper face position image subjected to the mirror-image inversion processing, wherein the first machine learning model is a model in which a plurality of the hand region images showing the predetermined one hand whose size is the set size in different postures are selectively provided for learning as input data for learning.

8. The gesture recognition device according to claim 4, wherein the at least one processor is configured to:

use a second machine learning model that uses the joint image as input data and a type of the gesture as output data.

9. The gesture recognition device according to claim 8, wherein the at least one processor is configured to:

perform mirror-image inversion processing on the proper face position image in a case where the detected hand is not a predetermined one hand of the right hand or the left hand, recognize the gesture based on the proper face position image or the proper face position image subjected to the mirror-image inversion processing, and perform size change processing of changing a size of the hand region image to set a size of the hand shown in the hand region image to a predetermined set size, wherein the second machine learning model is a model in which the joint image generated from the hand region image showing the predetermined one hand whose size is the set size is selectively provided for learning as input data for learning.

10. The gesture recognition device according to claim 8, wherein the at least one processor is configured to:

perform mirror-image inversion processing on the proper face position image in a case where the detected hand is not a predetermined one hand of the right hand or the left hand, recognize the gesture based on the proper face position image or the proper face position image subjected to the mirror-image inversion processing, and perform size change processing of changing a size of the hand region image to set a size of the hand shown in the hand region image to a predetermined set size, wherein the second machine learning model is a model in which a plurality of the joint images generated from a plurality of hand region images showing the predetermined one hand whose size is the set size in different postures are selectively provided for learning as input data for learning.

11. An operation method for a gesture recognition device for recognizing, based on an image obtained by imaging a person to be imaged with a digital camera having an imaging range changing mechanism for changing an imaging range, a gesture represented by a hand of the person to be imaged, the operation method comprising:

setting an area of the image which includes a face of the person to be imaged and determine a center position of the area of the image;

generating, in a case where the center position deviates from a center line of a long side of the image, a movement control signal to move the digital camera to align the center line of the image with the center position to capture a proper face position image with the position of the face as the set position;

determining whether the hand detected from the proper face position image is a right hand or a left hand based on a positional relationship between a position of the detected hand and the set position;

determining a hand detection region having a center of the hand from the proper face position image;

cutting out a rectangular region surrounding the detected hand from the proper face position image to generate a hand region image by matching the center of the hand with a center of the rectangular region, wherein the hand region image includes the rectangular region which has more margin for the detected hand than the hand detection region;

recognizing the gesture based on the hand region image;

determining whether a size of the hand region image is larger and whether the size of the hand region is smaller than a predetermined set size;

performing size change processing of enlarging the size of the hand region image to the predetermined set size in response to the size of the hand region image being smaller than the predetermined size; and performing size change processing of reducing the size of the hand region image to the predetermined size in response to the size of the hand region image being larger than the predetermined size.

12. A non-transitory computer-readable storage medium storing an operation program for a gesture recognition device for recognizing, based on an image obtained by imaging a person to be imaged with a digital camera having an imaging range changing mechanism for changing an imaging range, a gesture represented by a hand of the person to be imaged, the operation program causing a computer to:

set an area of the image which includes a face of the person to be imaged and determine a center position of the area of the image;

generate, in a case where the center position deviates from a center line of a long side of the image, a movement control signal to move the digital camera to align the center line of the image with the center position to capture a proper face position image with the position of the face as the set position; determine whether the hand detected from the proper face position image is a right hand or a left hand based on a positional relationship between a position of the detected hand and the set position;

determine a hand detection region having a center of the hand from the proper face position image, cut out a rectangular region surrounding the detected hand from the proper face position image to generate a hand region image by matching the center of the hand with a center of the rectangular region, wherein hand region image includes the rectangular region which has more margin for the detected hand than the hand detection region, recognize the gesture based on the hand region image, determine whether a size of the hand region image is larger and whether the size of the hand region is smaller than a predetermined set size, perform size change processing of enlarging the size of the hand region image to the predetermined set size in response to the size of the hand region image being smaller than the predetermined size, and perform size change processing of reducing the size of the hand region image to the predetermined size in response to the size of the hand region image being larger than the predetermined size.

\* \* \* \* \*